US 9,248,376 B2

United States Patent
Yoshikawa et al.

(10) Patent No.: US 9,248,376 B2
(45) Date of Patent: Feb. 2, 2016

(54) COMPUTER-READABLE STORAGE MEDIUM HAVING STORED GAME PROGRAM THEREIN, AND GAME APPARATUS

(75) Inventors: Kazuhiro Yoshikawa, Kyoto (JP); Hitoshi Yamagami, Kyoto (JP); Toshio Noguchi, Suginami-ku (JP)

(73) Assignee: NINTENDO CO., LTD., Kyoto (JP)

( * ) Notice: Subject to any disclaimer, the term of this patent is extended or adjusted under 35 U.S.C. 154(b) by 392 days.

(21) Appl. No.: 12/641,862

(22) Filed: Dec. 18, 2009

(65) Prior Publication Data
US 2010/0095249 A1    Apr. 15, 2010

Related U.S. Application Data

(63) Continuation-in-part of application No. 12/340,835, filed on Dec. 22, 2008.

(30) Foreign Application Priority Data

Sep. 30, 2008 (JP) ................................. 2008-255560
Sep. 30, 2009 (JP) ................................. 2009-228255

(51) Int. Cl.
A63F 13/00 (2014.01)
A63F 13/211 (2014.01)
A63F 13/21 (2014.01)
A63F 13/40 (2014.01)

(52) U.S. Cl.
CPC .............. *A63F 13/211* (2014.09); *A63F 13/10* (2013.01); *A63F 13/21* (2014.09); *A63F 2300/1087* (2013.01); *A63F 2300/6045* (2013.01); *A63F 2300/643* (2013.01); *A63F 2300/6676* (2013.01)

(58) Field of Classification Search
CPC ............................... A63F 13/21; A63F 13/211
USPC ........................................................... 463/37
See application file for complete search history.

(56) References Cited

U.S. PATENT DOCUMENTS

| 6,340,330 B1 | 1/2002 | Oishi et al. |
| 6,544,125 B2 * | 4/2003 | Horigami et al. ............... 463/38 |
| 6,743,099 B2 | 6/2004 | Yabe et al. |

(Continued)

FOREIGN PATENT DOCUMENTS

| JP | 2003-79943 | 3/2003 |
| JP | 2006-149662 | 6/2006 |
| WO | 98/15328 | 4/1998 |

OTHER PUBLICATIONS

Jul. 20, 2011 Office Action from U.S. Appl. No. 12/340,835.
"Dengeki DS & Wii Style vol. 2", *ASCII Media Works Inc.*, released Aug. 1, 2007, P28 (Partial Translation).
"Shuukan Famitsu Aug. 3, 2007 Edition", Enterbrain Inc., released on Aug. 3, 2007, P152 (Partial Translation).

(Continued)

*Primary Examiner* — Milap Shah
*Assistant Examiner* — Thomas H Henry
(74) *Attorney, Agent, or Firm* — Nixon & Vanderhye P.C.

(57) ABSTRACT

Based on operation information obtained from an operating device for pointing to a position on a screen of a display device, a pointing position to which the operating device points is repeatedly calculated. Next, a change amount of the pointing position is calculated. Then, whether or not the change amount of the pointing position meets a first condition is determined. As a result, when it is determined that the change amount of the pointing position meets the first condition, predetermined processing is executed for the pointing position or a position specified based on the pointing position.

20 Claims, 34 Drawing Sheets

(56) References Cited

U.S. PATENT DOCUMENTS

| | | |
|---|---|---|
| 7,001,272 B2 | 2/2006 | Yamashita et al. |
| 2001/0039207 A1 | 11/2001 | Horigami et al. |
| 2002/0151337 A1 | 10/2002 | Yamashita et al. |
| 2003/0063115 A1 | 4/2003 | Kaku et al. |
| 2005/0197178 A1* | 9/2005 | Villegas ............................ 463/5 |
| 2006/0084502 A1* | 4/2006 | Downs et al. ................... 463/29 |

OTHER PUBLICATIONS

"Kadukeusu Z Futatsu No Choushittou instruction manual", Atlus Co., Ltd., released on Dec. 2, 2006, P25 (Partial Translation).

"Shuukan Famitsu Aug. 17, 2007 edition", Enterbrain Inc., released on Aug. 17, 2007, P119 (Partial Translation).

* cited by examiner

FIG. 3
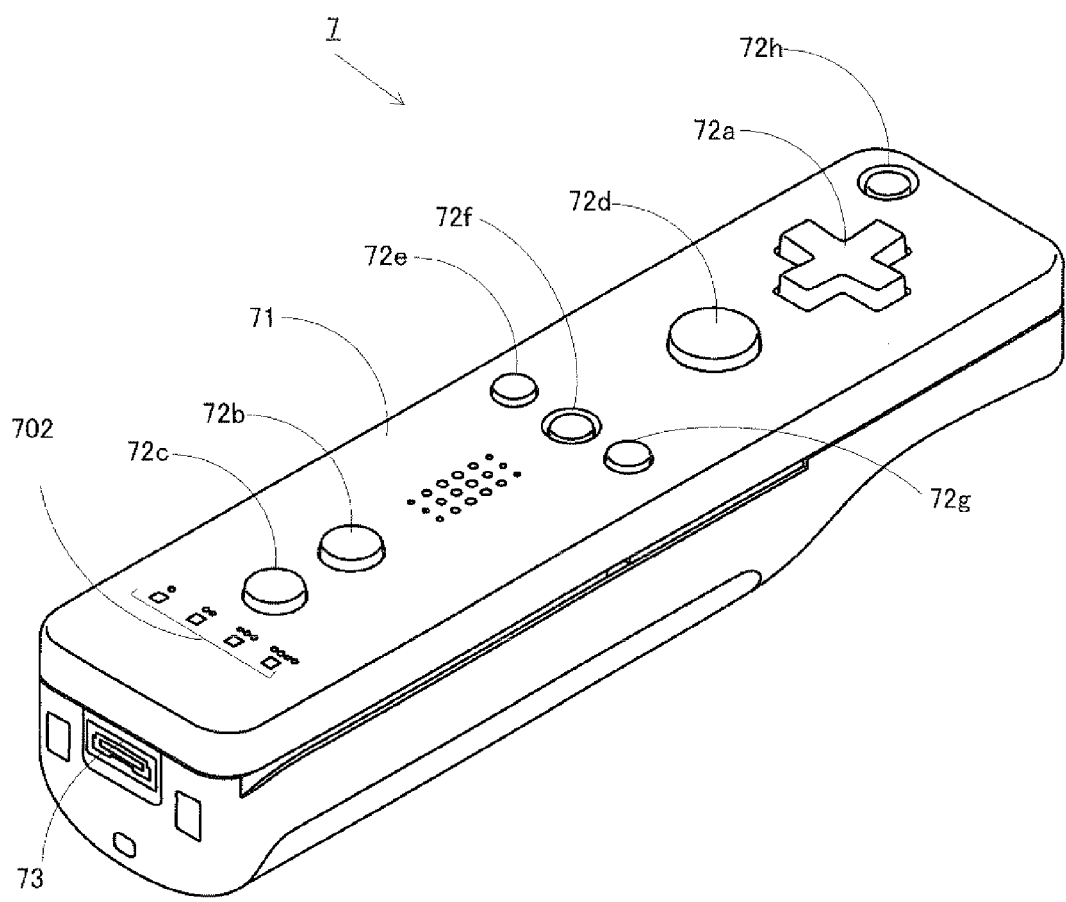
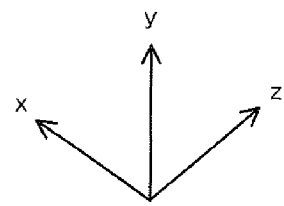

F I G. 3 8
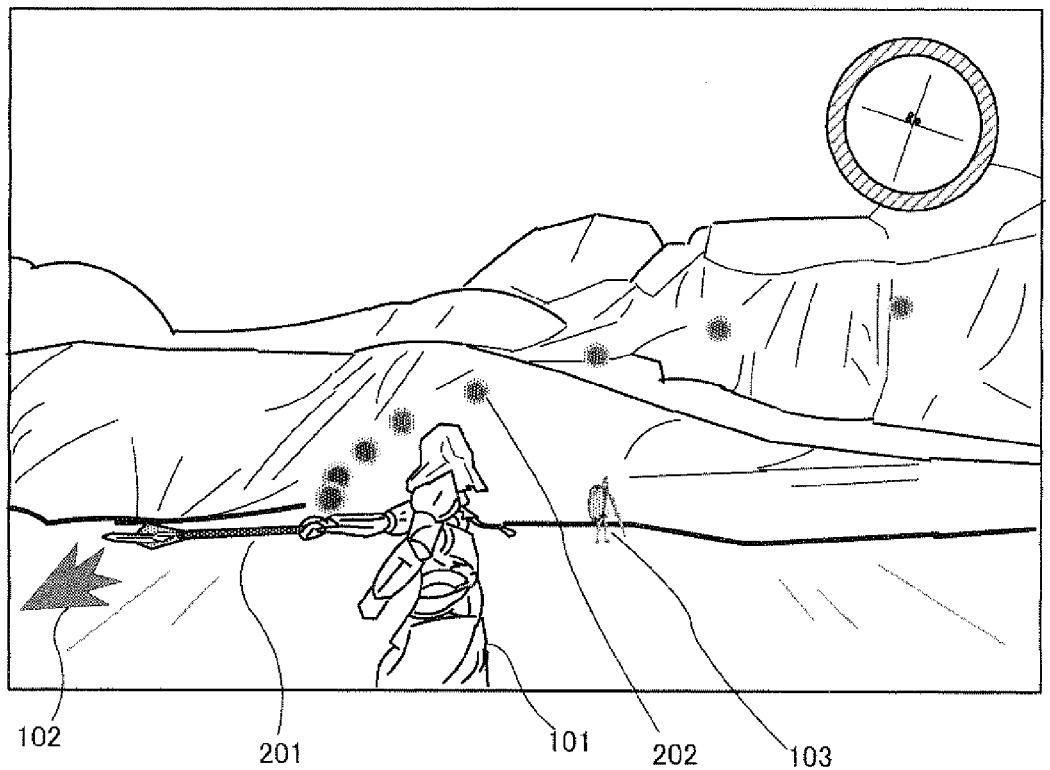

COMPUTER-READABLE STORAGE MEDIUM HAVING STORED GAME PROGRAM THEREIN, AND GAME APPARATUS

CROSS REFERENCE TO RELATED APPLICATION

This application is a continuation-in-part of application Ser. No. 12/340,835, filed Dec. 22, 2008 (now U.S. Pat. No. 8,403,753) which claims priority to Japanese Patent Application Nos. 2008-255560, filed on Sep. 30, 2008, and 2009-228255, filed on Sep. 30, 2009, which are each incorporated herein by reference.

FIELD

The technology herein relates to a computer-readable storage medium having stored a game program therein, and a game apparatus, and more particularly, to a computer-readable storage medium having stored a game program therein, and a game apparatus for executing predetermined processing based on imaging information which is obtained by imaging means, of an operating device, for taking an image of at least one target whose image is to be taken and which imaging information is transmitted from the operating device.

BACKGROUND AND SUMMARY

Conventionally, there is known a game apparatus which starts a predetermined motion based on an operation with an input device equipped with an image pickup device (e.g. "DENGEKI DS&Wii Style Vol. 2", ASCII MEDIA WORKS Inc., released on Aug. 1, 2007, P28 (hereinafter, referred to as Non-Patent Document 1), "Shuukan Famitsu Aug. 3, 2007 edition", ENTERBRAIN INC., released on Aug. 3, 2007, P152 (hereinafter, referred to as Non-Patent Document 2), "Kadukeusu Z Futatsu No Choushittou instruction manual", ATLUS CO., LTD., released on Dec. 2, 2006, P25 (hereinafter, referred to as Non-Patent Document 3)). In games disclosed in the Non-Patent Documents 1 and 2, an input device is used like a sword, and an enemy object displayed on a screen is cut by swinging the input device. By swinging the input device vertically, horizontally, and obliquely, three types of cutting attacks, "vertical cutting", "horizontal cutting", and "oblique cutting", can be performed according to the swinging direction. A trajectory of the sword in each cutting attack has an angle in accordance with the vertical, horizontal, or oblique swinging of the input device. When performing an operation for a cutting attack, the position of a "pointer" displayed on the screen can be locked by pressing a predetermined button (pointer lock). When the input device is swung in a state where the position of the pointer is locked, the position of the pointer becomes the center of a sword trajectory. When the pointer is not locked, a sword trajectory passes through the center of the screen.

Meanwhile, a game disclosed in the Non-Patent Document 3 is a surgery game in which an input device is used like a scalpel. For example, when the trunk of a patient is displayed on a screen and an operation for incising skin is performed, a marker indicating a part to be incised is displayed on the screen. Then, the operation for incision can be performed by moving a cursor along the marker with a button of a controller pressed. If the cursor can be moved not far from the marker, the incision is successfully made.

However, the above game apparatus have the following problems. In the games disclosed in the Non-Patent Documents 1 and 2, when performing an operation for a cutting attack, if the pointer is not locked, a sword trajectory always passes through the center of the screen. Thus, if a cutting attack with a sword trajectory which does not pass through the center of the screen is desired, the pointer lock is necessary. In other words, a two-step operation need to be performed that a button operation is performed for the pointer lock and then the input device is swung. Therefore, unless an operation for the pointer lock is performed, it is impossible to cut a desired position. Further, because such a two-step operation is needed, there is a problem that a cutting attack operation cannot be performed quickly. Further, in the games disclosed in the Non-Patent Documents 1 and 2, regardless of the length and the speed of swinging by a player, the sword trajectory of a cutting attack always extends linearly from end to end of the screen. In other words, for an effect (animation) for the sword trajectory which is to be displayed at the cutting attack, a pattern in accordance with a direction of vertical, horizontal, or oblique swinging is merely read out from among some predetermined sword trajectory patterns, and reproduced. Thus, it is impossible to perform an operation for cutting a part of the screen, not from end to end of the screen. Therefore, there is a problem that a cutting attack operation lacks a degree of freedom.

Meanwhile, in the game disclosed in the Non-Patent Document 3, it is possible to perform an operation for cutting only a part of the screen. However, the operation for incision in the game is an operation of moving the cursor along the marker displayed on the screen, and a position desired by a player cannot be freely cut by the operation for incision. Thus, similarly as in the games disclosed in the Non-Patent Documents 1 and 2, there is a problem that an operation for cutting a desired position lacks a degree of freedom.

Therefore, an object of certain example embodiments is to provide a computer-readable storage medium having stored therein a game program that enables operations with a higher degree of freedom, and a game apparatus that enables operations with a higher degree of freedom.

Certain example embodiments have the following features to attain the object mentioned above. It is noted that reference characters and supplementary explanations in parentheses are merely provided to facilitate the understanding in relation to the later-described embodiments, rather than limiting the scope of the present invention in any way.

A first aspect of certain example embodiments is directed to a computer-readable storage medium having stored therein a game program that is executed by a computer of a game apparatus for executing predetermined processing based on operation information that is obtained from an operating device for pointing to a position on a screen of a display device. The game program causes the computer to operate as: pointing position calculation means; change amount calculation means; first determination means; and processing execution means. The pointing position calculation means repeatedly calculates a pointing position to which the operating device points, based on the operation information. The change amount calculation means calculates a change amount of the pointing position. The first determination means determines whether or not the change amount of the pointing position meets a first condition. When it is determined by the first determination means that the change amount of the pointing position meets the first condition, the processing execution means executes predetermined processing for the pointing position or a position specified based on the pointing position.

According to the first aspect, when the change amount of the pointing position of the operating device meets a condition, processing can be executed for a position desired by a player, thereby providing the player with a game having a higher degree of freedom of operability.

In a second aspect based on the first aspect, the game program further causes the computer to operate as second determination means. The second determination means determines whether or not the change amount of the pointing position calculated by the change amount calculation means meets a second condition. The processing execution means starts execution of the predetermined processing when it is determined by the first determination means that the change amount of the pointing position meets the first condition, and ends the execution of the predetermined processing when it is determined by the second determination means that the change amount of the pointing position meets the second condition.

In a third aspect based on the second aspect, the first condition includes the change amount of the pointing position being equal to or larger than a first predetermined value, and the second condition includes the change amount of the pointing position being equal to or less than a second predetermined value.

According to the second and third aspects, arbitrary positions can be set as a start point and an end point for the processing, thereby providing a high degree of freedom of operability.

In a fourth aspect based on the first aspect, the game program further causes the computer to operate as in-screen pointing determination means for determining whether or not the pointing position is included in a range that is assigned as the screen. The processing execution means starts execution of the predetermined processing when: it is determined by the in-screen pointing determination means that the pointing position to which the operating device points is included in the range that is assigned as the screen; and it is determined by the first determination means that the change amount of the pointing position meets the first condition.

According to the fourth aspect, when the change amount of the pointing position of the operating device meets a condition, the predetermined processing can be executed with a position, in the screen, desired by the player being set as a start point.

In a fifth aspect based on the first aspect, the game program further causes the computer to operate as in-screen pointing determination means for determining whether or not the pointing position is included in a range that is assigned as the screen. After starting execution of the predetermined processing, the processing execution means ends the execution of the predetermined processing when it is determined by the in-screen pointing determination means that the pointing position is not included in the range that is assigned as the screen.

According to the fifth aspect, when the player points to a position out of the screen after the predetermined processing is executed with a position, in the screen, desired by the player being set as a start point, the processing can be ended, thereby further enhancing operability.

In a sixth aspect based on the first aspect, the processing execution means draws a predetermined object at the pointing position or the position specified based on the pointing position.

In a seventh aspect based on the first aspect, the processing execution means draws a trajectory connecting in chronological order the pointing position or the position specified based on the pointing position.

According to the sixth and seventh aspects, it can be easy to make the player recognize a position in the screen for which the processing is executed.

In an eighth aspect based on the first aspect, the game program further causes the computer to operate as hit determination means. The hit determination means determines whether or not a predetermined target object exists at a position, in a virtual game space, corresponding to the pointing position or the position specified based on the pointing position. The processing execution means executes hit processing for the predetermined target object when it is determined by the hit determination means that the predetermined target object exists at the position, in the virtual game space, corresponding to the pointing position or the position specified based on the pointing position.

According to the eighth aspect, after the predetermined processing is started by the processing execution means, different processing can be further executed for the object through which the pointing position passes. Thus, for example, realistic feeling of an operation for "cutting" a predetermined object is enhanced, and hence the fun of the game can be enhanced.

In a ninth aspect based on the eighth aspect, the virtual game space is a virtual three-dimensional space, and the game program further causes the computer to operate as: three-dimensional coordinate calculation means; straight line calculation means; and straight line collision determination means. The three-dimensional coordinate calculation means calculates a three-dimensional coordinate that represents the position, in the virtual three-dimensional space, corresponding to the pointing position or the position specified based on the pointing position. The straight line calculation means calculates a straight line connecting a predetermined position in the virtual three-dimensional space to the position that is represented by the three-dimensional coordinate calculated by the three-dimensional coordinate calculation means. The straight line collision determination means determines whether or not the straight line calculated by the straight line calculation means collides with the predetermined target object. When it is determined by the straight line collision determination means that the straight line collides with the predetermined target object, the processing execution means executes the hit processing for the predetermined target object with which the straight line collides.

According to the ninth aspect, a collision determination in the three-dimensional space can be easily performed, and a game with a greater sense of reality can be provided.

In a tenth aspect based on the eighth aspect, the game program further causes the computer to operate as: continuation parameter change means; and third determination means. When it is determined by the hit determination means that the predetermined target object exists, the continuation parameter change means changes a value of a continuation parameter that is a parameter for indicating whether or not the processing executed by the processing execution means continues. After execution of the predetermined processing is started by the processing execution means, the third determination means determines whether or not the value of the continuation parameter meets a third condition. When it is determined by the third determination means that the value of the continuation parameter meets the third condition, the processing execution means ends the execution of the predetermined processing started by the processing execution means.

According to the tenth aspect, even when the change amount of the pointing position does not meet the second condition, the processing started by the processing execution means can be ended, thereby further enhancing the fun of the game.

In an eleventh aspect based on the first aspect, the processing execution means includes movement direction calculation means and object movement means. The movement direction calculation means calculates a movement direction of a predetermined movement object in a virtual three-dimensional space, based on the pointing position or the position specified based on the pointing position. The object movement means moves the predetermined movement object in the virtual three-dimensional space based on the movement direction calculated by the movement direction calculation means.

According to the eleventh aspect, a predetermined object can be moved based on the pointing position on the screen. For example, in a game or the like set in a virtual three-dimensional space, when the player performs an operation for causing the player object to fire a bullet object of a shooting weapon, the bullet object can be moved based on the pointing position on the screen, thereby enabling an intuitive operation.

In a twelfth aspect based on the first aspect, the processing execution means includes: three-dimensional vector calculation means for calculating a three-dimensional vector indicative of a movement direction of a predetermined movement object in a virtual three-dimensional space, based on the pointing position or the position specified based on the pointing position; and object movement means for moving the predetermined movement object in the virtual three-dimensional space, based on the three-dimensional vector calculated by the three-dimensional vector calculation means.

In a thirteenth aspect based on the eleventh aspect, the movement direction calculation means: converts the pointing position or the position specified based on the pointing position into a three-dimensional coordinate that represents a position, in the virtual three-dimensional space, corresponding to the pointing position or the position specified based on the pointing position; and calculates, as the movement direction of the movement object, a direction from a predetermined position in the virtual three-dimensional space toward the position that is represented by the three-dimensional coordinate.

According to the twelfth and thirteenth aspects, a pointing coordinate represented in a two-dimensional coordinate system is converted into a coordinate in a three-dimensional coordinate system, and then the movement object can be moved toward the coordinate represented in the three-dimensional coordinate system. Thus, a game with a greater sense of reality can be provided.

In a fourteenth aspect based on the eleventh aspect, the processing execution means repeatedly executes the processing executed by the movement direction calculation means and the object movement means, until a predetermined condition is met.

In a fifteenth aspect based on the fourteenth aspect, the processing execution means repeatedly executes the processing executed by the movement direction calculation means and the object movement means, every predetermined time.

In a sixteenth aspect based on the fourteenth aspect, the processing execution means includes accumulation means for accumulating the change amount of the pointing position. The processing execution means repeatedly executes the processing executed by the movement direction calculation means and the object movement means, every time an accumulated value of the change amount reaches a predetermined value.

According to the fourteenth to sixteenth aspects, a plurality of movement objects are consecutively moved at predetermined intervals, thereby enhancing the fun of the game.

In a seventeenth aspect based on the first aspect, the processing execution means includes: vector calculation means for calculating, based on the pointing position or the position specified based on the pointing position, a three-dimensional coordinate that represents a position, in a virtual three-dimensional space, corresponding to the pointing position or the position specified based on the pointing position, and calculating a vector having a start point at a predetermined position in the virtual three-dimensional space and an end point at the three-dimensional coordinate; and extension object drawing means for drawing an object extending in a direction, in the virtual three-dimensional space, along the vector calculated by the vector calculation means.

According to the seventeenth aspect, for example, an attack such as a laser beam can be expressed, thereby further enhancing the fun of the game.

In an eighteenth aspect based on the first aspect, the processing execution means includes vector calculation means, straight line extension means, and collision determination means. The vector calculation means calculates, based on the pointing position or the position specified based on the pointing position, a three-dimensional coordinate that represents a position, in a virtual three-dimensional space, corresponding to the pointing position or the position specified based on the pointing position, and calculates a vector that extends from a predetermined position in the virtual three-dimensional space toward the three-dimensional coordinate. The straight line extension means extends a straight line from the predetermined position in the virtual three-dimensional space along the vector calculated by the vector calculation means. The collision determination means determines whether or not a predetermined target object exists on the straight line extended by the straight line extension means. The processing execution means executes hit processing for the predetermined target object when it is determined by the collision determination means that the predetermined target object exists on the straight line.

According to the eighteenth aspect, a collision determination in the three-dimensional space can be easily performed, and a game with a greater sense of reality can be provided.

A nineteenth aspect of certain example embodiments is directed to a game apparatus for executing predetermined processing based on operation information that is obtained from an operating device for pointing to a position on a screen of a display device. The game apparatus includes pointing position calculation means, change amount calculation means, first determination means, and processing execution means. The pointing position calculation means repeatedly calculates a pointing position to which the operating device points, based on the operation information. The change amount calculation means calculates a change amount of the pointing position. The first determination means determines whether or not the change amount of the pointing position meets a first condition. When it is determined by the first determination means that the change amount of the pointing position meets the first condition, the processing execution means executes predetermined processing for the pointing position or a position specified based on the pointing position.

According to the nineteenth aspect, the same effect as that of the first aspect can be obtained.

According certain example embodiments, because a start point in the screen for the predetermined processing can be determined based on the change amount of the pointing position, it is possible to provide a game having a high degree of freedom of operability.

These and other objects, features, aspects and advantages will become more apparent from the following detailed description when taken in conjunction with the accompanying drawings.

BRIEF DESCRIPTION OF THE DRAWINGS

FIG. 3 is a perspective view of a controller 7 in FIG. 1 seen from a top rear side thereof;

FIG. 38 shows an example of a game screen in a second embodiment;

DETAILED DESCRIPTION

The following will describe an embodiment with reference to the drawings. It is noted that the present invention is not limited by the embodiment.

(Whole Configuration of Game System)

Figure 1:
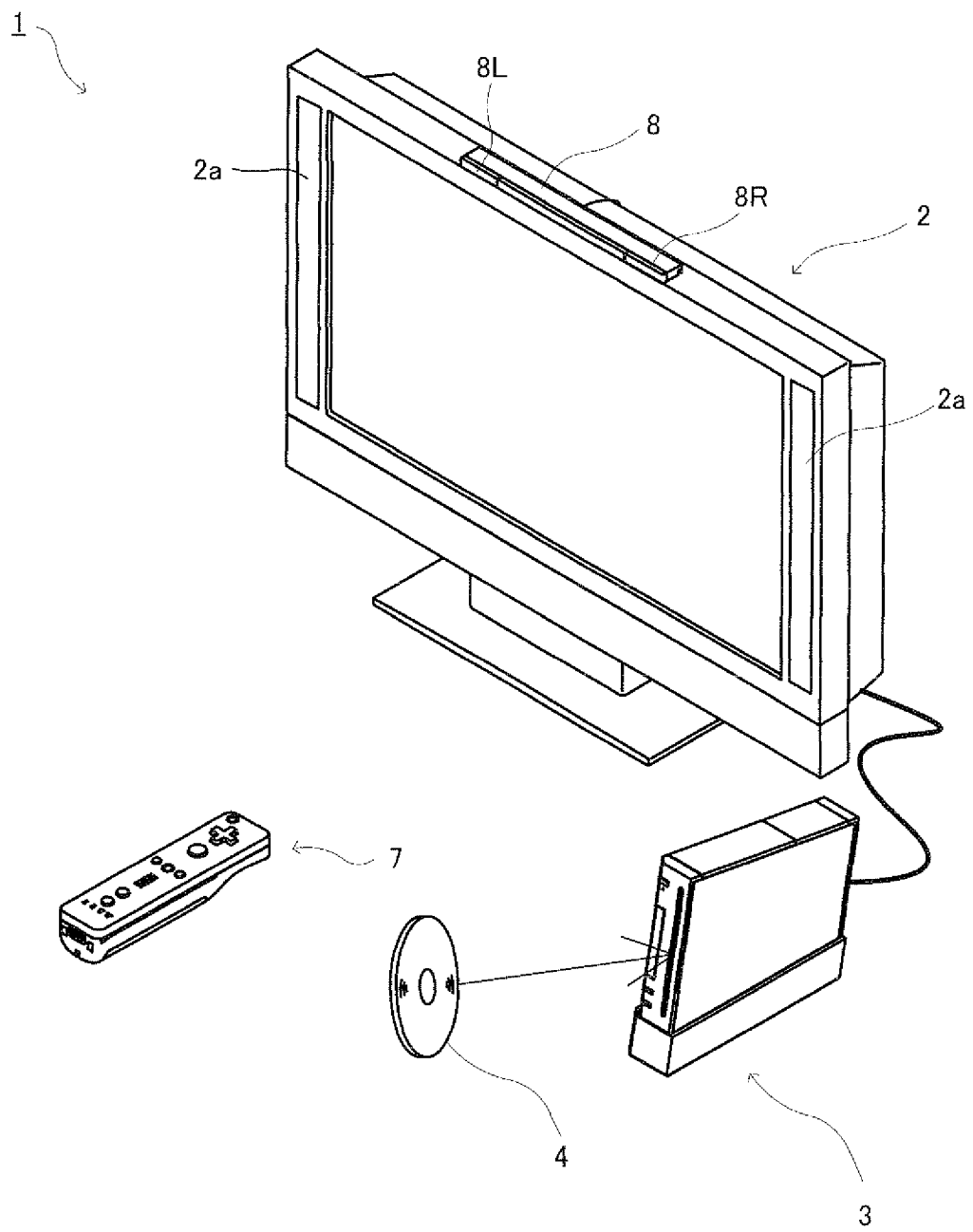
FIG. 1 is an external view of a game system 1 used in certain example embodiments.

A game system 1 including a game apparatus that is used in certain example embodiments will be described below with reference to FIG. 1. FIG. 1 is an external view of the game system 1. Hereinafter, the game system 1 using a stationary game apparatus will be used as an example, and the game apparatus and a game program according to the present embodiment will be described. As shown in FIG. 1, the game system 1 includes a television receiver (hereinafter, referred to merely as a television) 2, a game apparatus main body 3, an optical disc 4, a controller 7, and a marker section 8. The game system 1 executes game processing at the game apparatus main body 3 in accordance with a game operation using the controller 7.

The optical disc 4 as an example of an exchangeable information storage medium replaceably used with respect to the game apparatus main body 3 is detachably inserted in the game apparatus main body 3. The optical disc 4 stores a game program which is to be executed by the game apparatus main body 3. The game apparatus main body 3 has an insertion slot at its front surface. The game apparatus main body 3 reads and executes the game program stored in the optical disc 4 which is inserted in the insertion slot for executing the game processing.

The television 2 as an example of a display device is connected to the game apparatus main body 3 via a connection cord. The television 2 displays game images which are obtained as the result of the game processing executed by the game apparatus main body 3. The marker section 8 is mounted adjacent to the screen of the television 2 (on the upper surface of the screen in FIG. 1). The marker section 8 has a marker 8R and a marker 8L at its opposite ends, respectively. The marker 8R has one or more infrared LEDs which output infrared lights forward from the television 2. The marker 8L has the same configuration as the marker 8R. The marker section 8 is connected to the game apparatus main body 3, and the game apparatus main body 3 is capable of controlling illumination of each infrared LED of the marker section 8.

The controller 7 is an input device which provides the game apparatus main body 3 with operation data which indicates contents of an operation made to the controller 7. The controller 7 is connected to the game apparatus main body 3 by wireless communication. In the later-described embodiments, the technology of, for example, Bluetooth (registered trademark) is used for the wireless communication between the controller 7 and the game apparatus main body 3. It is noted that in an alternative embodiment, the controller 7 may be connected to the game apparatus main body 3 via a wire.

(Internal Configuration of Game Apparatus Main Body 3)

Figure 2:
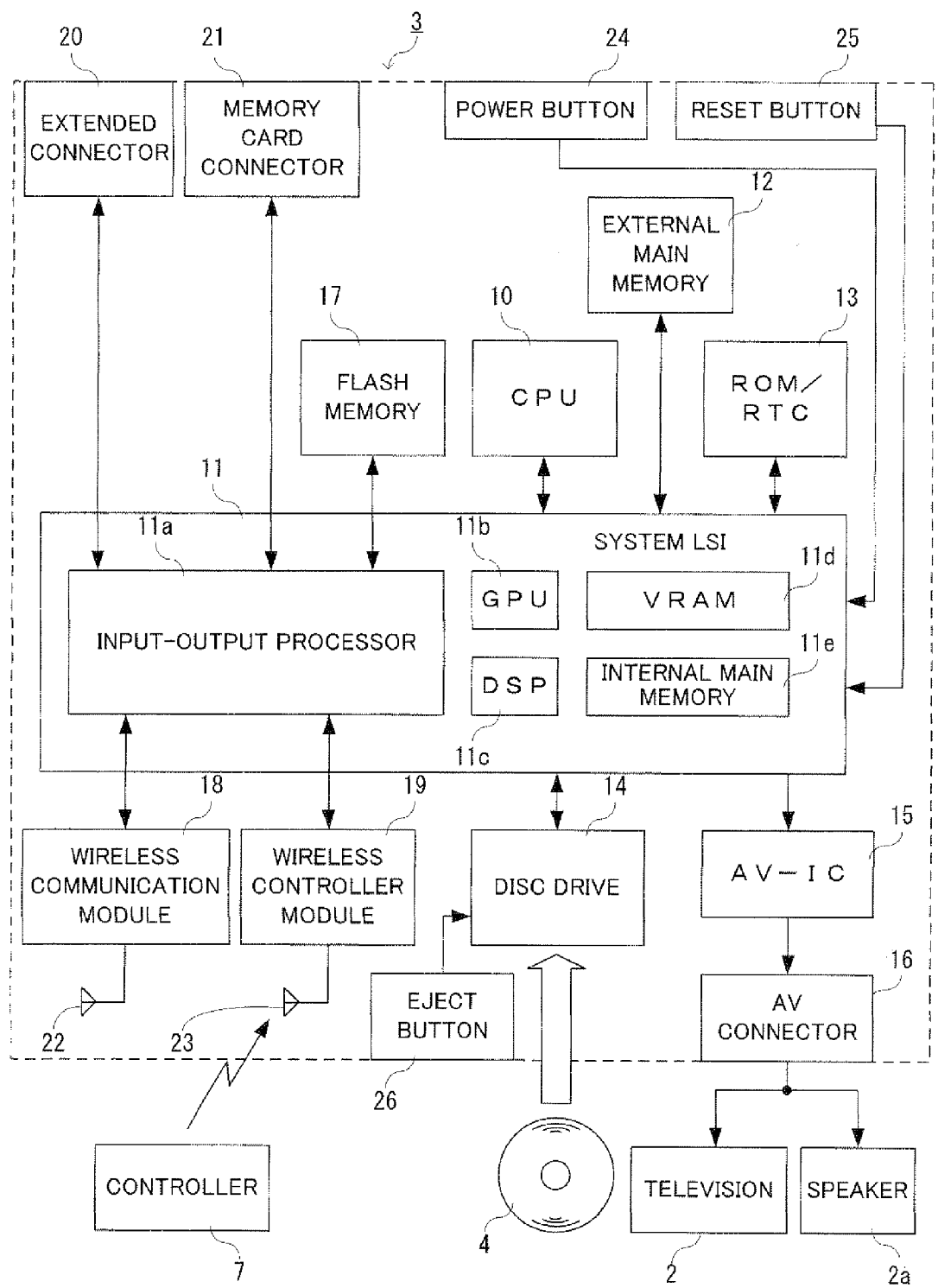
FIG. 2 is a functional block diagram of a game apparatus main body 3 in FIG. 1.

The following will describe an internal configuration of the game apparatus main body 3 with reference to FIG. 2. FIG. 2 is a block diagram showing a configuration of the game apparatus main body 3. The game apparatus main body 3 includes a CPU 10, a system LSI 11, an external main memory 12, a ROM/RTC 13, a disc drive 14, an AV-IC 15, and the like.

The CPU 10 executes the game processing by executing the game program stored in the optical disc 4, and functions as a game processor. The CPU 10 is connected to the system LSI 11. In addition, the external main memory 12, the ROM/RTC 13, the disc drive 14, and the AV-IC 15 are connected to the system LSI 11. The system LSI 11 performs processing such as control of data transfer between the system LSI 11 and each component connected to the system LSI 11, generation of an image to be displayed, obtaining data from an external device, and the like. An internal configuration of the system LSI 11 will be described later. The volatile external main memory 12 stores a program such as the game program read from the optical disc 4, a game program read from a flash memory 17, and the like, and various data, and is used as a work region and a buffer region for the CPU 10. The ROM/RTC 13 includes a ROM (so-called boot ROM) which stores a program for starting up the game apparatus main body 3, and a clock circuit (RTC: Real Time Clock) for counting time. The disc drive 14 reads program data and texture data from the optical disc 4, and writes these data into an internal main memory 11e, which will be described later, or the external main memory 12.

The system LSI 11 is provided with an input-output processor 11a, a GPU (Graphics Processor Unit) 11b, a DSP (Digital Signal Processor) 11c, a VRAM 11d, and the internal main memory 11e. Although not shown in the drawings, these components 11a to 11e are connected to each other via an internal bus.

The GPU 11b forms a part of drawing means, and generates an image according to a graphics command (command for generating graphics) from the CPU 10. More specifically, the GPU 11b performs computing processing required for displaying 3D graphics, for example, performs processing of coordinate conversion from 3D coordinates into 2D coordinates which is performed prior to rendering, and processing of rendering such as attaching texture, thereby generating game image data. In addition to the graphics command, the CPU 10 provides the GPU 11b with an image generation program required for generating the game image data. The VRAM 11d stores data, such as polygon data and texture data, which are required for the GPU 11b to execute the graphics command. In generating an image, the GPU 11d creates the image data using the data stored in the VRAM 11d.

The DSP 11c functions as an audio processor, and generates audio data using sound data and sound waveform (tone color) data which are stored in the internal main memory 11e and the external main memory 12. Like the external main memory 12, the internal main memory 11e stores a program and various data, and is used as a work region and a buffer region for the CPU 10.

The image data and the sound data generated thus are read by the AV-IC 15. The AV-IC 15 outputs the image data to the television 2 via an AV connector 16, and the sound data to speakers 2a built in the television 2. Thus, an image is displayed on the television 2, and sound is outputted from the speakers 2a.

The input-output processor (I/O process) 11a performs transmission and reception of data to and from each component connected to the input-output processor 11a, and downloads data from an external device. The input-output processor 11a is connected to the flash memory 17, a wireless communication module 18, a wireless controller module 19, an extended connector 20, and a memory card connector 21. An antenna 22 is connected to the wireless communication module 18, and an antenna 23 to the wireless controller module 19.

The input-output processor 11a is connected to a network via the wireless communication module 18 and the antenna 22, so that the input-output processor 11a is communicable with another game apparatus connected to the network and various servers connected to the network. The input-output processor 11a periodically accesses the flash memory 17 to detect whether there are data required to be transmitted to the network. If there are such data, the input-output processor 11a transmits the data to the network via the wireless communication module 18 and the antenna 22. The input-output processor 11a receives data transmitted from the other game apparatus and data downloaded from a download server via the network, the antenna 22 and the wireless communication module 18, and stores the received data in the flash memory 17. The CPU 10 reads the data stored in the flash memory 17 by executing the game program, and uses the data in the game program. In addition to the data transmitted or received between the game apparatus main body 3 and the other game apparatus and various servers, the flash memory 17 may store saved data (result data or midstream data of the game) of the game played using the game apparatus main body 3.

The input-output processor 11a receives operation data transmitted from the controller 7 via the antenna 23 and the wireless controller module 19, and stores (temporarily stores) the operation data in the buffer region of the internal main memory 11e or the external main memory 12.

In addition, the extended connector 20 and the memory card connector 21 are connected to the input-output processor 11a. The extended connector 20 is a connector for an interface such as USB and SCSI, and the communication with the network is enabled by connecting a medium such as an external storage medium, a peripheral device such as another controller, or a wired connector for communication to the extended connector 20 instead of the wireless communication module 18. The memory card connector 21 is a connector for connecting thereto an external storage medium such as a memory card. For example, the input-output processor 11a accesses the external storage medium via the extended connector 20 and the memory card connector 21 for storing data in the external storage medium and reading data from the external storage medium.

The game apparatus main body 3 is provided with a power button 24, a reset button 25, and an eject button 26. The power button 24 and the reset button 25 are connected to the system LSI 11. When the power button 24 is turned on, electric power is supplied to each component of the game apparatus main body 3 via an AC adaptor (not shown). In the state where the power has been turned on, the power button 24 is pressed to shift to a low power standby mode. Even in the low power standby mode, electric power is supplied to the game apparatus main body 3. Because electric power is always supplied to the game apparatus main body 3, the game apparatus main body 3 can be always connected to a network such as the Internet even in this state. For turning off the power once the power is turned on, the power button 24 is pressed for a predetermined period of time or longer. The reset button 25 is pressed to cause the system LSI 11 to restart a boot program of the game apparatus main body 3. The eject button 26 is connected to the disc drive 14. The eject button 26 is pressed to eject the optical disc 4 from the disc drive 14.

Figure 4:
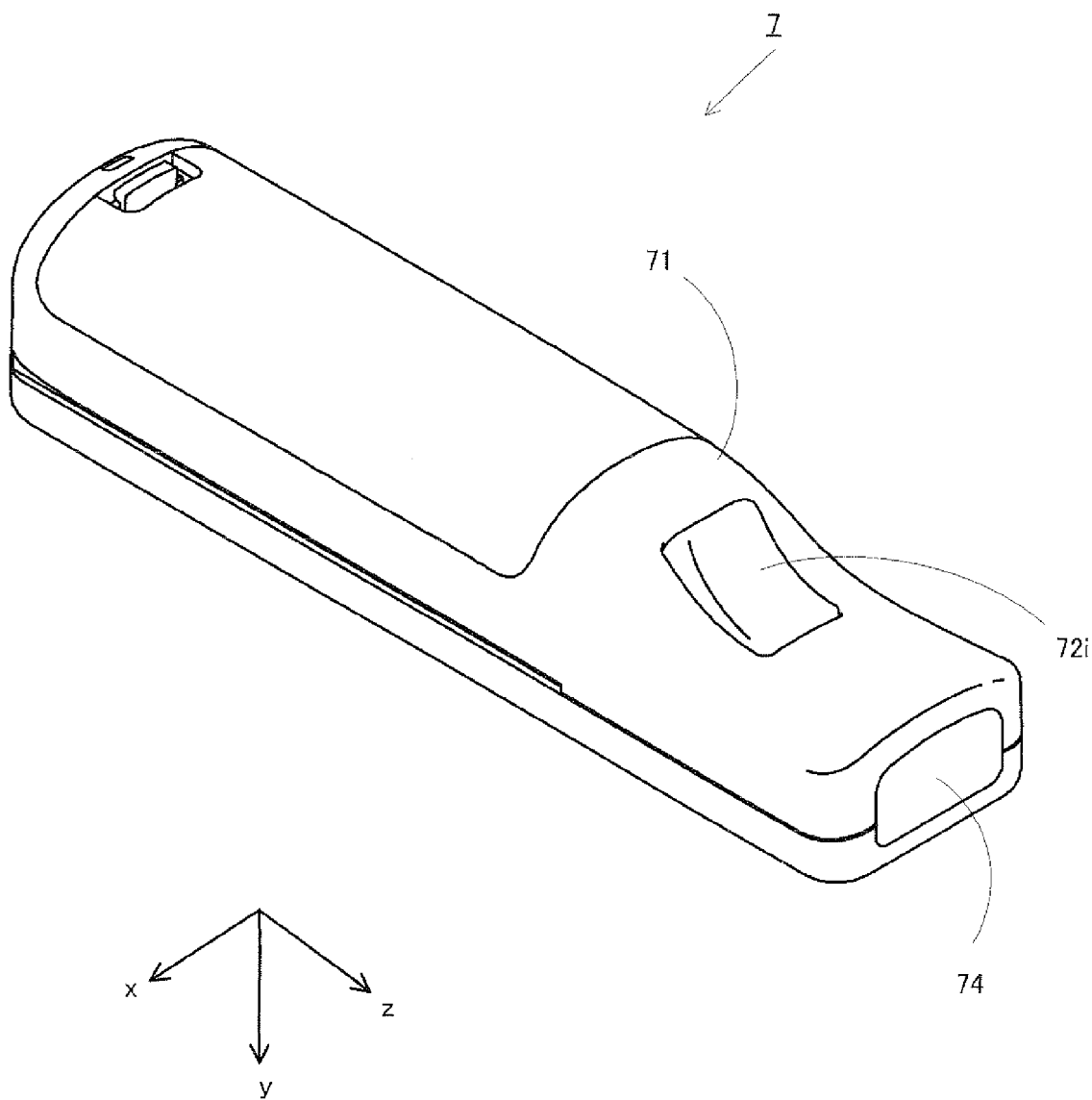
FIG. 4 is a perspective view of the controller 7 in FIG. 3 seen from a bottom front side thereof.

The following will describe the controller 7 with reference to FIGS. 3 and 4. FIG. 3 is a perspective view of the controller 7 seen from a top rear side thereof, and FIG. 4 is a perspective view of the controller 7 seen from a bottom front side thereof.

As shown in FIGS. 3 and 4, the controller 7 includes a housing 71 and an operation section 72 including a plurality of operation buttons which are provided on surfaces of the housing 71. The housing 71 of the present embodiment has a generally parallelepiped shape extending in a longitudinal direction from front to rear. The overall size of the housing 71 is small enough to be held by one hand of an adult or even a child, and, for example, the housing 71 is formed by plastic molding.

At the center of a front part of a top surface of the housing 71, a cross key 72*a* is provided. The cross key 72*a* is a cross-shaped four-direction push switch. The cross key 72*a* includes operation portions corresponding to four directions (front, rear, right and left), which are respectively located on cross-shaped projecting portions arranged at intervals of 90 degrees. A player selects one of the front, rear, right and left directions by pressing one of the operation portions of the cross key 72*a*. Through an operation of the cross key 72*a*, the player can, for example, indicate a direction in which a player object or the like appearing in a virtual game world is to move, or select an option from a plurality of options.

The cross key 72*a* is an operation section for outputting an operation signal in accordance with the above-described direction input operation performed by the player. Such an operation section may be provided in another form. For example, the cross key 72*a* may be replaced with an operation section which includes four push switches arranged in a square and which outputs an operation signal in accordance with the push button pressed by the player. In addition to the four push switches of the operation section, a center switch may be provided at the center of the four push switches to form a composite operation section including the four push switches and the center switch. Alternatively, the cross key 72*a* may be replaced with an operation section which includes an inclinable stick (or joystick) projecting from a top surface of the housing 71 and which outputs an operation signal in accordance with an inclining direction of the stick. Still alternatively, the cross key 72*a* may be replaced with an operation section which includes a disc-shaped and horizontally slidable member and which outputs an operation signal in accordance with a sliding direction of the disc-shaped member. Still alternatively, the cross key 72*a* may be replaced with a touch pad.

Behind the cross key 72*a* on the top surface of the housing 71, a plurality of operation buttons 72*b* to 72*g* are provided. The operation buttons 72*b* to 72*g* are each an operation section for, when the player presses a head thereof, outputting a corresponding operation signal. For example, functions as a number one button, a number two button and an A button are assigned to the operation buttons 72*b* to 72*d*, respectively. Also, functions as a minus button, a home button and a plus button are assigned to the operation buttons 72*e* to 72*g*, respectively. Operation functions are assigned to the operation buttons 72*b* to 72*g* in accordance with the game program executed by the game apparatus main body 3. In an exemplary arrangement shown in FIG. 3, the operation buttons 72*b* to 72*d* are arranged in a line at the center in a front-rear direction on the top surface of the housing 71. The operation buttons 72*e* to 72*g* are arranged on the top surface of the housing 71 in a line in a left-right direction between the operation buttons 72*b* and 72*d*. The operation button 72*f* has a top surface thereof buried in the top surface of the housing 71, so as not to be inadvertently pressed by the player.

In front of the cross key 72*a* on the top surface of the housing 71, an operation button 72*h* is provided. The operation button 72*h* is a power switch for turning on and off the power to the game apparatus main body 3 by remote control. The operation button 72*h* also has a top surface thereof buried in the top surface of the housing 71, so as not to be inadvertently pressed by the player.

Behind the operation button 72*c* on the top surface of the housing 71, a plurality of LEDs 702 are provided. Here, a controller type (number) is assigned to the controller 7 such that the controller 7 is distinguishable from the other controllers 7. The LEDs 702 are used for, for example, informing the player of the controller type which is currently set for the controller 7. More specifically, when the controller 7 transmits transmission data to the game apparatus main body 3, one of the plurality of LEDs 702 which corresponds to the controller type of the controller 7 is lit up.

On the top surface of the housing 71, a plurality of holes is provided between the operation button 72*b* and the operation buttons 72*e* to 72*g* for emitting sound from a speaker (a speaker 706 in FIG. 5), which will be described later, to the outside therethrough.

On a bottom surface of the housing 71, a recessed portion is formed. As described later in detail, the recessed portion is formed in a position in which an index finger or middle finger of the player is located when the player holds the controller 7 such that the front surface thereof faces the makers 8L and 8R. On a slope surface of the recessed portion, an operation button 72*i* is provided. The operation button 72*i* is an operation section functioning as, for example, a B button.

On a front surface of the housing 71, an image pickup element 743 constituting a part of an imaging information calculation section 74 is provided. The imaging information calculation section 74 is a system for analyzing image data of an image taken by the controller 7, thereby identifying an area having a high brightness in the image and detecting a position of a center of gravity, a size and the like of the area. The imaging information calculation section 74 has, for example, a maximum sampling period of about 200 frames/sec, and therefore can trace and analyze even a relatively fast motion of the controller 7. A configuration of the imaging information calculation section 74 will be described later in detail. On a rear surface of the housing 71, a connector 73 is provided. The connector 73 is, for example, an edge connector, and is used for engaging and connecting the controller 7 with a connection cable.

For giving a more specific description, a coordinate system set with respect to the controller 7 will be defined. As shown in FIGS. 3 and 4, mutually perpendicular x-axis, y-axis, and z-axis are defined with respect to the controller 7. More specifically, the longitudinal direction of the housing 71 or the front-rear direction of the controller 7 corresponds to z-axis, and the direction toward the front surface of the controller 7 (the surface in which the imaging information calculation section 74 is provided) is a positive direction of z-axis. The up-down direction of the controller 7 corresponds to y-axis, and the direction toward the top surface of the housing 71 (the surface on which the operation button 72*a* is provided) is a positive direction of y-axis. The left-right direction of the controller 7 corresponds to x-axis, and the direction toward the right side surface housing 71 (the side surface which is not shown in FIG. 3 but shown in FIG. 4) is a positive direction of x-axis.

Figure 5:
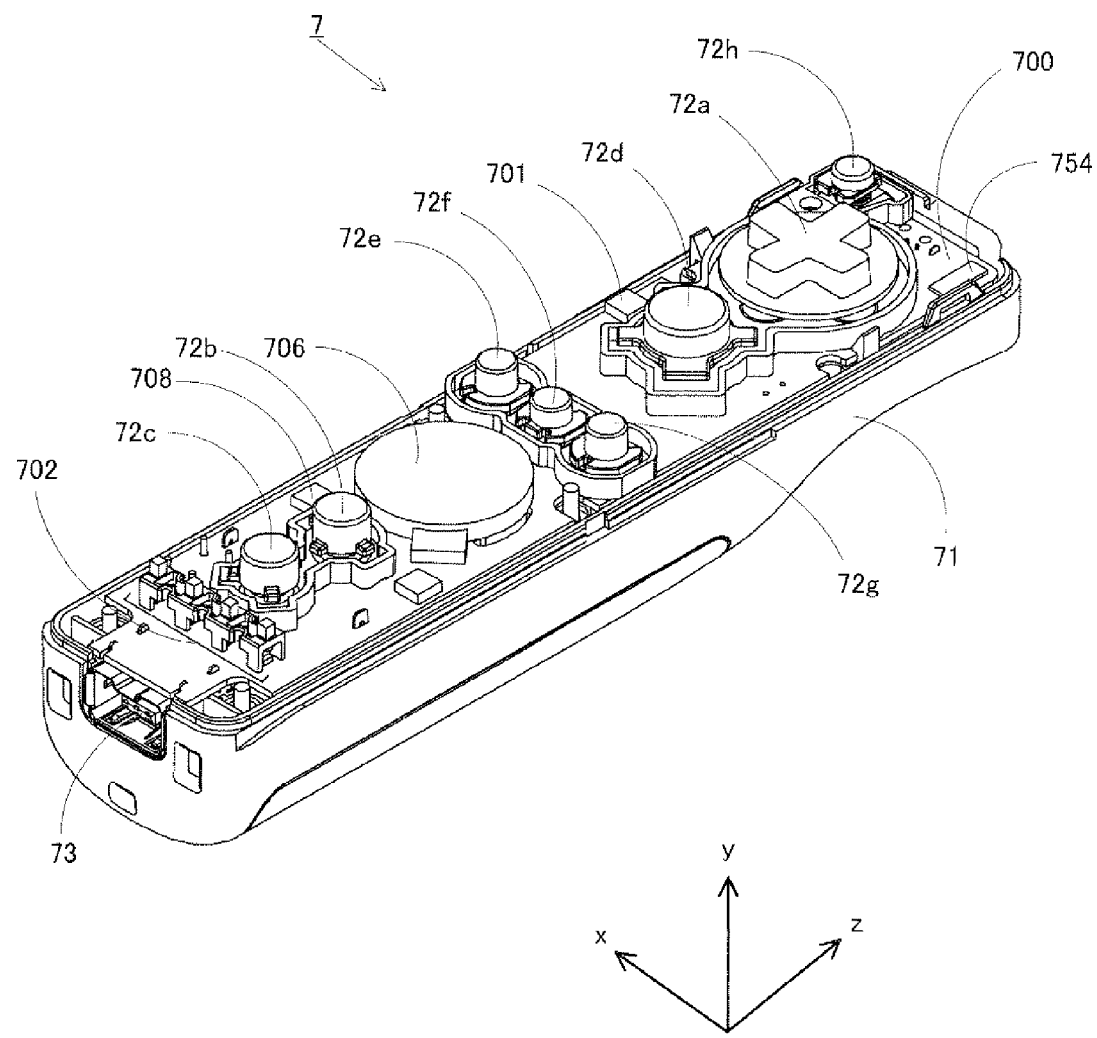
FIG. 5 is a perspective view showing a state where an upper housing of the controller 7 in FIG. 3 is removed.
Figure 6:
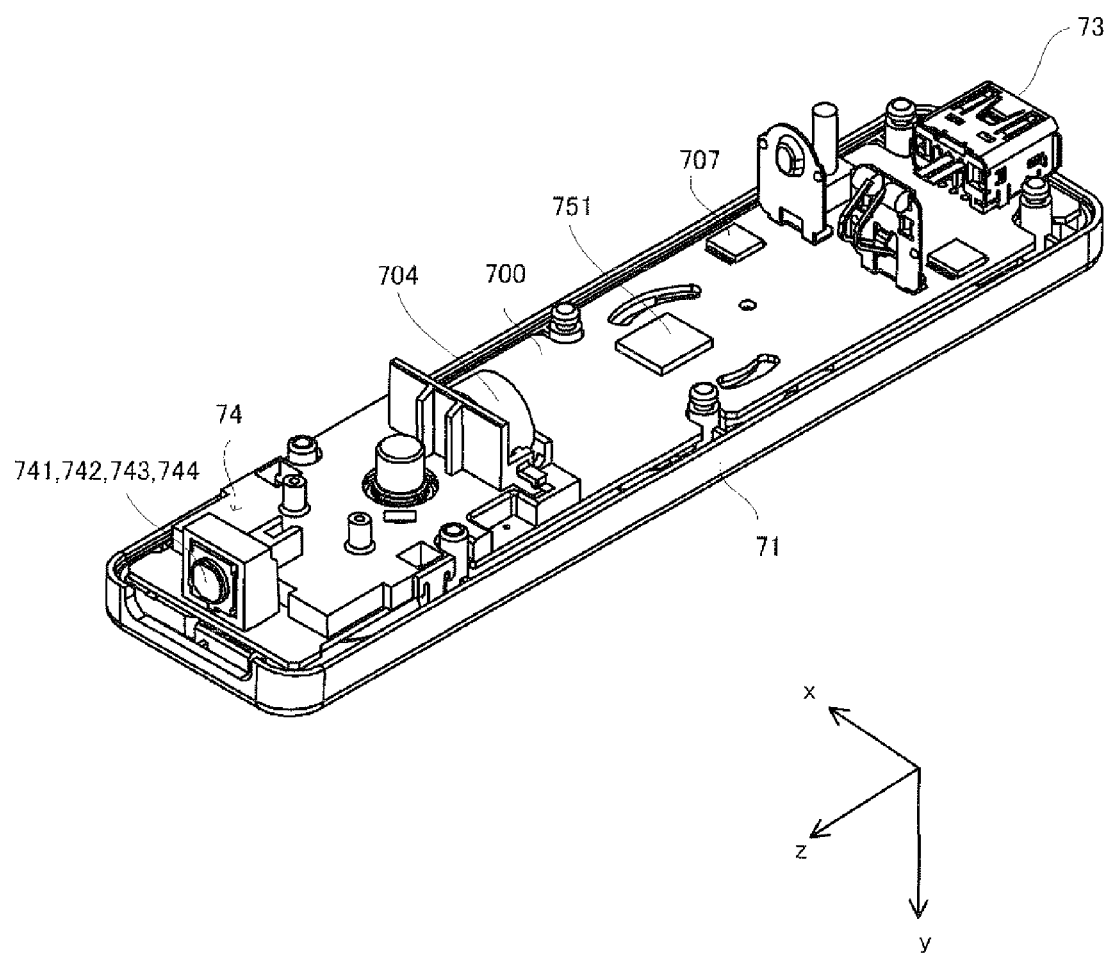
FIG. 6 is a perspective view showing a state where a lower housing of the controller 7 in FIG. 3 is removed.

The following will describe an internal structure of the controller 7 with reference to FIGS. 5 and 6. FIG. 5 is a perspective view showing a state where an upper housing (a part of the housing 71) of the controller 7 is removed as seen from a rear side thereof. FIG. 6 is a perspective view showing a state where a lower housing (a part of the housing 71) of the controller 7 is removed as seen from a front side thereof. FIG. 6 shows a reverse side of a substrate 700 shown in FIG. 5.

As shown in FIG. 5, the substrate 700 is fixed inside the housing 71. On a top main surface of the substrate 700, the operation buttons 72*a* to 72*h*, an acceleration sensor 701, the LEDs 702, and an antenna 754 are provided. These components are connected to a microcomputer 751, and the like (see FIGS. 6 and 7) by lines (not shown) formed on the substrate 700 and the like. The microcomputer 751 as an example of button data generation means used in certain example embodiments to generate operation button data in accordance with a type of the operation button 72*a* and the like. This function is a known technique, and achieved, for example, by the microcomputer 751 detecting contact/non-contact of the line by a switch mechanism such as a tact switch located below a keytop. More specifically, the operation button is pressed to contact with the line, thereby conducting a current therethrough. The microcomputer 751 detects which operation button the line, in which the current conduction occurs, leads to, and generates a signal in accordance with a type of the operation button.

The controller 7 functions as a wireless controller by a wireless module 753 (see FIG. 7) and the antenna 754. In the housing 71, a crystal oscillator (not shown) is provided for generating a basic clock of the microcomputer 751, which will be described later. On the top main surface of the substrate 700, the speaker 706 and an amplifier 708 are provided. The acceleration sensor 701 is provided on the left side of the operation button 72*d* on the substrate 700 (i.e. on the periphery of the substrate 700, not on the center thereof). The acceleration sensor 701 is capable of detecting acceleration included in a component caused by a centrifugal force in accordance with rotation of the controller 7 about the longitudinal direction thereof, in addition to change of direction of gravitational acceleration. Thus, the game apparatus main body 3 or the like can be sensitive enough to determine the rotation of the controller 7 from detected acceleration data using a predetermined calculation.

As shown in FIG. 6, at a front edge of a bottom main surface of the substrate 700, the imaging information calculation section 74 is provided. The imaging information calculation section 74 includes an infrared filter 741, a lens 742, the image pickup element 743 and an image processing circuit 744 which are located in this order from the front surface of the controller 7. These components are attached to the bottom main surface of the substrate 700. At a rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 by lines formed on the substrate 700 and the like, and outputs a sound signal to the speaker 706 via the amplifier 708 in accordance with the sound data transmitted from the game apparatus main body 3.

On the bottom main surface of the substrate 700, a vibrator 704 is attached. The vibrator 704 is, for example, a vibration motor or a solenoid. The vibrator 704 is connected to the microcomputer 751 by a line formed on the substrate 700 and the like, and actuated or unactuated in accordance with vibration data transmitted from the game apparatus main body 3. The controller 7 is vibrated by an actuation of the vibrator 704, and the vibration is conveyed to the player holding the controller 7. Thus, a so-called vibration-feedback game is realized. Because the vibrator 704 is located in the front portion of the housing 71, the housing 71 is vibrated substantially, and hence the player holding the controller 7 easily feels the vibration.

Figure 7:
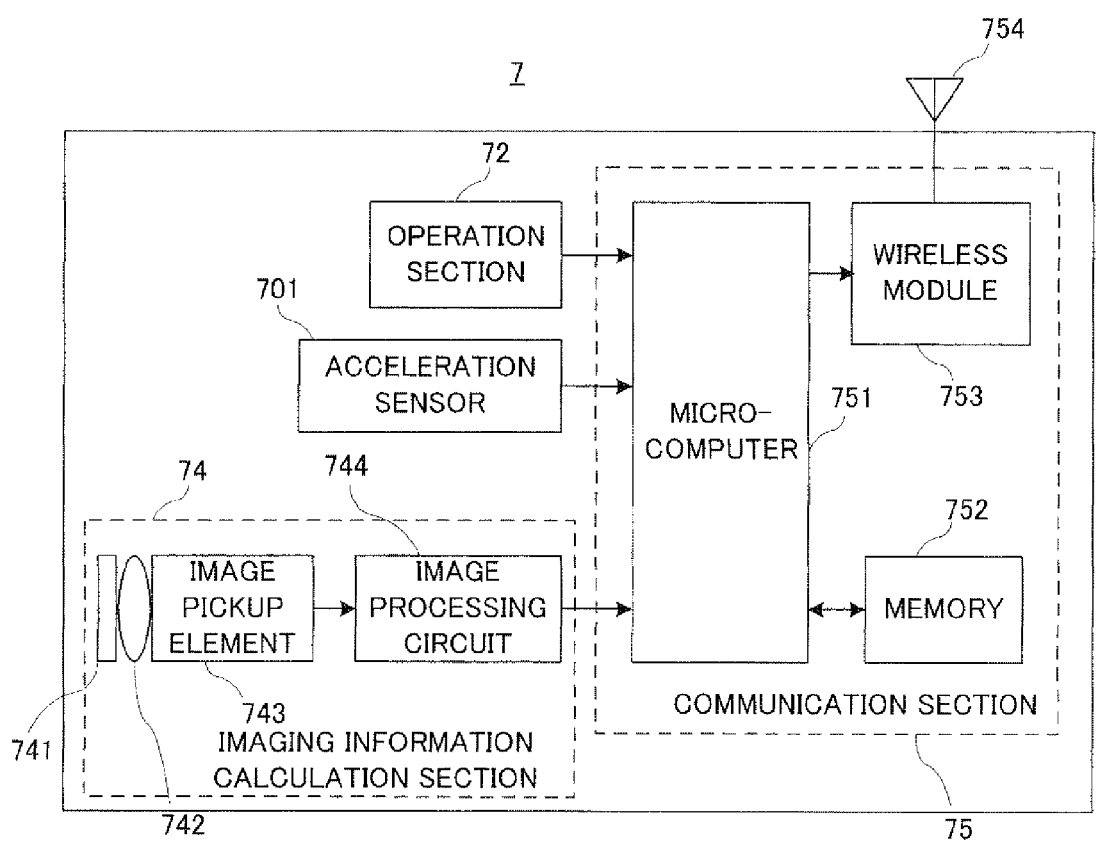
FIG. 7 is a block diagram showing a configuration of the controller 7 in FIG. 3.

The following will describe an internal constitution of the controller 7 with reference to FIG. 7. FIG. 7 is a block diagram showing an internal configuration of the controller 7.

As shown in FIG. 7, the controller 7 includes therein a communication section 75 in addition to the operation section 72, the imaging information calculation section 74, the acceleration sensor 701, the vibrator 704, the speaker 706, the sound IC 707, and the amplifier 708.

The imaging information calculation section 74 includes the infrared filter 741, the lens 742, the image pickup element 743, and the image processing circuit 744. The infrared filter 741 allows, among lights incident on the front surface of the controller 7, only an infrared light to pass therethrough. Here, the markers 8L and 8R located adjacent to the screen of the monitor 2 are infrared LED which output infrared lights forward from the television 2. Thus, by providing the infrared filter 741, images of the markers 8L and 8R can be more accurately taken. The lens 742 converges the infrared light which has passed through the infrared filter 741, and outputs the infrared light to the image pickup element 743. The image pickup element 743 is a solid-state image pickup element such as a CMOS sensor or a CCD. The image pickup element 743 takes an image of the infrared light collected by the lens 742. In other words, the image pickup element 743 takes an image of only the infrared light which has passed through the infrared filter 741. Then, the image pickup element 743 generates image data of the image. Hereinafter, an image taken by the image pickup element 743 is referred to as a taken image. The image data generated by the image pickup element 743 is processed by the image processing circuit 744. The image processing circuit 744 calculates a position of a target whose image is to be taken (the markers 8L and 8R) in the taken image. The following will describe a method for calculating the position of the target with reference to FIG. 8.

Figure 8:
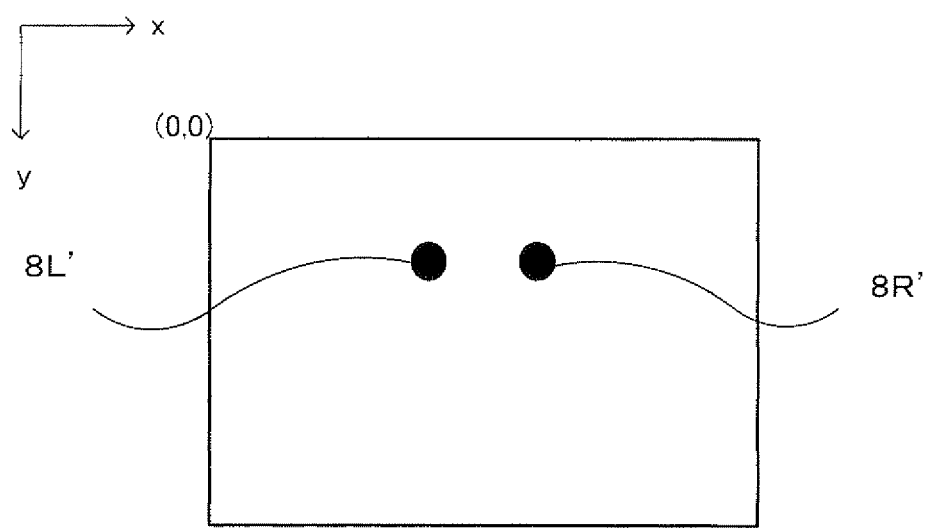
FIG. 8 is a view showing an example of a taken image.

FIG. 8 is a view showing an example of a taken image. In the taken image shown in FIG. 8, an image 8L' of the marker 8L and an image 8R' of the marker 8R are aligned side by side. When a taken image is inputted, the image processing circuit 744 calculates coordinates indicative of a position of each region, in the taken image, which meets a predetermined condition. Here, the predetermined condition is a condition for identifying an image of the target (an target image), and is specifically that a region (high brightness region) has a brightness of a predetermined value or larger and a size of a predetermined range or larger. The predetermined condition may be a condition for identifying the target, and in an alternative embodiment, the predetermined condition may include a condition regarding a color of an image.

When calculating a position of the target image, the image processing circuit 744 identifies the high brightness region as a candidate for the target image from the whole area of the taken image. This is because the target image appears as a high brightness region in image data of the taken image. Next, based on the size of the identified high brightness region, the image processing circuit 744 executes determination processing of determining whether or not the high brightness region is the target image. The taken image may include images other than the target image by sunlight incoming through a window and light from a fluorescent lamp in a room, in addition to the images 8L' and 8R' of the two markers 8L and 8R which are target images. In this case, the images other than the images 8L' and 8R' of the markers 8L and 8R appear as high bright regions. The above determination processing is processing for distinguishing the images 8L' and 8R' of the markers 8L and 8R, which are target images, from the other images, and accurately identifying the target images. Specifically, in the determination processing, whether or not the identified high bright region has a size of a predetermined range or smaller is determined. When the high bright region has a size of the predetermined range or smaller, it is determined that the high bright region indicates a target image. When the high bright region does not have a size of the predetermined range or smaller, it is determined that the high bright region indicates an image other than the target images.

Further, the image processing circuit 744 calculates a position of the high bright region which is determined to indicate a target image as the result of the determination processing. Specifically, the image processing circuit 744 calculates a position of the center of the high bright region. It is noted that the position of the center can be calculated on a scale smaller than the resolution of the image pickup element 743. Here, the resolution of an image taken by the image pickup element 743 is 126×96, and the position of the center is calculated on a scale of 1024×768. In other words, the coordinate of the position of the center is represented by integer values of (0,0) to (1024,768). As shown in FIG. 8A, a position in the taken image is represented by a coordinate system (xy coordinate system) whose origin is at the upper left corner of the taken image, whose y axis positive direction is the downward direction, and whose x axis positive direction is the rightward direction.

As described above, the image processing circuit 744 calculates a coordinate indicative of a position of each region, in the taken image, which meets the predetermined condition. Hereinafter, a coordinate calculated by the image processing circuit 744 is referred to as a marker coordinate. The marker coordinate is a coordinate indicative of the position of a target in a coordinate system for representing a position in a plane corresponding to the taken image. The image processing circuit 744 outputs the marker coordinate to the microcomputer 751 of the communication section 75. Data of the marker coordinate is transmitted as operation data by the microcomputer 751 to the game apparatus main body 3. Because the marker coordinate changes in accordance with the facing direction (orientation) and the position of the controller 7, the game apparatus main body 3 can calculate the facing direction and the position of the controller 7 using the coordinate values. It is noted that although the image processing circuit 744 and/or the microcomputer 751 of the controller 7 execute processing until calculating the marker coordinate from the taken image in the present embodiment, for example, the taken image may be transmitted to the game apparatus main body 3 and the CPU 10 of the game apparatus main body 3 may execute the same processing as the processing thereafter.

The controller 7 preferably includes a three-axis (x-axis, y-axis, and z-axis) acceleration sensor 701. The three-axis acceleration sensor 701 detects linear acceleration in three directions, i.e., an up-down direction, a left-right direction, and a front-rear direction. In an alternative embodiment, a two-axis accelerometer which detects only linear acceleration along each of the up-down direction and the left-right direction (the other pair of directions) may be used depending on the type of control signals used in the game processing. As a non-limiting example, the two-axis or three-axis acceleration sensor 701 may be of the type available from Analog Devices, Inc. or STMicroelectronics N.V. Preferably, the acceleration sensor 701 may be of electrostatic capacitance or capacitance-coupling type which is based on silicon micro-machined MEMS (microelectromechanical systems) technology. However, any other suitable accelerometer technology (e.g., piezoelectric type or piezoresistance type) now existing or later developed may be used to provide the two-axis or three-axis acceleration sensor 701.

As one skilled in the art understands, accelerometers, as used in the acceleration sensor 701, are only capable of detecting acceleration along a straight line (linear acceleration) corresponding to each axis of the acceleration sensor. In other words, the direct output of the acceleration sensor 701 is limited to signals indicative of linear acceleration (static or dynamic) along each of the one, two or three axes thereof. As a result, the acceleration sensor 701 cannot directly detect movement along a non-linear (e.g. arcuate) path, rotation, rotational movement, angular displacement, inclination, position, attitude or any other physical characteristic.

However, through processing by a computer such as the processor of the game apparatus (e.g. the CPU 10) or the processor of the controller 7 (e.g. the microcomputer 751) based on the linear acceleration signals outputted from the acceleration sensor 701, additional information relating to the controller 7 can be inferred or calculated, as one skilled in the art will readily understand from the description herein. For example, when the processing is performed by the computer on the assumption that the controller 7 provided with the acceleration sensor 701 is in static state (or when the processing is performed while only gravitational acceleration is detected by the acceleration sensor 701), if the controller 7 is actually in static state, the detected acceleration is used to determine whether or not the controller 7 is inclined relative to the direction of gravity or how many degrees the controller 7 is inclined relative to the direction of gravity. More specifically, when a state where the detection axis of the acceleration sensor 701 extends in a vertically-down direction is set as a standard state, it is possible to determine whether or not the controller 7 is inclined by determining whether 1G (gravitational acceleration) is applied in the direction of the detection axis of the acceleration sensor 701. It is also possible to determine how many degrees the controller 7 is inclined with respect to the vertically downward direction by determining the magnitude of the acceleration applied in the above detection axis direction. In addition, in the case of a multi-axis acceleration sensor, it is possible to determine in detail how many degrees each axis is inclined relative to the direction of gravity through processing of a signal of acceleration detected for each axis. In this case, a processor may perform processing based on the output from the acceleration sensor 701 for calculating inclination angle data of the controller 7. Alternatively, processing may be performed so as to infer rough inclination of the controller 7 based on the output from the acceleration sensor 701 without calculating the inclination angle data. As described above, the acceleration sensor 701 is used in combination with the processor to determine inclination, attitude or position of the controller 7. On the other hand, on the assumption that the acceleration sensor 701 is in dynamic state, the acceleration sensor 701 detects acceleration corresponding to motion of the acceleration sensor 701 in addition to a gravitational acceleration component. Thus, it is possible to determine the direction of the motion of the controller 7 by eliminating the gravitational acceleration component through predetermined processing. More specifically, various movements and/or positions of the controller 7 can be calculated or inferred through processing of the acceleration signal generated by the acceleration sensor 701 when the controller 7 provided with the acceleration sensor 701 is subjected to dynamic acceleration by the hand of the player. It is noted that even on the assumption that the acceleration sensor 701 is in dynamic state, it is possible to determine inclination of the controller 7 relative to the direction of gravity by eliminating acceleration corresponding to motion of the acceleration sensor 701 through predetermined processing. In an alternative embodiment, the acceleration sensor 701 may include an embedded signal processor or other type of a dedicated processor for performing any desired processing of the acceleration signals outputted from accelerometers therein prior to outputting signals to the microcomputer 751. For example, the embedded or dedicated processor could convert the detected acceleration signal into a corresponding tilt angle (or another suitable parameter) when the acceleration sensor 701 is intended to detect static acceleration (i.e., gravitational acceleration).

In an alternative embodiment, a gyro-sensor of any suitable technology incorporating, for example, a rotating or vibrating element may be used as a sensor for detecting motion of the controller 7. Exemplary MEMS gyro-sensors which may be used in this embodiment are available from Analog Devices, Inc. Unlike the linear acceleration sensor 701, a gyro-sensor is capable of directly detecting rotation (or angular rate) around an axis defined by the gyroscopic element (or elements) therein. Thus, due to the fundamental differences between a gyro-sensor and a linear acceleration sensor, corresponding changes need to be made to the processing operations which are performed on the output signals from these devices depending on which device is selected for a particular application.

Specifically, when a gyro-sensor is used instead of an acceleration sensor to calculate inclination and attitude, significant changes are necessary. More specifically, when a gyro-sensor is used, the value of inclination is initialized at the start of detection. Then, data on angular velocity which is outputted from the gyro-sensor is integrated. Furthermore, a change amount in inclination from the value of tile previously initialized is calculated. In this case, the calculated inclination is determined as a value corresponding to an angle. In contrast, when an acceleration sensor is used, inclination is calculated by comparing the value of the gravitational acceleration of each axial component with a predetermined reference. Therefore, the calculated inclination can be represented as a vector. Thus, without initialization, an absolute direction can be determined with an accelerometer. The type of the value calculated as an inclination is also very different between a gyro-sensor and an accelerometer; i.e., the value is an angle when a gyro-sensor is used and is a vector when an accelerometer is used. Therefore, when a gyro-sensor is used instead of an acceleration sensor, data on inclination also needs to be processed by a predetermined conversion that takes into account the fundamental differences between these two devices. Due to the fact that the nature of gyro-sensors is known to one skilled in the art, as well as the fundamental differences between accelerometers and gyro-sensors, further details are not provided herein. While gyro-sensors provide certain advantages due to their ability to directly detecting rotation, acceleration sensors are generally more cost-effective as compared with the gyro-sensors when used for the controller of the present embodiment.

The communication section 75 includes the microcomputer 751, a memory 752, the wireless module 753, and the antenna 754. The microcomputer 751 controls the wireless module 753 for wirelessly transmitting the transmission data while using the memory 752 as a storage area during processing. The microcomputer 751 controls the operations of the sound IC 707 and the vibrator 704 in accordance with the data which the wireless module 753 receives from the game apparatus main body 3 via the antenna 754. The sound IC 707 processes the sound data and the like transmitted from the game apparatus main body 3 via the communication section 75. The microcomputer 751 actuates the vibrator 704 in accordance with the vibration data (e.g. a signal for actuating or unactuating the vibrator 704) transmitted from the game apparatus main body 3 via the communication section 75.

Data from the controller 7 including an operation signal (key data) from the operation section 72, acceleration signals (acceleration data of directions of x-axis, y-axis, and z-axis which is hereinafter referred to merely as acceleration data) from the acceleration sensor 701, and the process result data from the imaging information calculation section 74 are outputted to the microcomputer 751. The microcomputer 751 temporarily stores the input data (the key data, the acceleration data, and the process result data) in the memory 752 as the transmission data which is to be transmitted to the wireless controller module 19. The wireless transmission from the communication section 75 to the wireless controller module 19 is performed periodically at a predetermined time interval. Because game processing is generally performed at a cycle of 1/60 sec., data needs to be collected and transmitted at a cycle of a shorter time period. Specifically, the game processing unit is 16.7 ms (1/60 sec.), and the transmission interval of the communication section 75 structured using the Bluetooth technology is 5 ms. At the transmission timing to the wireless controller module 19, the microcomputer 751 outputs the transmission data stored in the memory 752 as a series of operation information to the wireless module 753. The wireless module 753 uses, for example, the Bluetooth technology to modulate the operation data onto a carrier wave of a predetermined frequency and to radiate the resultant radio signal from the antenna 754. Thus, the key data from the operation section 72 provided in the controller 7, the acceleration data from the acceleration sensor 701, and the process result data from the imaging information calculation section 74 are modulated into the radio signal by the wireless module 753 and transmitted from the controller 7. The wireless controller module 19 of the game apparatus main body 3 receives the radio signal, and the game apparatus main body 3 demodulates or decodes the radio signal to obtain the series of operation information (the key data, the acceleration data, and the process result data). Based on the obtained operation information and the game program, the CPU 10 of the game apparatus main body 3 performs the game processing. In the case where the communication section 75 is structured using the Bluetooth technology, the communication section 75 can have a function of receiving transmission data which is wirelessly transmitted from another device.

Figure 9:
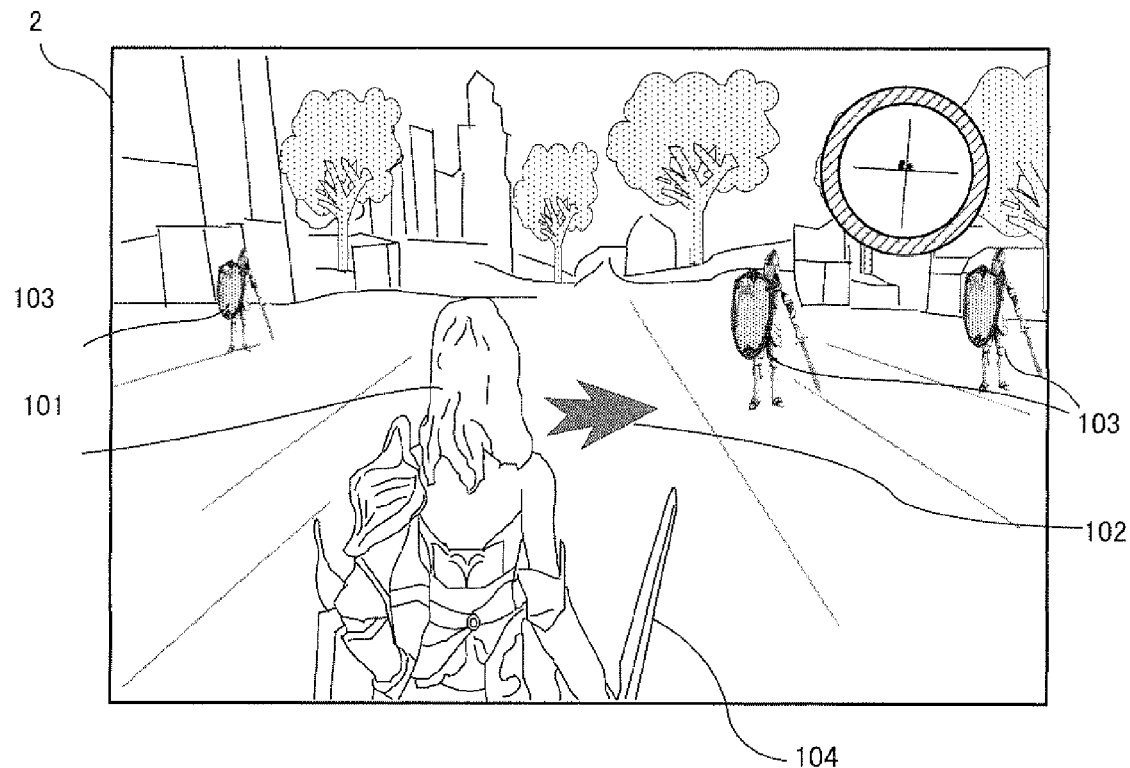
FIG. 9 shows an example of a game screen assumed in a first embodiment.

The following will describe an outline of a game according to a first embodiment with reference to FIGS. 9 to 27. The game according to the first embodiment is a sword-fighting game set in a virtual three-dimensional space. FIG. 9 shows an example of a game screen assumed in the first embodiment. As shown in FIG. 9, a player object 101, a cursor 102, enemy objects 103, and the like are displayed in the game screen. In the present game, the game screen is drawn based on a third person viewpoint for which a virtual camera is located behind the player object 101. The player object 101 holds a sword object 104. In the present game, the player object 101 defeats enemy objects 103 with the sword object 104.

Figure 10:
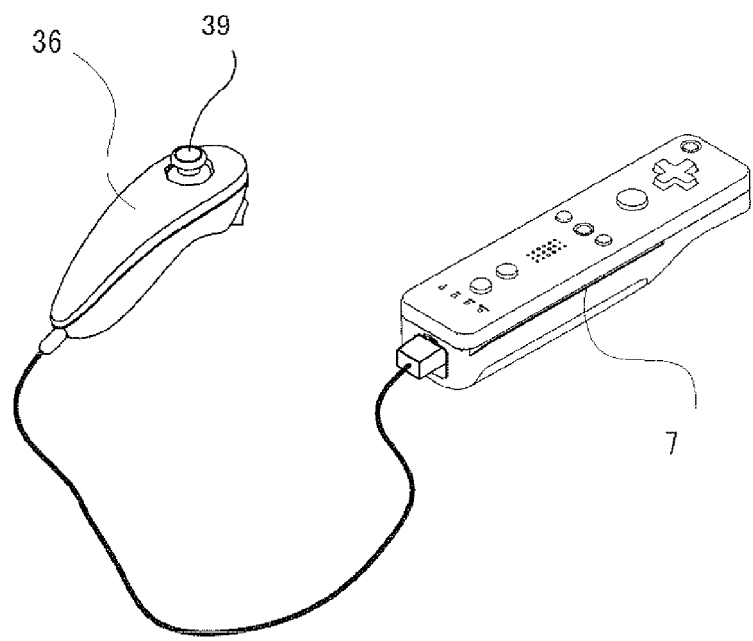
FIG. 10 is a view when an extended controller 36 is connected to a connector 73 of the controller 7.
Figure 11:
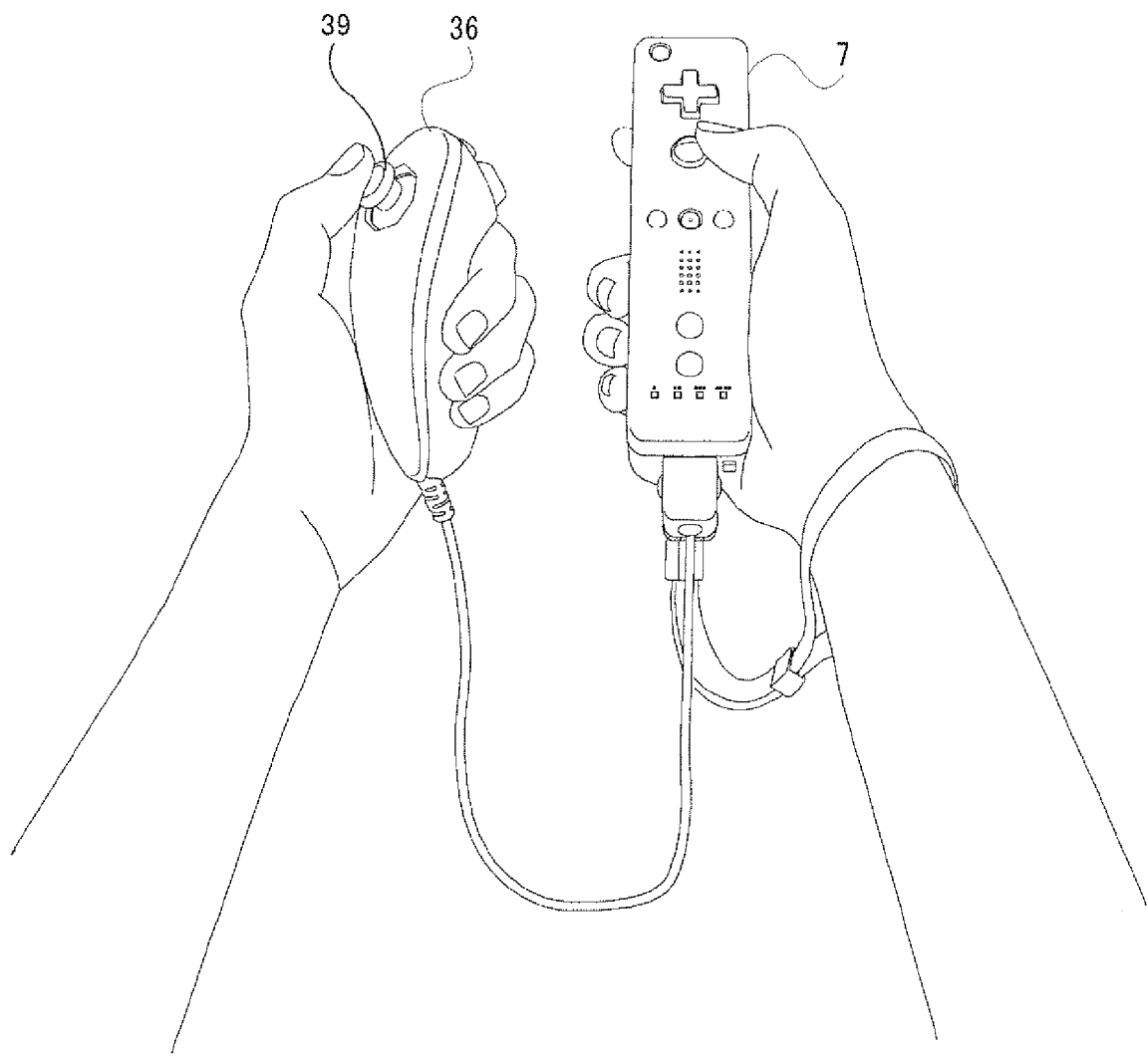
FIG. 11 is a view showing an example of a manner of holding the controller.
Figure 12:
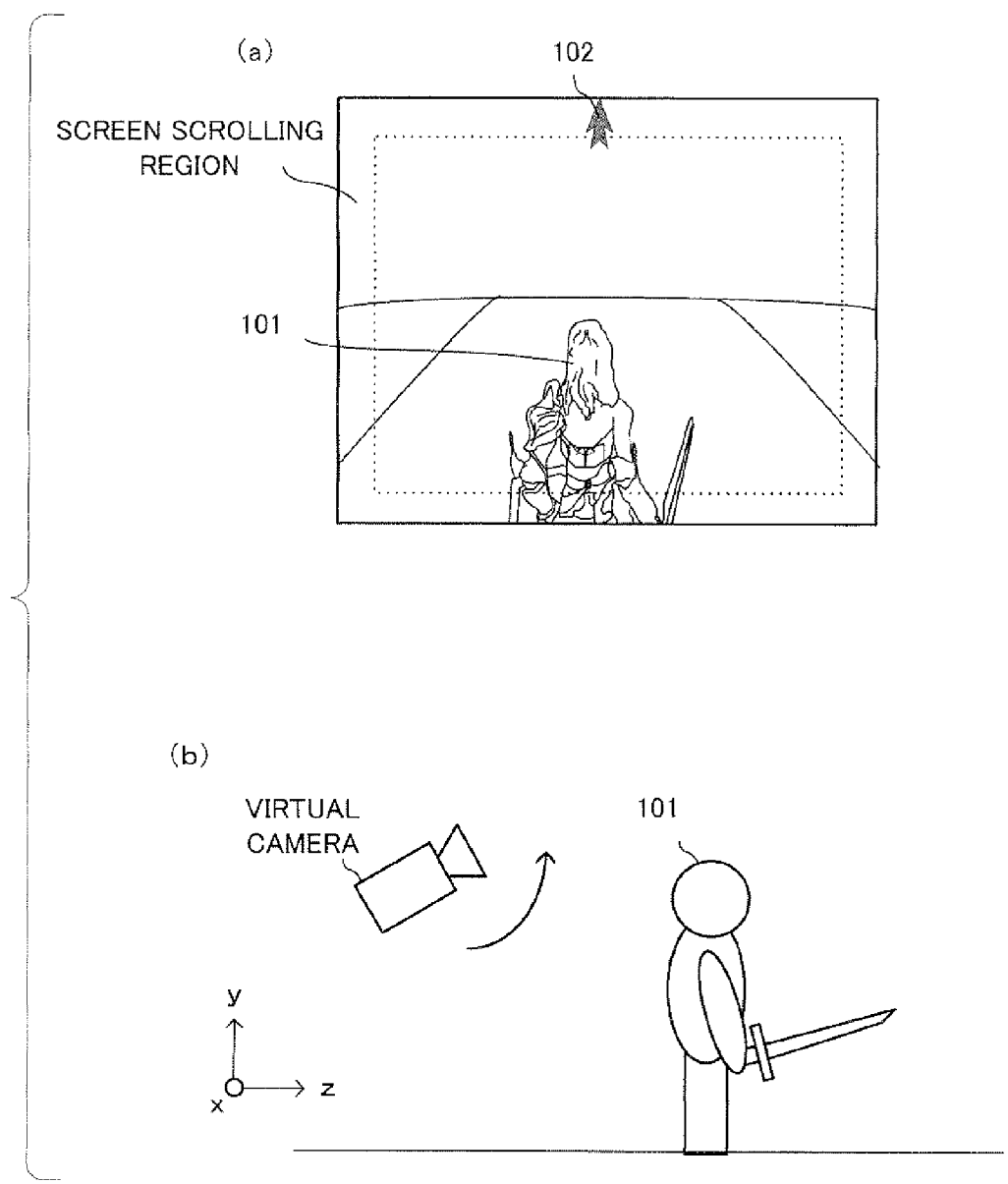
FIG. 12 is a view for explaining a screen scrolling operation.
Figure 13:
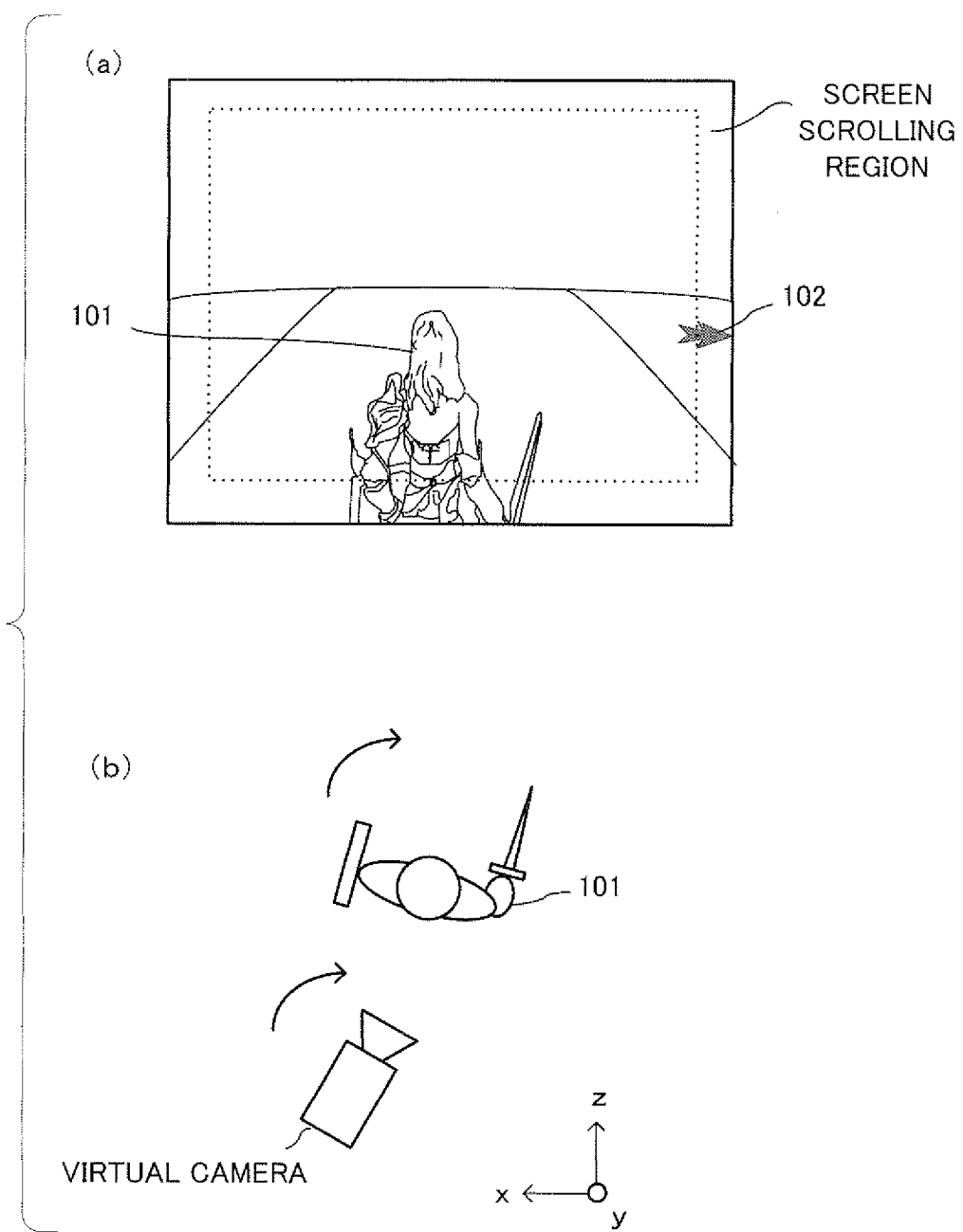
FIG. 13 is a view for explaining a screen scrolling operation.

The following will describe an operation in the present game. In the present game, as shown in FIG. 10, an operation for the player object 101 is performed in a state where an extended controller 36 is connected to the connector 73 of the controller 7. Here, the extended controller 36 includes an analog stick 39 capable of performing input in analog form. When playing the game, for example, as shown in FIG. 11, the player holds the controller 7 with a right hand and the extended controller 36 with a left hand. In this case, the player holds the controller 7 such that the front surface of the controller 7 (that is, a side having an entrance through which light is incident on the imaging information calculation section 74 taking an image of the light) held with the right hand faces the markers 8L and 8R. In this state, the player can perform a game operation by tilting the controller 7, changing a position in the screen to which the controller 7 points (a pointing position), or changing the distance between the controller 7 and each of the markers 8L and 8R. In the game of the present embodiment, an operation for moving the player object 101 is mainly performed with the extended controller 36 held with the left hand, and an operation for moving the cursor 102 and an operation for an attack with the sword object 104 is mainly performed with the controller 7 held with the right hand. Here, the present game is a sword-fighting game as described above, and an attack motion of the player object 101 is a motion of "cutting" the enemy object 103 with the sword object 104. Thus, hereinafter, an operation for an attack is referred to as a "cutting attack operation".

First, an operation for moving the player object 101 with the extended controller 36 will be described. When the player tilts the analog stick 39 of the extended controller 36, held with the left hand, in the upward direction, the player object 101 moves forward. When the player tilts the analog stick 39 in the downward direction, the player object 101 moves backward. When the player tilts the analog stick 39 in the rightward direction, the player object 101 moves horizontally rightward (moves rightward without changing the facing direction of the player object; e.g. a motion of rightward side stepping while facing forward). When the player tilts the analog stick 39 in the leftward direction, the player object 101 moves horizontally leftward.

Next, an operation with the controller 7 will be described. On the game screen, the cursor 102 is displayed at a position to which the controller 7 points (a pointing position). In the present embodiment, when the cursor 102 is moved at a speed less than a predetermined speed, a normal cursor moving operation by which the cursor is simply displayed at a pointing position can be performed. When the cursor 102 is moved to within a predetermined region adjacent to the periphery of the screen (hereinafter, referred to as a screen scrolling region), the facing direction of the virtual camera is changed in accordance with the position of the cursor 102, and the screen can be scrolled. For example, when the cursor 102 is moved to the upper end of the screen (within the screen scrolling region) as shown in FIG. 12(a), the facing direction of the virtual camera becomes upward. In other words, the virtual camera rotates about x-axis. As a result, the view line direction of the virtual camera becomes upward such that the virtual camera looks up, and drawing is made in this state.

Similarly, for example, as shown in FIG. 13(a), when the cursor 102 is moved to the right end of the screen, the virtual camera also turns right as shown in FIG. 13(b) (rotates clockwise about y-axis). In this case, the player object 101 turns rightward, and change of direction is possible. For example, when the cursor 102 is moved to the right end of the screen and stays at the position, it is possible to turn right in the virtual game space.

On the other hand, when the cursor 102 is moved at the predetermined speed or faster, a cutting attack operation is possible. In other words, by quickly moving the cursor 102 so as to pass through the enemy object 103 (e.g. from left to right), it is possible to perform an intuitive operation of "cutting" the enemy object 103.

Figure 14:
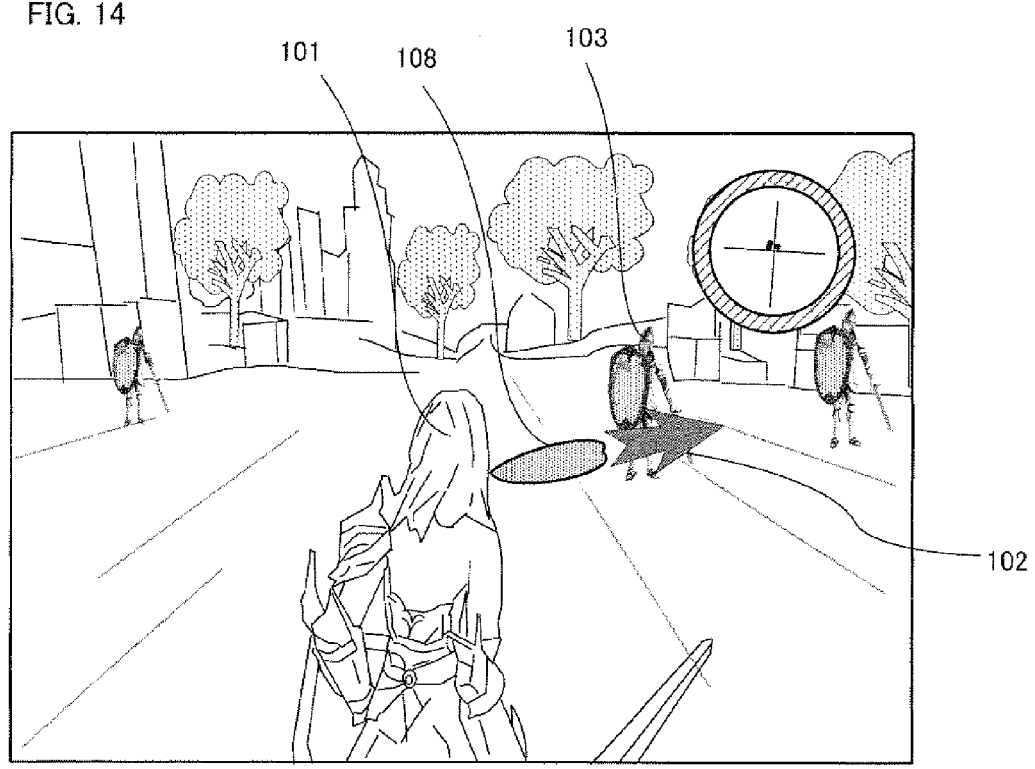
FIG. 14 is a view showing an example of a cutting attack operation.
Figure 15:
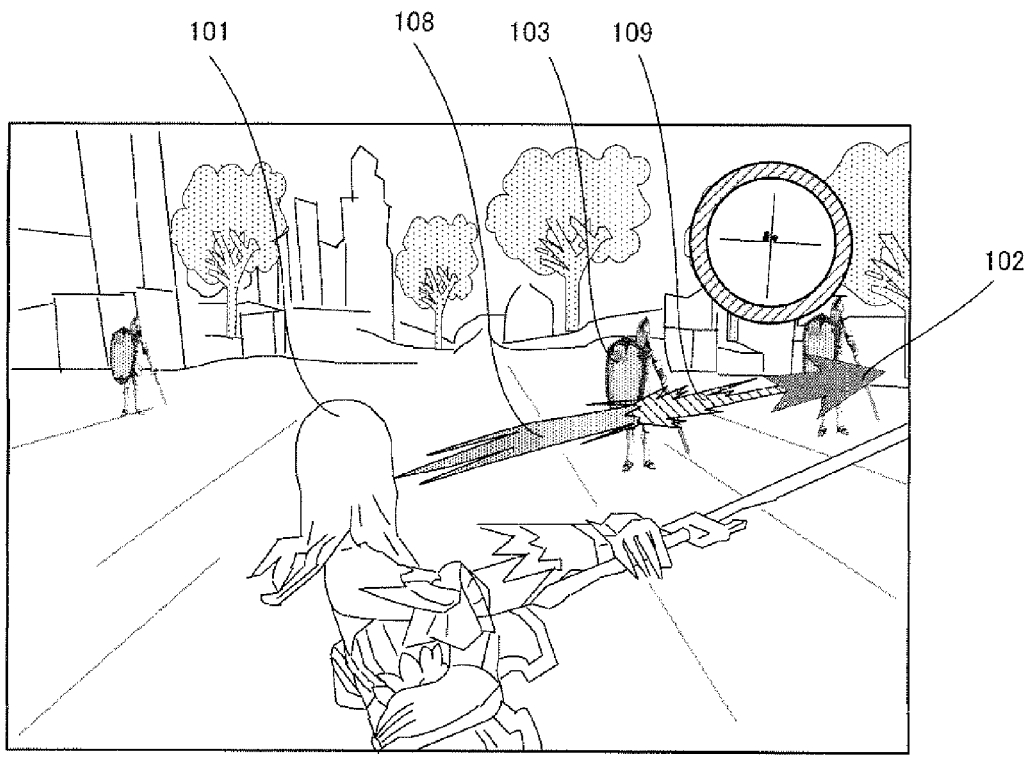
FIG. 15 is a view showing the example of the cutting attack operation.

The following will describe the cutting attack operation. As described above, when moving the cursor 102 at the predetermined speed or faster, a cutting attack operation is possible. FIGS. 14 and 15 show an example of a cutting attack operation. FIG. 14 shows a state immediately after the start of a cutting attack, in which the cursor 102 is being moved at the predetermined speed or faster. In FIG. 14, a cutting attack trajectory 108 indicative of a trajectory of the cutting attack starts to be displayed. FIG. 15 shows a state during the cutting attack, in which the cutting attack hits an enemy object 103. A hit effect 109 which is prepared in advance is drawn so as to be superimposed on a part of the cutting attack trajectory 108 which extends rightward from the position where the cutting attack hits the enemy object 103, thereby indicating that the cutting attack hits the enemy object 103.

The following will describe a principle of processing for a cutting attack operation (hereinafter, referred to merely as cutting attack processing). In the present embodiment, a change amount of the pointing position (the displayed position of the cursor 102) of the controller 7 (namely, a moving amount of the cursor 102) per a predetermined unit time, specifically, per one-frame period (1/60 sec.) is calculated. When the change amount is less than a predetermined value, processing regarding the above normal cursor moving operation or screen scrolling is executed. When the change amount is equal to or larger than the predetermined value, the cutting attack processing is executed.

FIGS. 16 to 23 are views for explaining the principle of the cutting attack processing, and show a shift of the pointing position per one-frame period. In these figures, black points indicate current pointing positions, and shaded points indicate pointing positions detected previously. Star signs indicate the start position of a cutting attack (hereinafter, referred to as a cutting attack start point), and triangles indicate the end position of the cutting attack (hereinafter, referred to as a cutting attack end point).

Figure 16:
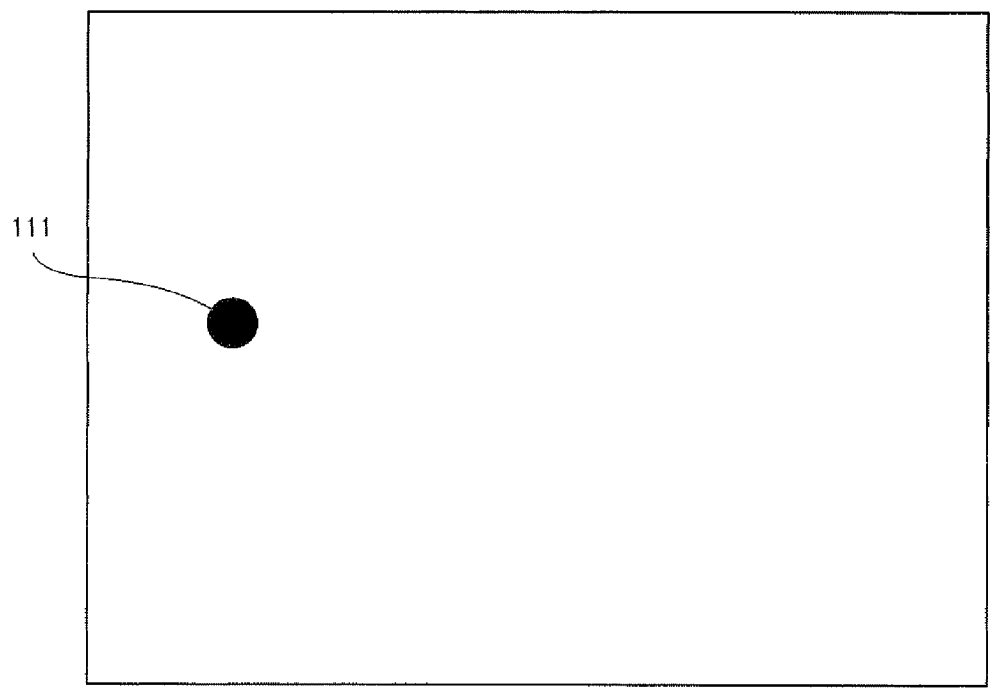
FIG. 16 is a view for explaining a principle of processing for a cutting attack operation.
Figure 17:
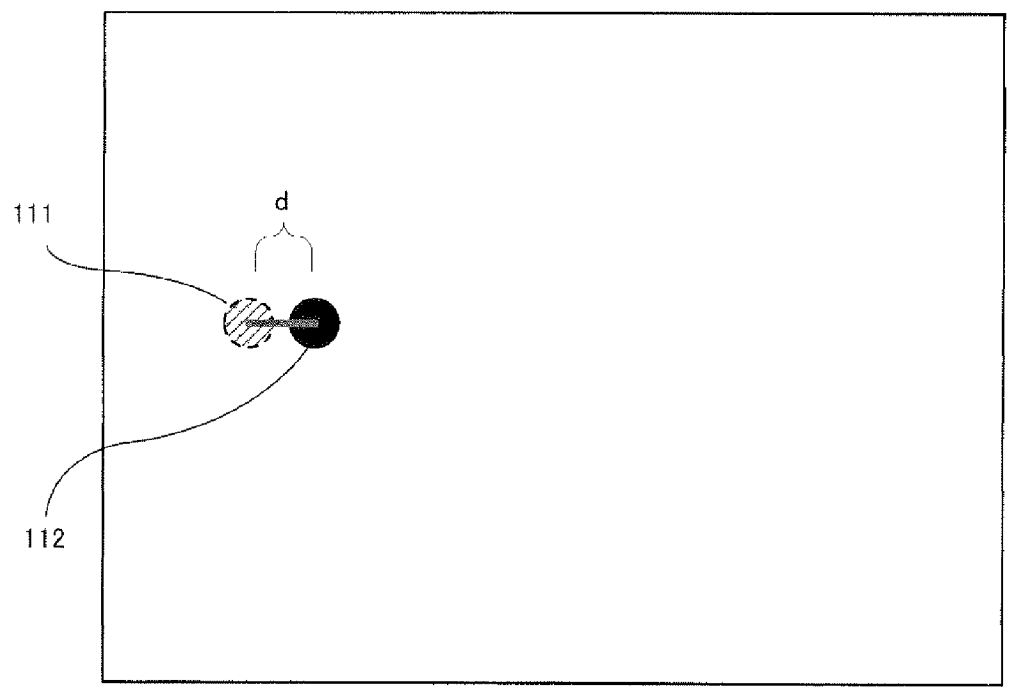
FIG. 17 is a view for explaining the principle of processing for a cutting attack operation.

As an initial state, a position indicated by a point 111 in FIG. 16 is pointed to. A state after one frame from this state is assumed to be a state shown in FIG. 17. In FIG. 17, a point 112 located at the current pointing position and the point 111 located at the pointing position at one frame before are shown. The change amount from the point 111 to the point 112, for example, a distance d (which can be calculated based on the coordinates of both pointing positions), is assumed to be less than a first predetermined value. In this case, the normal cursor moving operation is executed, or the above processing of scrolling the screen is executed if the current pointing position is within the screen scrolling region (in the example of FIG. 17, the virtual camera slightly rotates rightward).

Figure 18:
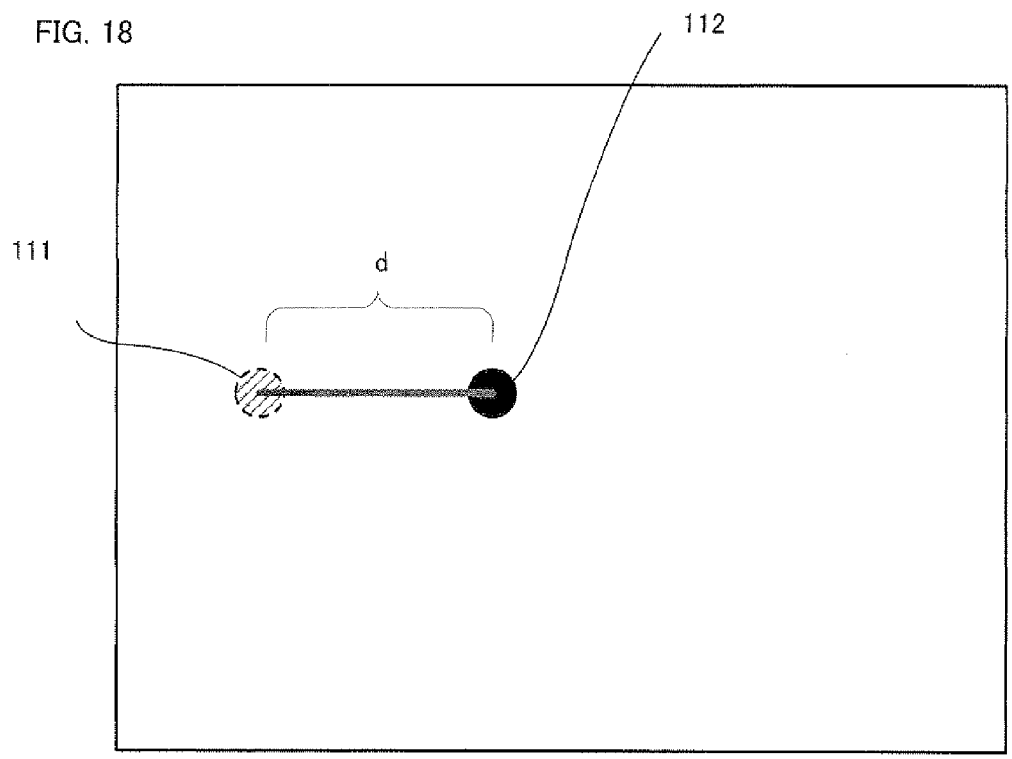
FIG. 18 is a view for explaining the principle of processing for a cutting attack operation.
Figure 19:
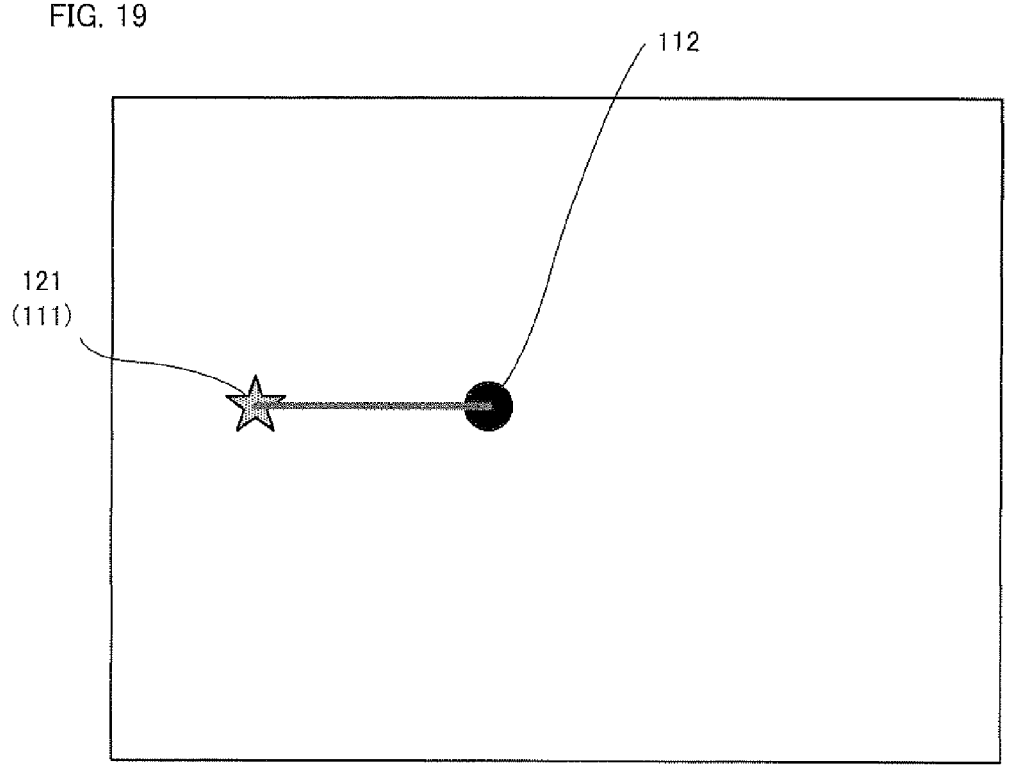
FIG. 19 is a view for explaining the principle of processing for a cutting attack operation.

On the other hand, the state after one frame from the state in FIG. 16 is assumed to be a state shown in FIG. 18. In FIG. 18, the distance d from the point 111 located at the pointing position at one frame before to a point 112 located at the current pointing position is assumed to be equal to or larger than the first predetermined value. In other words, a state where it is detected that the change amount is equal to or larger than the first predetermined value is assumed. In this case, the cutting attack processing is executed. In the cutting attack processing, the start point of a cutting attack is set. Specifically, the point 111 at one frame before is set as a cutting attack start point 121 as shown in FIG. 19. A trajectory from the cutting attack start point 121 to the point 112 is calculated, and drawing of a cutting attack trajectory and hit determination processing for an enemy object 103 is executed based on the trajectory.

Figure 20:
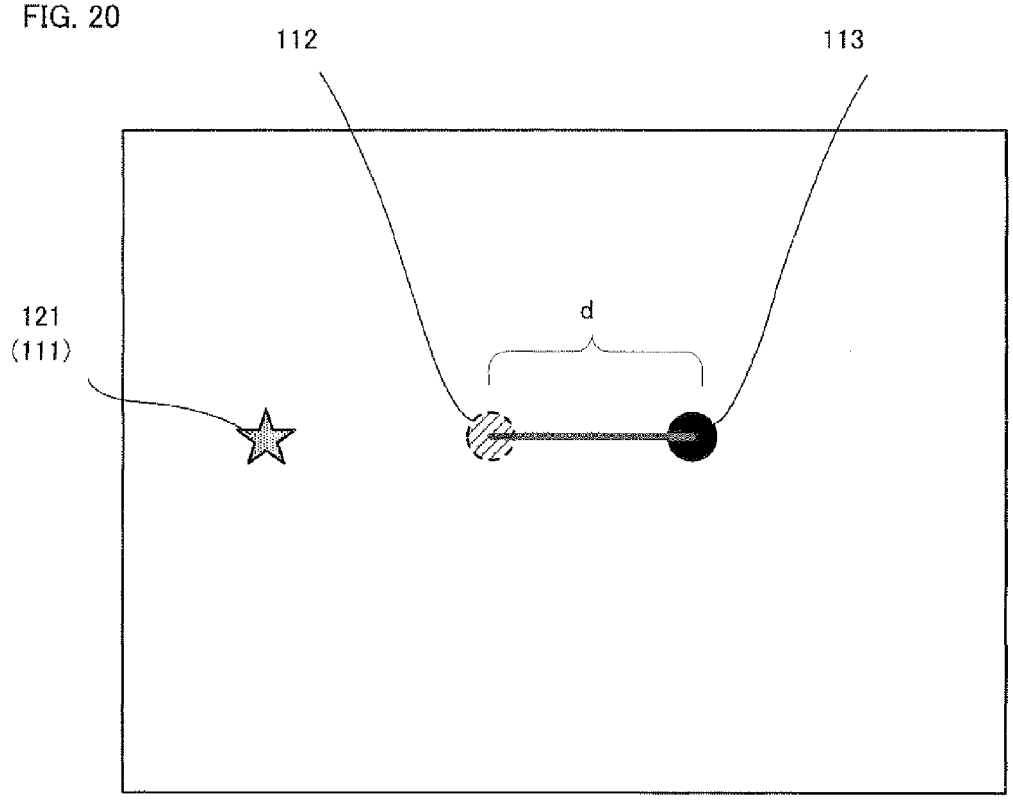
FIG. 20 is a view for explaining the principle of processing for a cutting attack operation.
Figure 21:
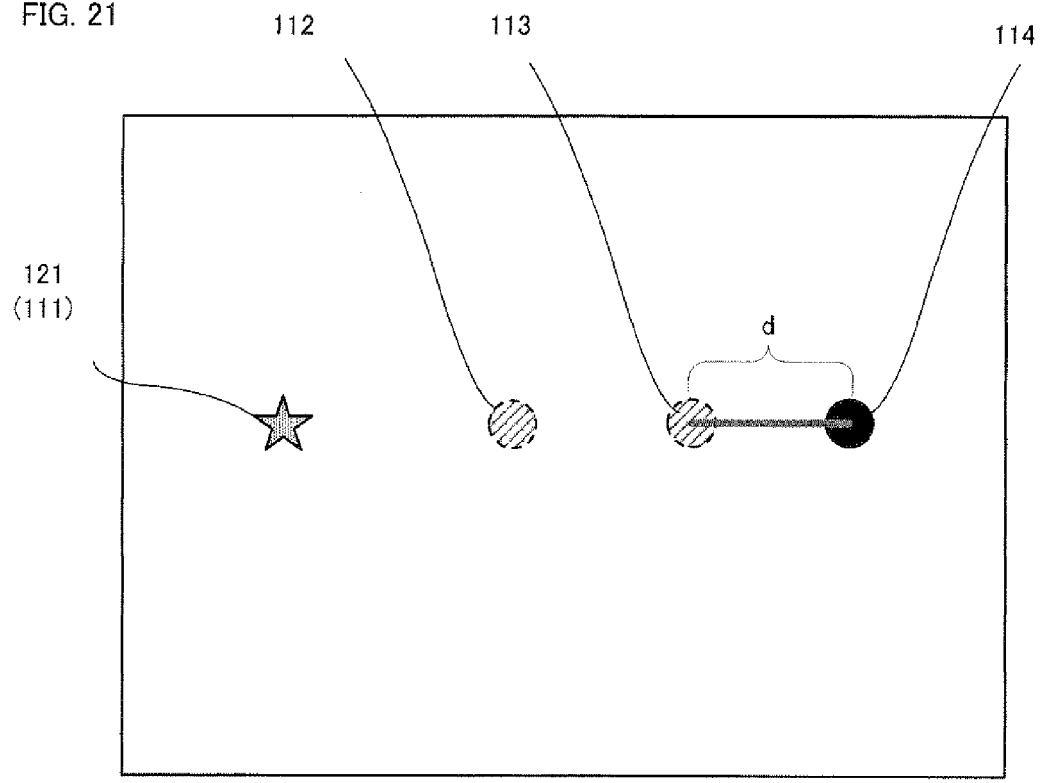
FIG. 21 is a view for explaining the principle of processing for a cutting attack operation.

Then, at every one frame, the distance d between the current pointing position and the pointing position at the last frame is calculated, and as shown in FIGS. 20 and 21, the above drawing of the cutting attack trajectory and the hit determination processing are continuously executed as long as the distance d is larger than a second predetermined value.

Figure 22:
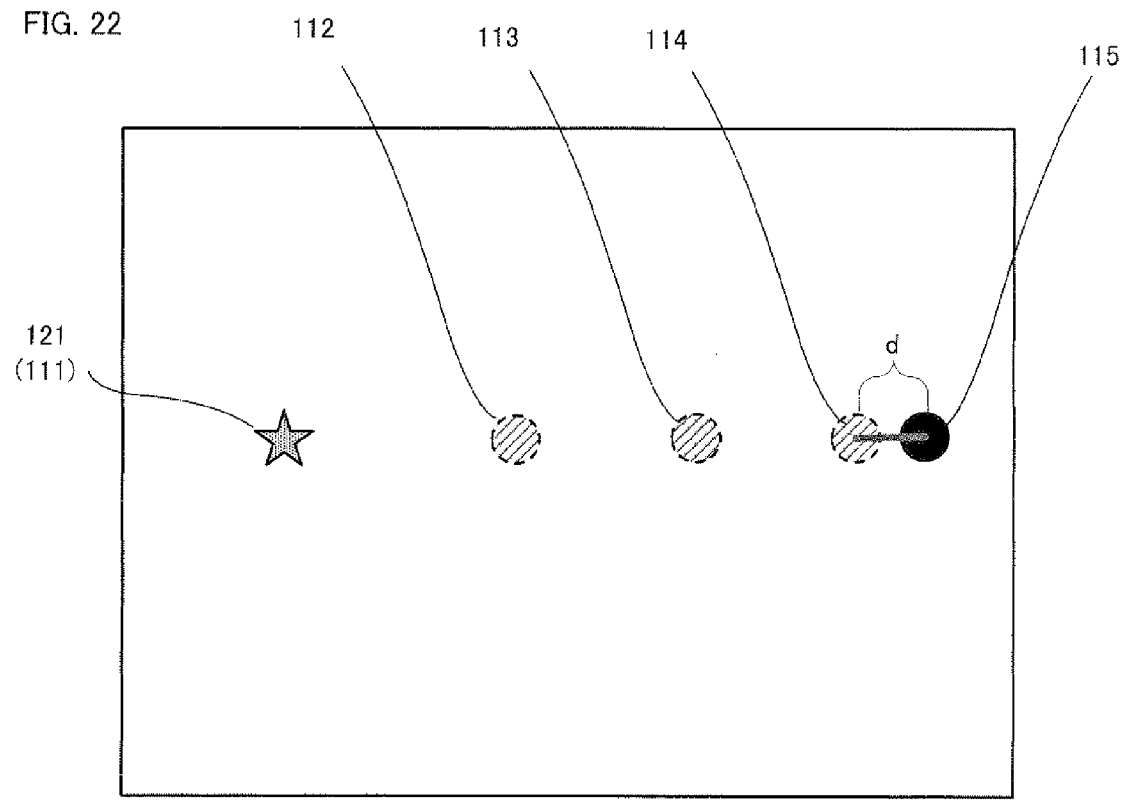
FIG. 22 is a view for explaining the principle of processing for a cutting attack operation.
Figure 23:
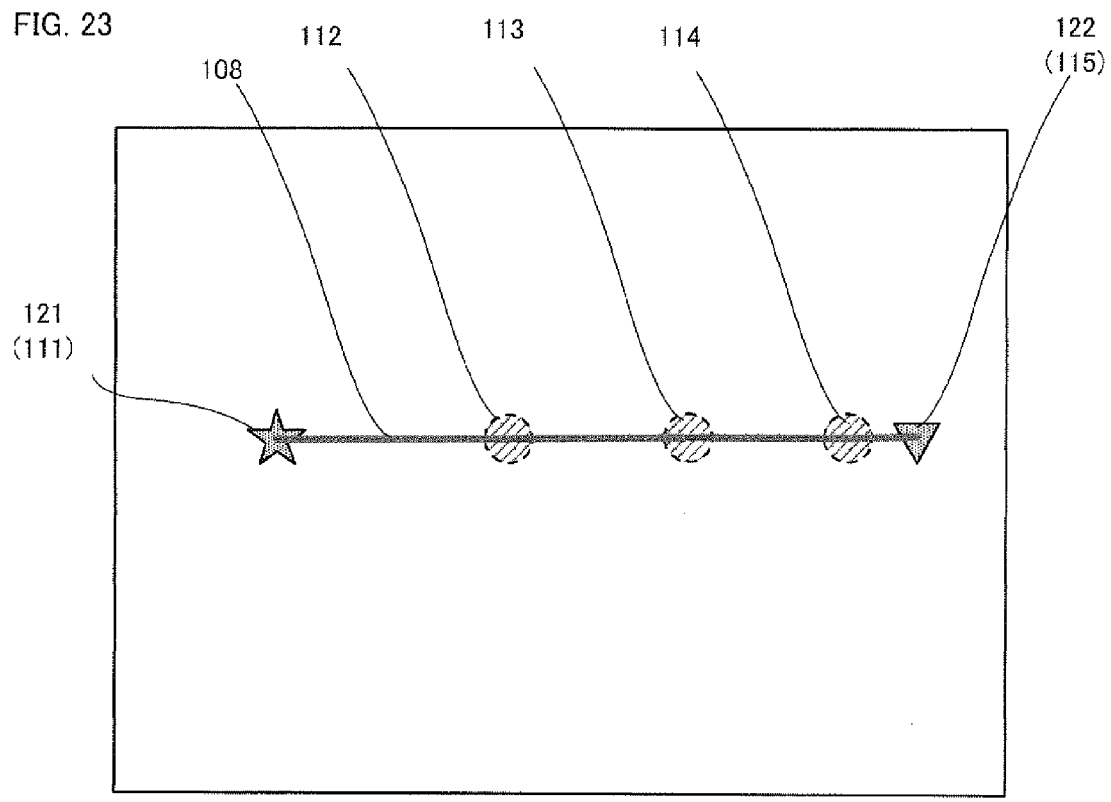
FIG. 23 is a view for explaining the principle of processing for a cutting attack operation.

Then, when the distance d between a point 115 located at the current pointing position and a point 114 located at the pointing position at one frame before becomes equal to or less than the second predetermined value after the cutting attack start point 121 is determined as shown in FIG. 22, the point 115 located at the current pointing position is set as a cutting attack end point 122 as shown in FIG. 23. As a result, the cutting attack trajectory 108 becomes a trajectory passing through the pointing positions detected from the cutting attack start point 121 to the cutting attack end point 122.

Figure 24:
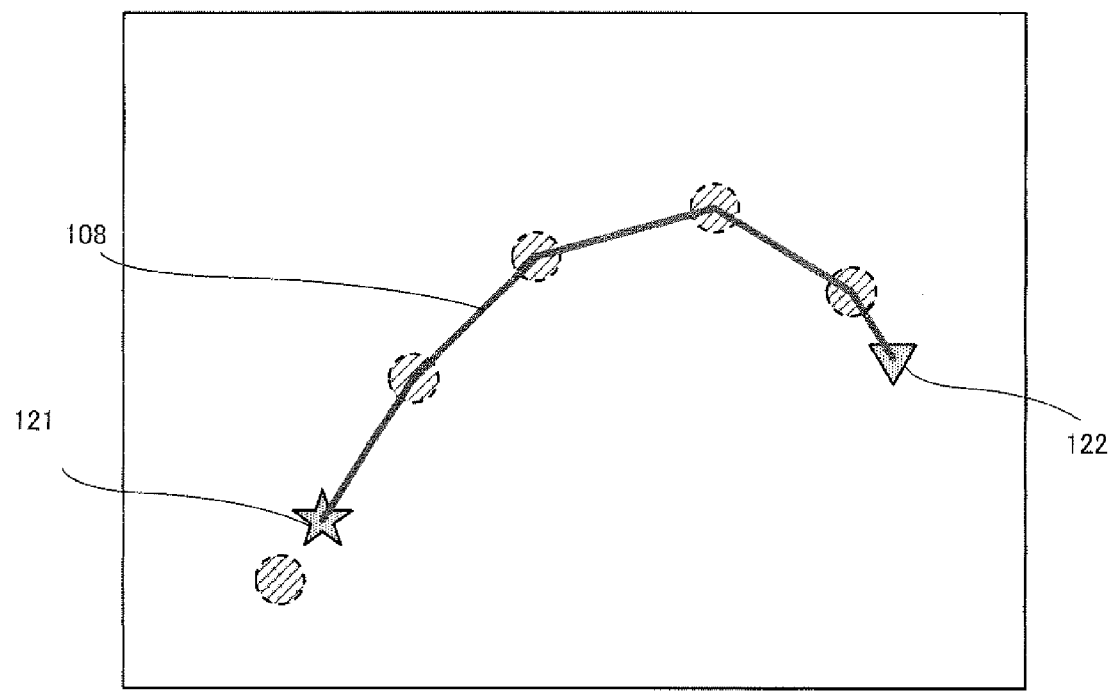
FIG. 24 is a view for explaining the principle of processing for a cutting attack operation.
Figure 25:
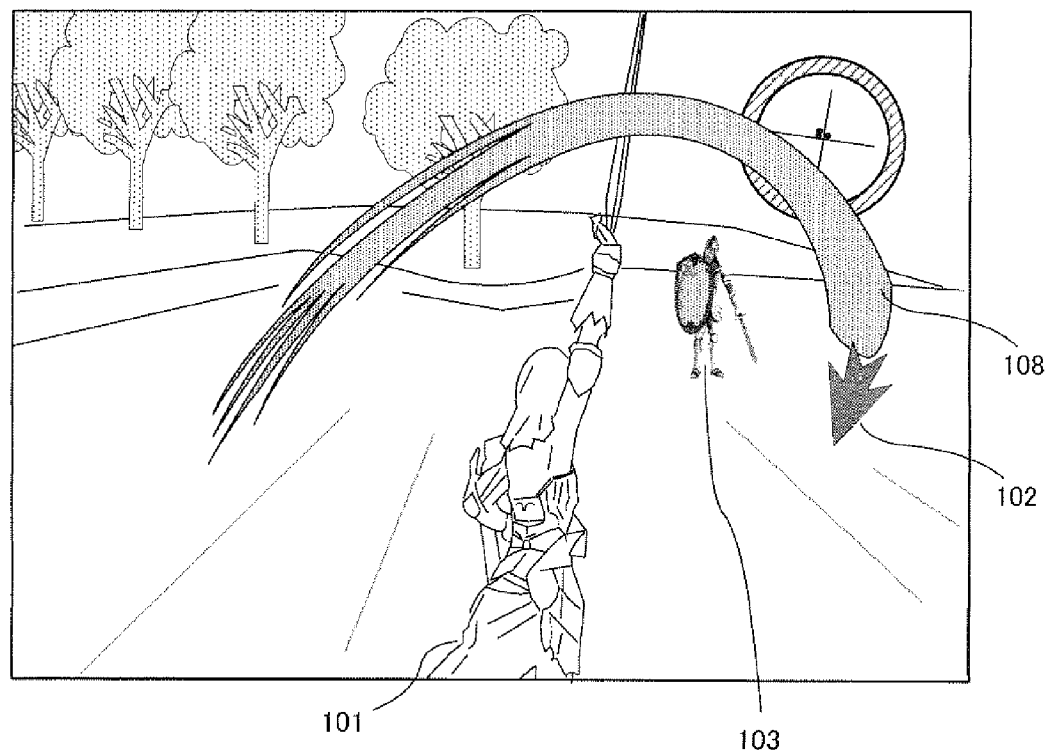
FIG. 25 shows an example of a game screen.

As described above, in the present embodiment, two types of operations, the normal cursor moving operation or the scrolling processing, and the cutting attack operation, are selectively used depending on whether or not the change amount of the pointing position (the change amount of the displayed position of the cursor 102) per the predetermined unit time (per one-frame period) is equal to or larger than the first predetermined value. In the cutting attack operation, when it is detected that the change amount is equal to or larger than the first predetermined value, the pointing position at one frame before is set as a cutting attack start point. Then, when the change amount becomes equal to or less than the second predetermined value, a cutting attack end point is set. Thus, by moving the cursor 102 at a predetermined speed or faster, the trajectory can be a cutting attack trajectory 108. For that reason, in addition to the linear cutting attack trajectory 108 as in the example of FIG. 23, a curved cutting attack trajectory 108 shown in FIG. 24 is possible. In FIG. 24, the cutting attack trajectory 108 extends from bottom left in the upper right direction and further in the lower right direction. In the case of such a trajectory, a game screen is drawn as shown in FIG. 25 (In FIG. 25, the cutting attack trajectory 108 does not hit the enemy object 103, and a hit effect is not drawn). In other words, in addition to the manner of linear cutting, it is possible to cut any position, desired by the player, in the screen, thereby achieving an operation with a high degree of freedom.

Figure 26:
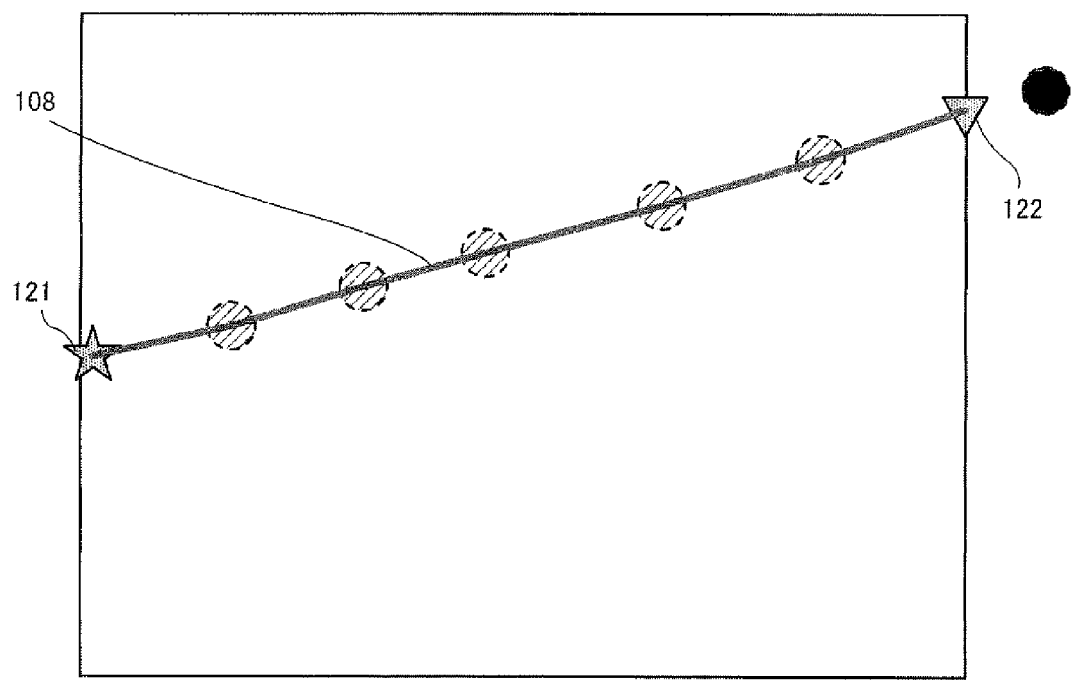
FIG. 26 is a view for explaining the principle of processing for a cutting attack operation.
Figure 27:
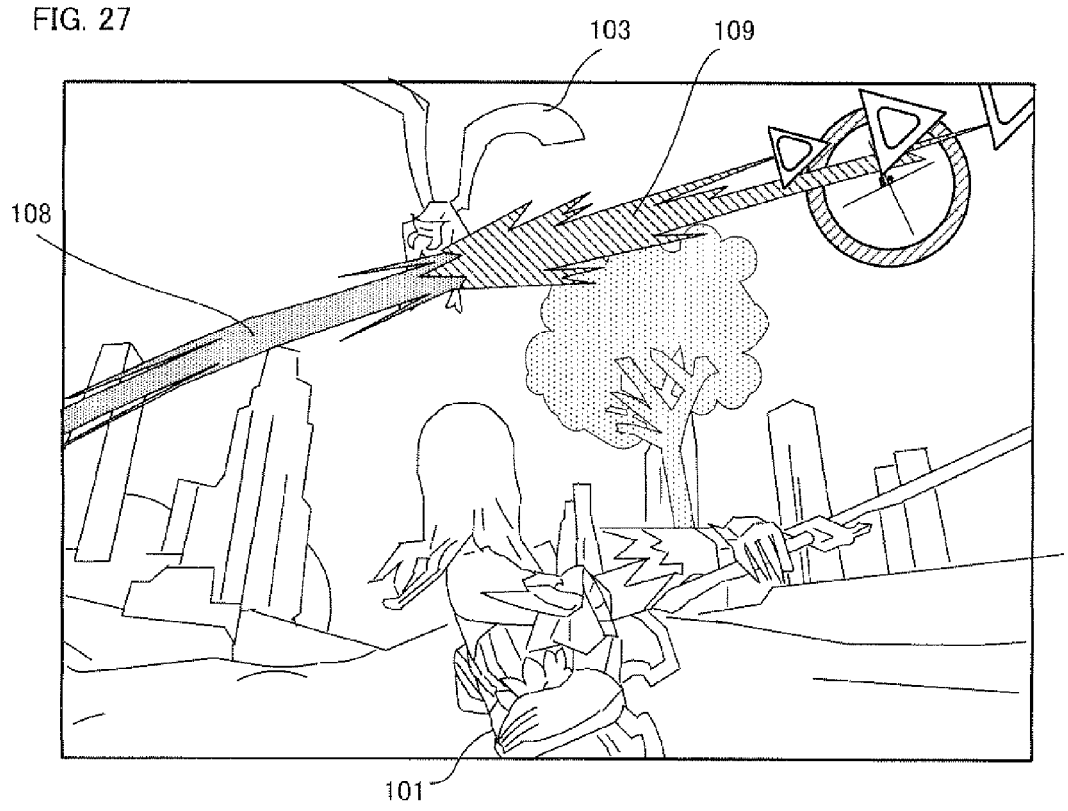
FIG. 27 shows an example of a game screen.

In the case where the pointing position is moved out of the screen after the cutting attack start point 121 is set, a cutting attack end point 122 is set when it is detected that the pointing position is out of the screen. For example, a position at the periphery of the screen is set as a cutting attack end point 122. FIG. 26 shows an example of a cutting attack trajectory 108 when the pointing position is moved out of the screen after the start of a cutting attack. FIG. 27 shows an example of a game screen in this case. In FIG. 27, because the pointing position is out of the screen (adjacent to the upper right corner of the screen), the cursor 102 is not displayed on the screen (instead, a plurality of triangles indicative of the moving direction of the cursor 102 is displayed in the upper right portion of the screen).

Figure 28:
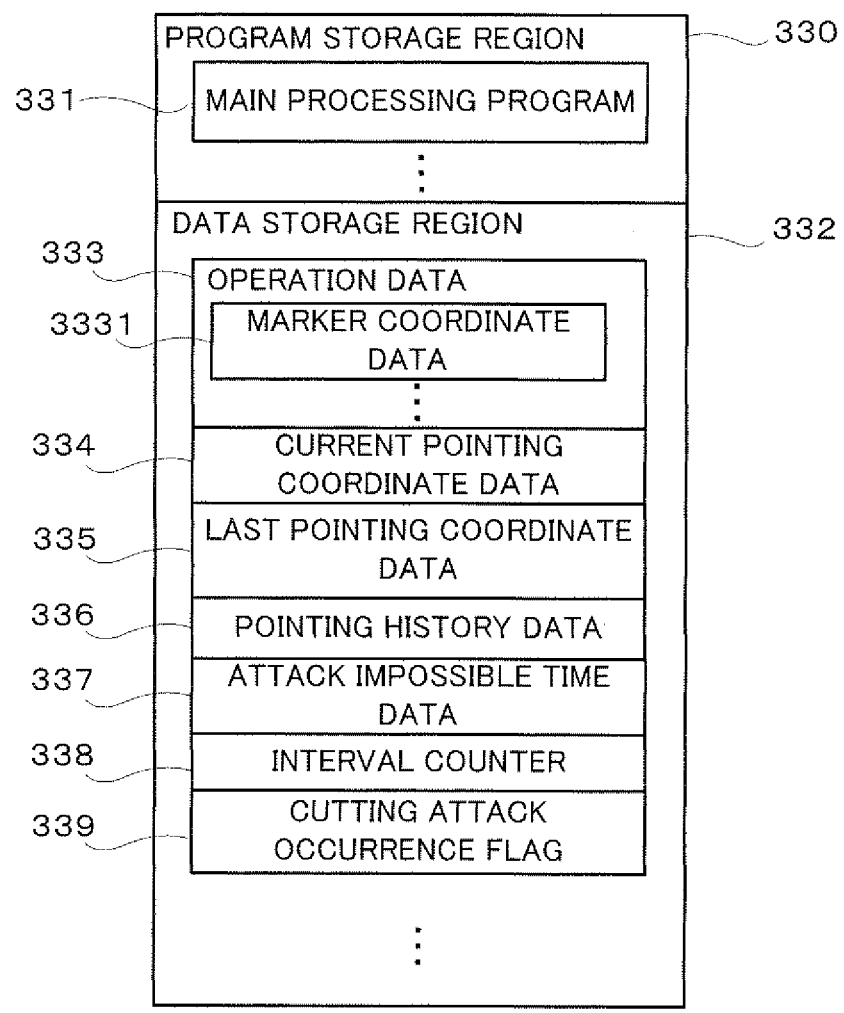
FIG. 28 is a view showing a memory map of an external main memory 12 in a game apparatus main body 3.

The following will describe in detail the game processing executed by the game apparatus main body 3. First, data stored in the external main memory 12 during the game processing will be described. FIG. 28 is a view showing a memory map of the external main memory 12 in the game apparatus main body 3. As shown in FIG. 28, the external main memory 12 includes a program storage region 330 and a data storage region 332. A part of data in the program storage region 330 and the data storage region 332 is stored in the optical disc 4, and transferred to and stored in the external main memory 12 when executing the game program.

In the program storage region 330, programs, such as a main processing program 331 for executing a flow chart shown in later-described FIG. 29 and the like, are stored.

In the data storage region 332, data, such as operation data 333, current pointing coordinate data 334, last pointing coordinate data 335, pointing history data 336, attack impossible time data 337, an interval counter 338, and a cutting attack occurrence flag 339, are stored.

The operation data 333 is data obtained from the controller 7, and includes marker coordinate data 3331 indicative of the above marker coordinates (see FIG. 8). Here, when any one of the markers 8L and 8R does not appear in the taken image as shown in FIG. 8, a value indicative of this (e.g. a NULL value) is set. In addition, the operation data 333 includes data indicative of contents of operations by the player, such as data indicative of a state of pressing each button, acceleration data, data indicative of contents of an operation performed with respect to the extended controller 36 (an operation of the above analog stick 39, and the like).

The current pointing coordinate data 334 is data calculated based on the above marker coordinate data 3331 and indicative of a pointing coordinate of the controller 7. The last pointing coordinate data 335 is data calculated in processing at the last frame and indicative of a pointing coordinate.

The pointing history data 336 is data indicative of a history of pointing coordinates detected after the start of a cutting attack until the end of the cutting attack. The pointing history data 336 is used for generating and drawing the above cutting attack trajectory 108.

The attack impossible time data 337 is data indicative of the length of an attack impossible time which is set after the end of a series of the cutting attack operation. The attack impossible time is a time which is provided in view of the contents of the present game for preventing successive cutting attacks from being performed by an operation of swinging the controller 7 quickly right and left by the player only using a wrist. In other words, after the end of one cutting attack, another cutting attack cannot be performed immediately.

The interval counter 338 is a counter for counting the elapse of the attack impossible time. As an initial value, "0" is set in the interval counter 338.

The cutting attack occurrence flag 339 is a flag for indicating whether or not it is during a cutting attack. If ON, the cutting attack occurrence flag 339 indicates that it is during a cutting attack, and if OFF, the cutting attack occurrence flag 339 indicates that a cutting attack is not occurring. The cutting attack occurrence flag 339 is initially set to be OFF.

Figure 29:
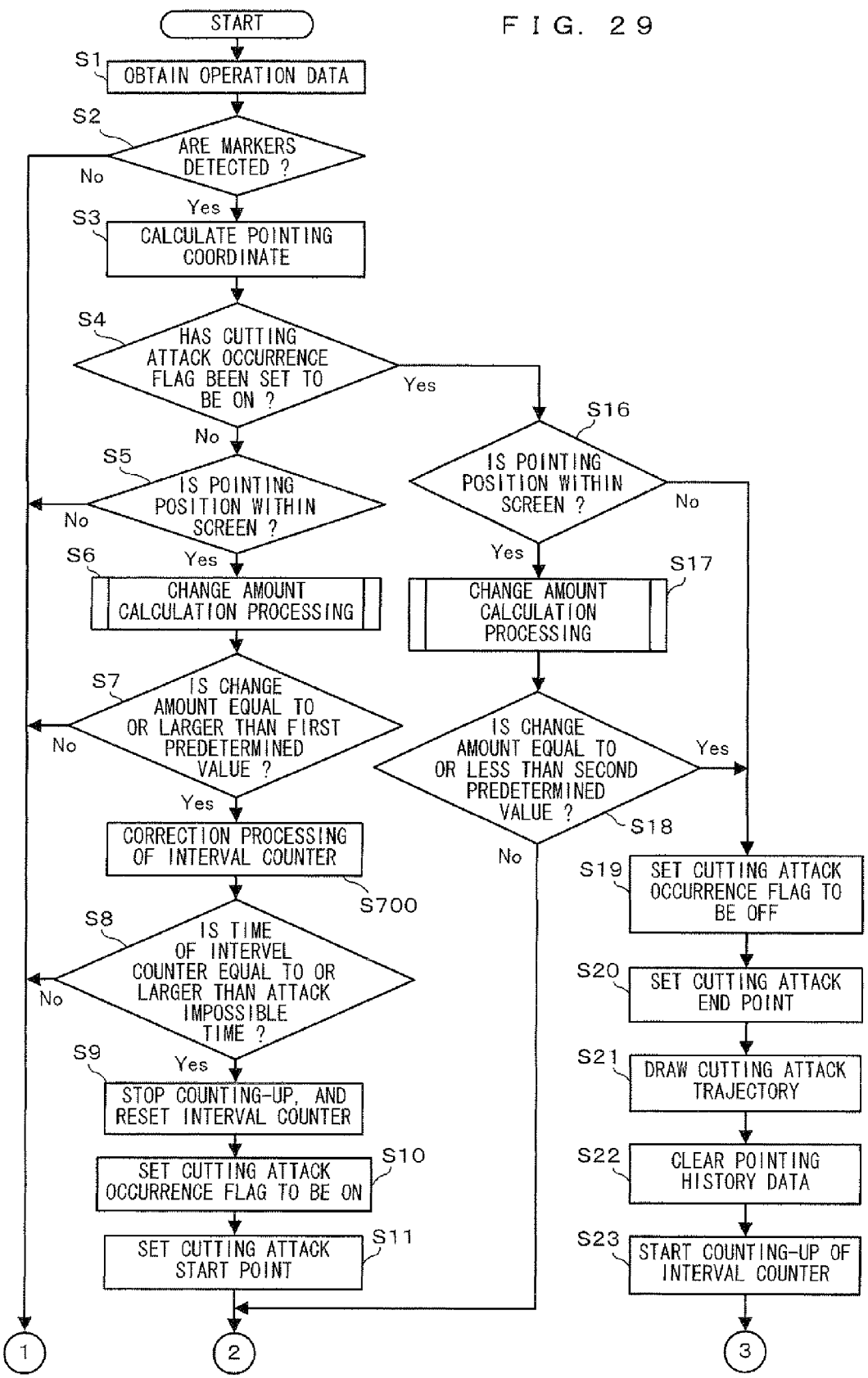
FIG. 29 is a flow chart showing game processing according to the first embodiment.
Figure 30:
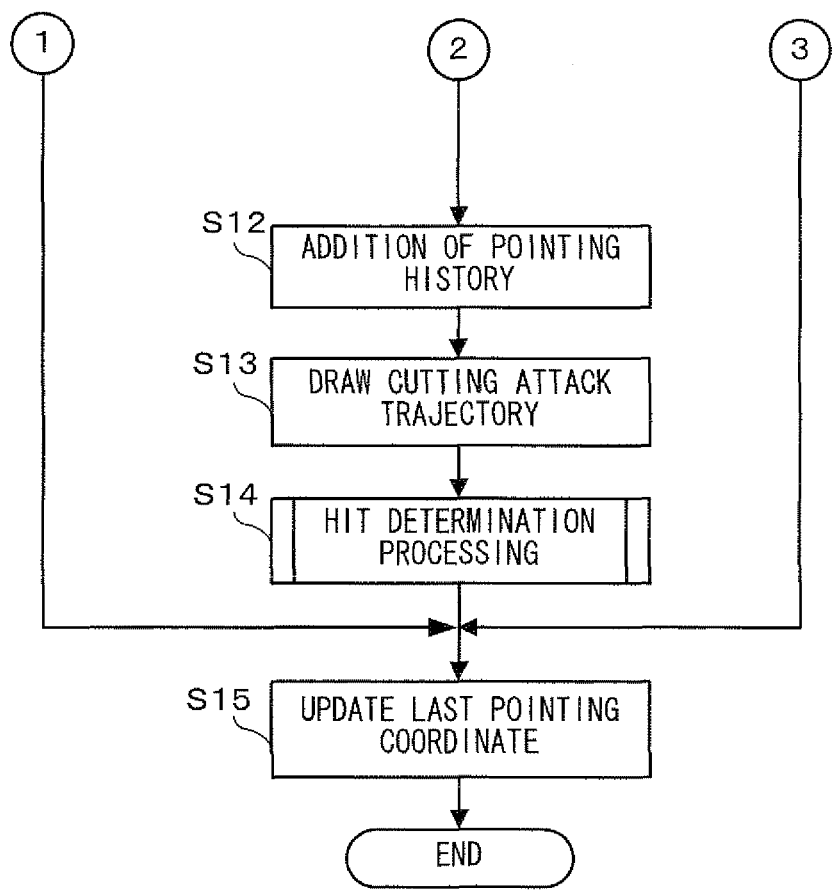
FIG. 30 is a flow chart showing the game processing according to the first embodiment.
Figure 31:
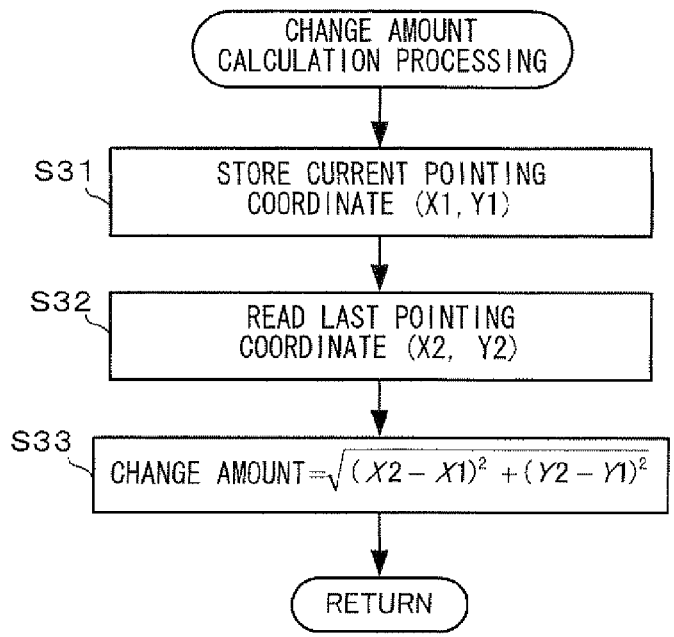
FIG. 31 is a flow chart showing a detailed operation in change amount calculation processing at steps S6 and S17 in FIG. 29.
Figure 32:
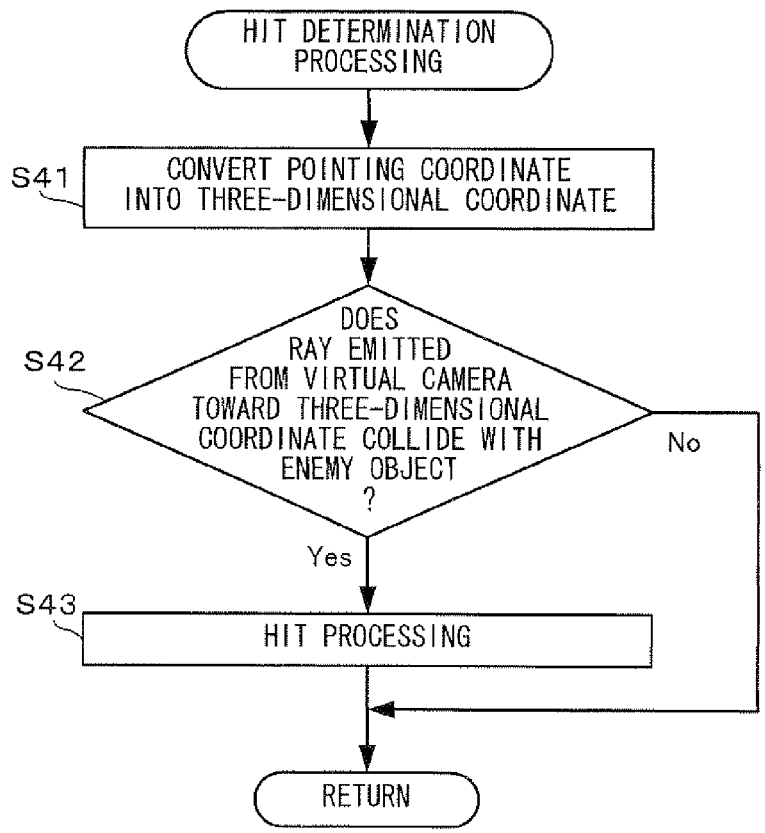
FIG. 32 is a flow chart showing a detailed operation in hit determination processing at a step S14 in FIG. 30.
Figure 33:
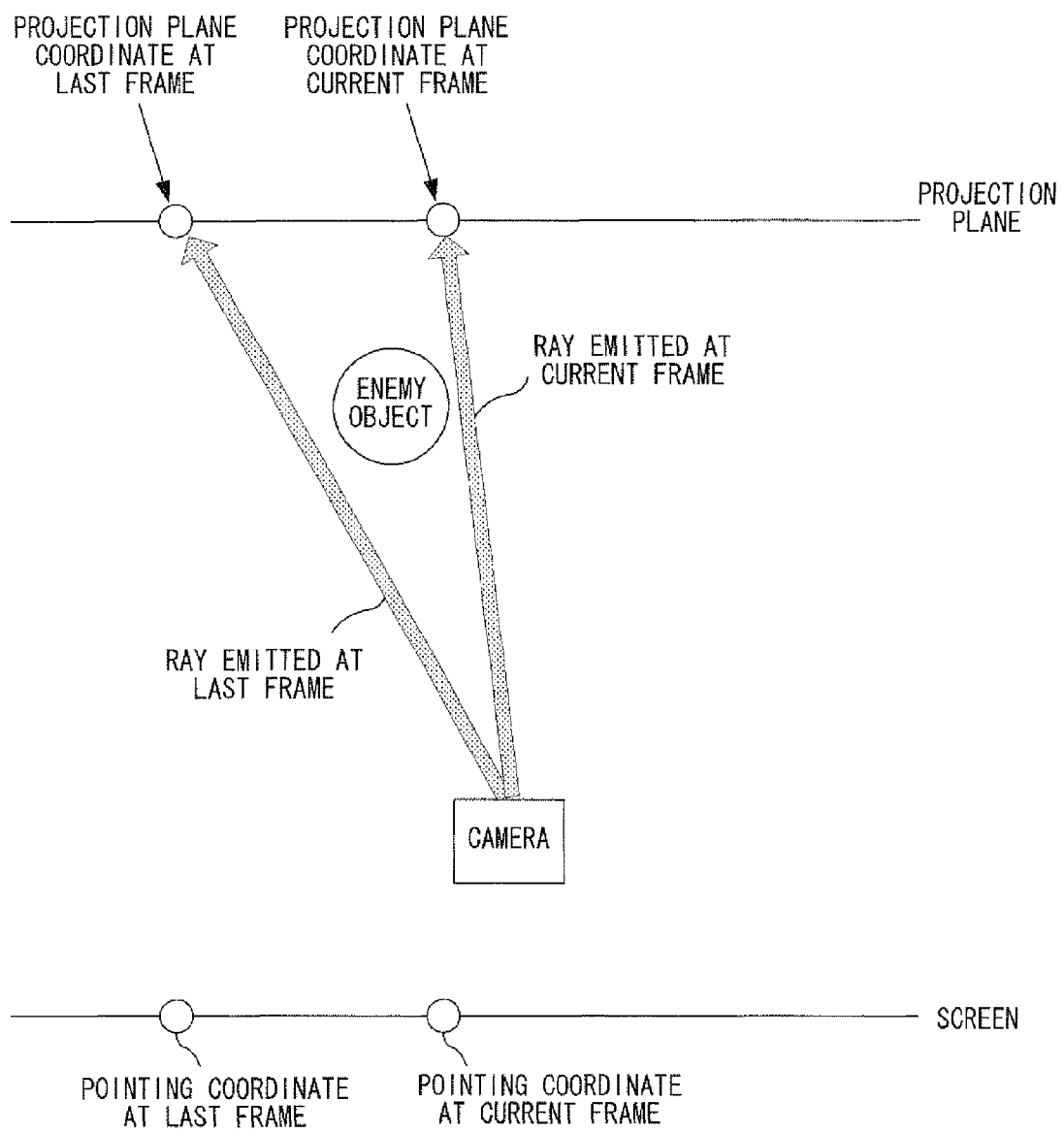
FIG. 33 is a view for explaining the hit determination processing.
Figure 34:
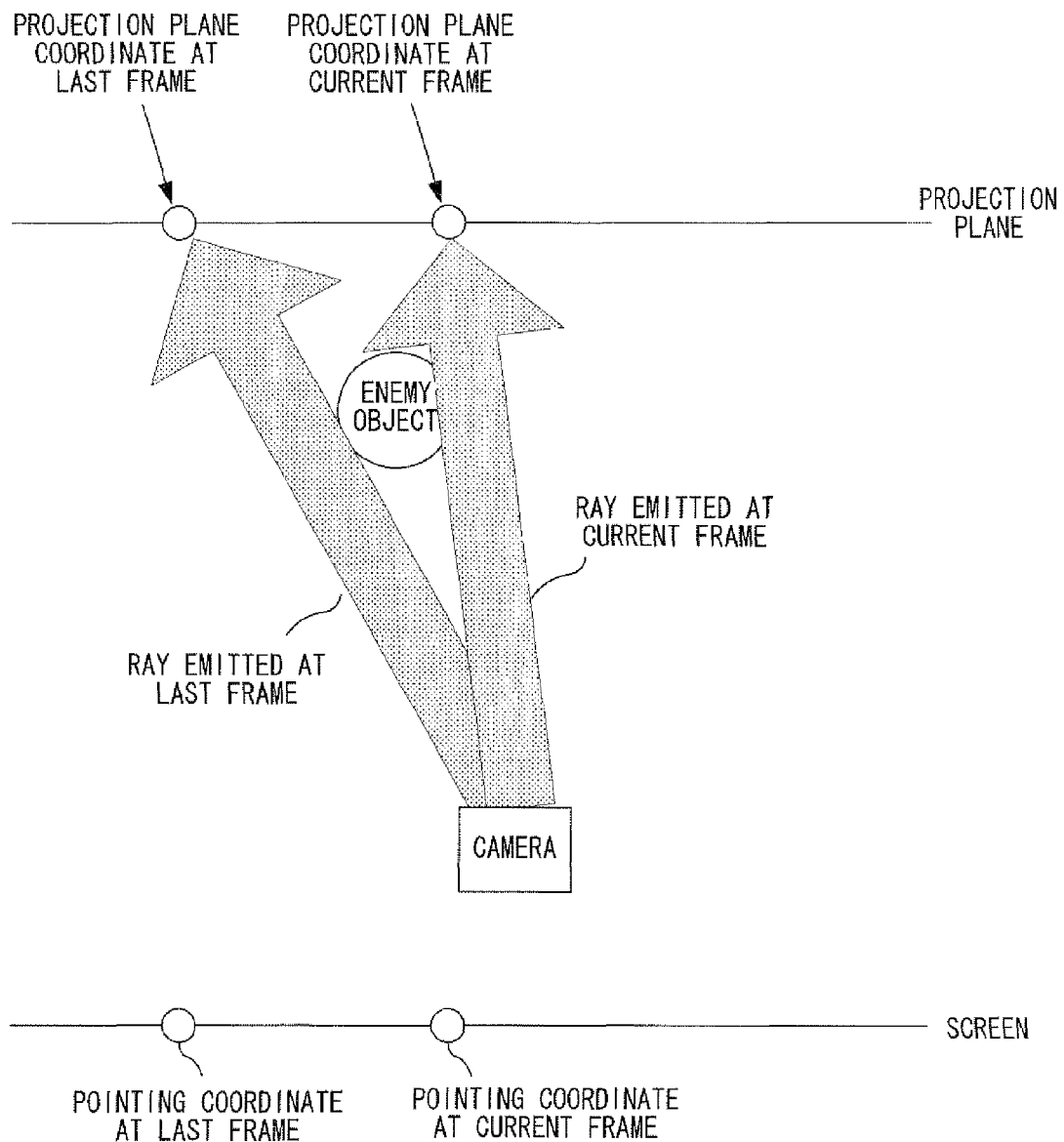
FIG. 34 is a view for explaining the hit determination processing.

The following will describe the game processing executed by the game apparatus main body 3 with reference to FIGS. 29 to 34. FIGS. 29 and 30 are flow charts showing the game processing executed by the game apparatus main body 3. FIG. 31 is a subroutine showing a detailed operation in change amount calculation processing in FIG. 29, and FIG. 32 is a subroutine showing a detailed operation in hit determination processing in FIG. 30. By repeating the processing in the flow charts of FIGS. 29 and 30 at every one frame, the game advances. In the flow charts shown in FIGS. 29 and 30, among processing for the whole game, processing for the above cutting attack operation will be described, but other processing which are not directly relevant to the embodiment described will not be described in detail.

At a step S1, the marker coordinate data 3331 is obtained from the external main memory 12.

At the following step S2, whether or not the markers 8L and 8R is detected in a taken image by the controller 7 is determined. In other words, whether or not the controller 7 faces the television 2 is determined. Specifically, the CPU 10 determines whether or not the images of the markers 8L and 8R appear in the taken image as shown in FIG. 8. As described above, when any one of the markers 8L and 8R does not appear in the taken image, because a value (e.g. a NULL value) indicative of this is set in the marker coordinate data 3331, whether or not the controller 7 faces the television 2 can be determined by determining whether or not this value is set.

As the result of the determination at the step S2, when any one of the markers 8L and 8R is not detected (NO at the step S2), the processing proceeds to a later-described step S15. On the other hand, when both of the markers 8L and 8R are detected (YES at the step S2), a pointing position is calculated at a step S3.

The following will describe an example of a method for calculating a pointing coordinate. As described above, the marker coordinate data 3331 includes data indicative of the above marker coordinates. Because this data is indicative of two marker coordinates (see FIG. 8) corresponding to the markers 8L and 8R, the CPU 10 calculates the midpoint between the two marker coordinates. The position of the midpoint is represented by using the above xy coordinate system for representing a position in a plane corresponding to the taken image. Next, the CPU 10 converts the coordinate indicative of the position of the midpoint into a coordinate in a coordinate system (referred to as an x'y' coordinate system) for representing a position in the screen of the television 2. This conversion can be performed by using a function for converting the coordinate of the midpoint calculated from the taken image into a coordinate in the screen corresponding to the actual pointing position of the controller 7 when the taken image is taken. In this case, because the pointing position of the controller 7 is moved in a direction reverse to the positions of the marker coordinates in the taken image, the conversion is performed such that right and left and up and down are inverted. The coordinate represented by x'-y' coordinate values calculated thus is the pointing coordinate of the controller 7.

Subsequent to the processing of calculating the pointing coordinate, at a step S4, whether or not the cutting attack occurrence flag 339 has been set to be ON is determined. As the result of the determination, when the cutting attack occurrence flag 339 has been set to be ON (YES at the step S4), because a cutting attack has been already started, the processing proceeds to a later-described step S16.

On the other hand, when the cutting attack occurrence flag 339 has been set to be OFF (NO at the step S4), whether or not the pointing position is within the screen is determined at the following step S5. This determination is made on the assumption of the case where the controller 7 faces the television 2 (markers 8L and 8R) and the markers 8L and 8R appear in the taken image but the controller 7 does not point to the screen, such as the case where the controller 7 points to the outer frame of the television 2. Here, whether or not the pointing coordinate obtained by converting the marker coordinate at the step S3 has a value within a predetermined range defined in advance as "out-of-screen coordinate" (e.g. a region surrounding the outer periphery of the screen is defined in advance as this predetermined range) is determined.

As the result of the determination at the step S5, when the pointing position is not within the screen (NO at the step S5), the processing proceeds to the later-described step S15. On the other hand, when the pointing position is within the screen (YES at the step S5), next, at a step S6, the change amount calculation processing of calculating the change amount of the pointing position from the last frame to the current frame is executed. FIG. 31 is a flow chart showing a detailed operation in the change amount calculation processing at the step S6. As shown in FIG. 31, at a step S31, the pointing coordinate obtained at the step S3 is stored in the current pointing coordinate data 334.

At the following step S32, the last pointing coordinate data 335 is read from the external main memory 12.

Then, at a step S33, the change amount is calculated based on coordinates (hereinafter, referred to as a current pointing coordinate and a last pointing coordinate, respectively) indicated by these two pointing coordinate data. Specifically, where the current pointing coordinate and the last pointing coordinate are represented by (X1,Y1) and (X2,Y2), respectively, the change amount C is calculated by the following formula.

[Mathematical Formula]

$$C=\sqrt{(X2-X1)^2+(Y2-Y1)^2}$$

This is the end of the change amount calculation processing.

Referring back to FIG. 29, next, at a step S7, whether or not the calculated change amount C is equal to or larger than a first predetermined value is determined. In other words, whether the player moves the cursor 102 quickly or slowly is determined. As the result of the determination, when the change amount C is less than the first predetermined value (NO at the step S7), the processing proceeds to the later-descried step S15.

On the other hand, when the change amount C is equal to or larger than the first predetermined value (YES at the step S7), processing of correcting the interval counter 338 is executed at the following step S700. This processing is processing for, when the player tries to perform a cutting attack consecutively by performing an operation of quickly swinging the controller 7 right and left only using a player's wrist, disabling a cutting attack during a period when the controller 7 is swung quickly right and left. In order to implement such processing, in this processing, the following processing is executed by using, as a parameter, a "penalty start time" that is defined in advance as a time shorter than the attack impossible time. First, it is determined whether or not a value of the interval counter 338 is equal to or larger than the penalty start time and less than the attack impossible time. Then, when the value of the interval counter 338 is equal to or larger than the penalty start time and less than the attack impossible time, processing of returning the value of the interval counter 338 to the penalty start time is executed. A period from the penalty start time to the attack impossible time is referred to as a penalty period. When the controller 7 is operated so as to be moved at a predetermined speed or faster during the penalty period, it is thought to be in a situation, as described above, where the player tries to perform a cutting attack consecutively by performing an operation of quickly swinging the controller 7 right and left only using a player's wrist. Thus, here, the value of the interval counter 338 is returned to the penalty start time (in other words, while the player performs an operation of swinging the controller 7 right and left only using a player's wrist, the value of the interval counter 338 is controlled so as not to reach the attack impossible time). Thus, even when a motion for performing another cutting attack is performed before the penalty period has not elapsed after a motion for consecutively performing a cutting attack is performed, the cutting attack can be disabled. In other words, until the penalty period has elapsed after the player performs a motion for consecutively performing a cutting attack (e.g., when an operation of swinging the controller 7 right and left only using a player's wrist is stopped), the player cannot perform a cutting attack. It is noted that when the value of the interval counter 338 is less than the penalty start time, it is thought to be in a situation where the pointing position is changed from the position at the time of the end of a cutting attack due to a reaction after the cutting attack. In such a case, it is not determined that it is in a situation where the player tries to perform a cutting attack consecutively by performing an operation of quickly swinging the controller 7 right and left only using a player's wrist.

On the other hand, whether or not an elapsed time indicated by the interval counter 338 is equal to or larger than the attack impossible time indicated by the attack impossible time data 337 is determined at the following step S8. When the elapsed time indicated by the interval counter 338 is less than the attack impossible time indicated (NO at the step S8), the processing proceeds to the later-descried step S15.

On the other hand, when the elapsed time indicated by the interval counter 338 is equal to or larger than the attack impossible time indicated by the attack impossible time data 337 (YES at the step S8), counting-up of the interval counter 338 is stopped at the following step S9 (it is noted that the counting is started in later-described processing at a step S23). Further, the interval counter 338 is reset.

Next, at a step S10, the cutting attack occurrence flag 339 is set to be ON. At the following step S11, the last pointing coordinate is set as a cutting attack start point 121 (see FIG. 19).

Next, at a step S12, the pointing coordinate calculated at the step S3 is added to the pointing history data 336.

Next, at a step S13, the pointing history data 336 is referred to, and a cutting attack trajectory 108 connecting the last pointing coordinate to the current pointing coordinate is calculated. Then, drawing of the cutting attack trajectory 108 is executed. It is noted that the cutting attack trajectory 108 continues to be displayed for a predetermined time. In addition, the cursor 102 is drawn at the position in the screen which is indicated by the current pointing coordinate. Further, the sword object 104 is appropriately moved such that an appearance in which the player object 101 swings the sword is displayed, and the posture of the player object 101 is also appropriately changed.

Next, at a step S14, the hit determination processing is executed for determining whether or not the cutting attack hits an enemy object 103. FIG. 32 is a flow chart showing in detail the hit determination processing at the step S14. As shown in FIG. 32, at a step S41, the pointing coordinate is converted into a three-dimensional coordinate that represents a corresponding position in the virtual game space. Specifically, the two-dimensional pointing coordinate is converted into a coordinate (hereinafter, referred to as a projection plane coordinate) on a projection plane that exists in the virtual game space, by using the inverse matrix of a projection matrix for the pointing coordinate. Next, at a step S42, a virtual ray (beam) is emitted from the virtual camera in the virtual game space toward the projection plane coordinate (it is noted that the ray is processed so as to be invisible such that it is not displayed on the screen). Then, whether or not the ray comes into contact with the enemy object 103 is determined. Here, as a supplement for the ray, a ray having a certain amount of thickness (width) is emitted in the present embodiment. The reason is as follows. In the present embodiment, at every one frame, a ray is emitted based on a projection plane coordinate into which a pointing coordinate at this frame is converted. Thus, when the cursor 102 is moved at a high speed, the ray may not pass through the position where an enemy object 103 is located, if there is the enemy object 103 between a projection plane coordinate corresponding to the pointing coordinate at the last frame and the projection plane coordinate corresponding to the pointing coordinate at the current frame. Thus, an attack may not hit the enemy object 103 (see FIG. 33). For that reason, in the present embodiment, a ray is caused to have a certain amount of thickness, thereby making it easy for the ray to collide with the enemy object 103 (see FIG. 34). Thus, such a situation is prevented, in which an attack does not hit the enemy object 103 that exists between the pointing coordinates.

As the result of the determination at the step S42, when the ray does not come into contact with any enemy object 103 (NO at the step S42), it is determined that the attack does not hit any enemy object 103, and the hit determination processing ends. On the other hand, when the ray collides with an enemy object 103 (YES at the step S42), it is determined that the attack hits the enemy object 103, and hit processing is executed at the following step S43. In the hit processing, processing for damaging the collided enemy object 103 and processing of drawing a hit effect (see the hit effect 109 in FIG. 15) so as to be superimposed on a part of the cutting attack trajectory which extends from a position where the cutting attack hits the enemy object 103 are executed. In addition to the above drawing of the hit effect so as to be superimposed, a hit effect may be provided by changing the color of the part of the cutting attack trajectory which extends from the position where the cutting attack hits the enemy object 103. This is the end of the hit determination processing.

At the following step S15, processing of updating the last pointing coordinate data 335 with the values of the current pointing coordinate data 334 is executed. When the pointing coordinate represents a position out of the screen (NO at the step S2 or S5), a value indicating that the pointing coordinate represents the position out of the screen is set in the last pointing coordinate data 335. Then, the game processing ends.

Next, processing executed when the cutting attack occurrence flag 339 has been set to be ON as the result of the determination at the step S4 (YES at the step S4) will be described. In other words, processing after the cutting attack is started will be described. In this case, at the step S16, whether or not the pointing position is within the screen is determined. The processing at the step S16 is the same as that at the step S5. As the result of the determination, when the pointing position is not within the screen (NO at the step S16), the pointing position is moved out of the screen after the start of the cutting attack, and the processing proceeds to a later-described step S19. On the other hand, when the pointing position is within the screen (YES at the step S16), the change amount calculation processing is executed at a step S17. The processing at the step S17 is the same as that at the step S6, and thus the description thereof will be omitted.

Next, at a step S18, whether or not a change amount C calculated at the step S17 is equal to or less than a second predetermined value is determined. In other words, after the cutting attack is started by the movement of the cursor at a predetermined speed or faster, whether or not the movement speed of the cursor becomes equal to or less than a predetermined speed is determined. As the result of the determination, when the change amount C is not equal to or less than the second predetermined value (NO at the step S18), it means that the cutting attack continues, and thus the processing proceeds to the step S12 and addition of a pointing history, drawing of the cutting attack trajectory 108, and the like are executed.

On the other hand, when the change amount C becomes equal to or less than the second predetermined value (YES at the step S18), the following processing is executed to end the cutting attack. At the step S19, the cutting attack occurrence flag 339 is set to be OFF. Next, at a step S20, the current pointing coordinate is set as a cutting attack end point 122. At this time, when the pointing position is out of the screen (when NO at the step S16), the CPU 10 calculates a trajectory obtained by extending a trajectory, which connects the last pointing coordinate and a pointing coordinate detected immediately prior to the detection of the last pointing coordinate, to the periphery of the screen, and sets a coordinate at a position where the calculated trajectory intersects with the periphery of the screen as a cutting attack end point 122.

Next, at a step S21, by executing the same processing as at the step S13, a cutting attack trajectory connecting the cutting attack start point 121 to the current pointing coordinate 122 is drawn.

At the following step S22, the pointing history data 336 is cleared. Further, at a step S23, counting-up of the interval counter 338 is started. Then, the processing proceeds to the step S15. This is the end of the game processing according to the present embodiment.

As described above, in the first embodiment, when a change amount of the pointing position per one-frame period is larger than a predetermined value, in other words, when the cursor is moved at a predetermined speed or faster, a cutting attack having the pointing position at that time as a start point is started. Then, when the movement speed of the cursor becomes equal to or less than a predetermined value, the pointing position at that time is set as an end point of the cutting attack, and the cutting attack is ended. Thus, in a game system which detects a pointing position based on an image pickup device and markers 8L and 8R, it is possible to execute different processing when an operation is performed to move the cursor slowly or quickly. Further, a pointing position when moving the cursor at the predetermined speed or faster is set as a start point, and processing can be executed. As a result, it is possible to perform an operation with a higher degree of freedom, thereby providing a new way of enjoyment to the player.

In the above embodiment, a change amount of the pointing position is calculated per one-frame period ($\frac{1}{60}$ sec.) which is an interval of drawing the screen. However, the present invention is not limited thereto, and, for example, the change amount may be calculated per 5 ms ($\frac{1}{200}$ sec.) which is a transmission interval of operation data from the controller 7 to the game apparatus main body 3. Operation data for one frame which is transmitted from the controller 7 may be stored in a predetermined buffer, and the change amount calculation processing at the steps S6 and S17 may be repeatedly executed for the data stored in the buffer. Further, not based on a change amount from a pointing position at one frame before (last pointing coordinate) as described above, based on a change amount of the pointing position obtained from the operation data for one frame, the processing at the steps S7 and S18 may be executed.

Further, a plurality of types of weapons to be held by the player object may be set, and the reach of an attack in the depth direction (the range of a weapon, namely, the length of the emitted ray) may be individually set for each weapon in the hit determination processing. In this case, "weapon data" indicative of a plurality of types of weapons is defined, and data of "range" is defined in advance in each "weapon data". For example, a "double-handed sword" is defined so as to have a longer range than that of a "one-handed sword". In other words, the definition is made such that an attack with the "double-handed sword" reaches a more distant enemy object (namely, the double-handed sword has a longer blade than that of the one-handed sword). Then, in the hit determination processing at the step S14, the "range" is read from the "weapon data" of the currently used weapon, the ray is emitted from the position of the virtual camera toward the projection plane coordinate for a distance according to the "range", and the determination of collision of the ray with an enemy object 103 may be determined. As described above, by using a parameter which is the "range", each weapon can have a characteristic when a plurality of weapons are used in the game, thereby enhancing the fun of the game.

Figure 35:
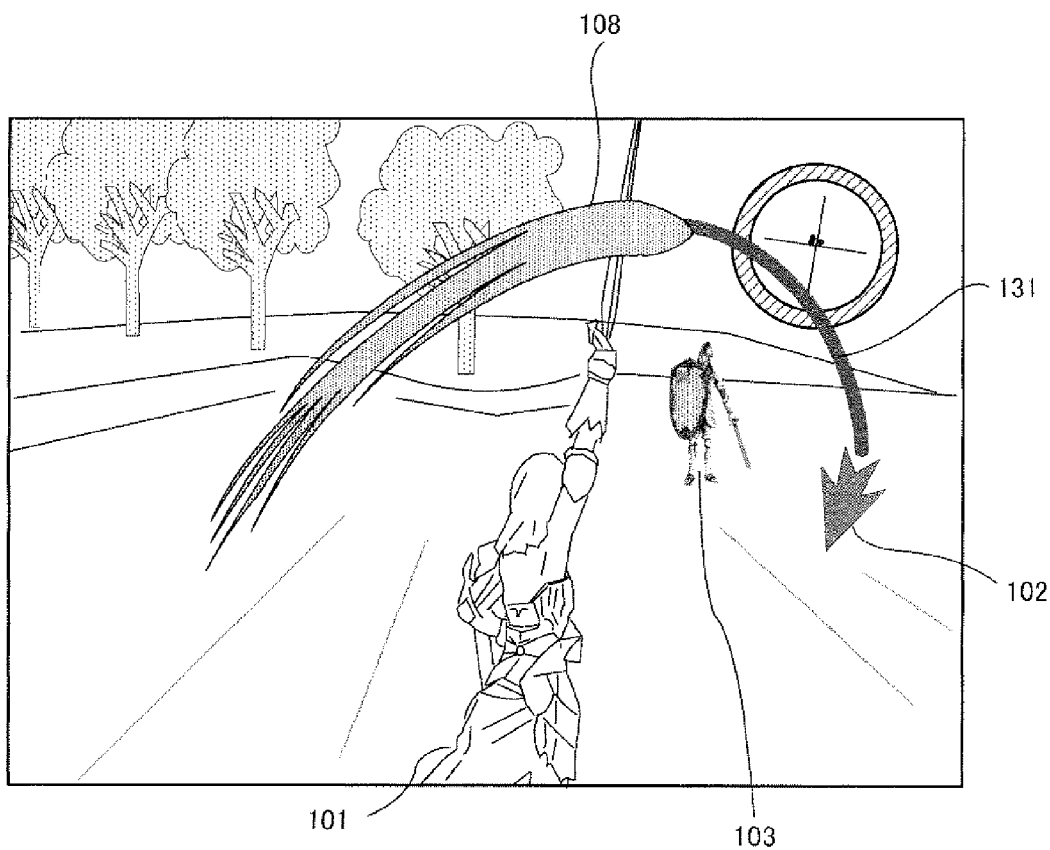
FIG. 35 shows an example of a game screen.

Further, regarding drawing of a cutting attack trajectory 108, a movement trajectory of the cursor 102 may be displayed prior to drawing of the cutting attack trajectory 108. For example, as shown in FIG. 35, a movement trajectory 131 of the cursor 102 may be drawn prior to the cutting attack trajectory 108, and the cutting attack trajectory 108 may be drawn after several frames (drawing is made such that the cutting attack trajectory 108 traces the movement trajectory 131). Thus, in the case where a plurality of types of weapons are set as described above, when the player object 101 uses a heavy weapon which takes time to swing around, the heaviness of the weapon can be expressed, thereby enhancing the fun of the game. In addition, it can be made easy for the player to know what trajectory is drawn.

Further, "penetrating power" indicative of the "sharpness" of a weapon may be set as a parameter of the weapon data, and processing based on this parameter may be executed. For example, when a plurality of enemy objects 103 align along the cutting attack trajectory 108, processing may be executed such that only one enemy object 103 is cut by a single cutting attack with a weapon having a low penetrating power (a blunt weapon) (the above hit processing is executed only for the one enemy object 103), but the plurality of enemy objects 103 aligning along the cutting attack trajectory 108 are cut by a single cutting attack with a weapon having a high penetrating power (a sharp weapon) (the above hit processing is executed for each of the enemy objects 103 aligning along the cutting attack trajectory 108). More specifically, as the "penetrating power" parameter, a "distance (pixel number) from a position where a cutting attack initially hits an enemy object 103 to a position where the cutting attack can reach" is set. For example, when a value of "100" is set as the "penetrating power" parameter, processing is executed such that a cutting attack continues (a cutting attack trajectory is drawn) for a distance equivalent to 100 pixels from a position in the screen where the cutting attack initially hits an enemy object 103 (a position obtained by converting the position of the enemy object 103 initially hit by the cutting attack in the virtual game space from a three-dimensional coordinate system to a two-dimensional coordinate system (screen coordinate system) and any number of enemy objects 103 are cut within the distance (however, when enemy objects 103 align in the depth direction, the hit processing is executed for the nearest enemy object 103). Thus, by setting the "penetrating power" as a "distance for which a cutting attack continues (pixel number)", each weapon can have a characteristic when a plurality of weapons are used in the game, thereby enhancing the fun of the game. Further, for example, by making a large enemy object with an overall length of 30 m appear in the virtual game space, and by setting a plurality of hit points in the large enemy object (the hit processing can be executed a plurality of times for the single large enemy object), each enemy object 103 can have a characteristic, thereby enhancing the fun of the game.

Figure 36:
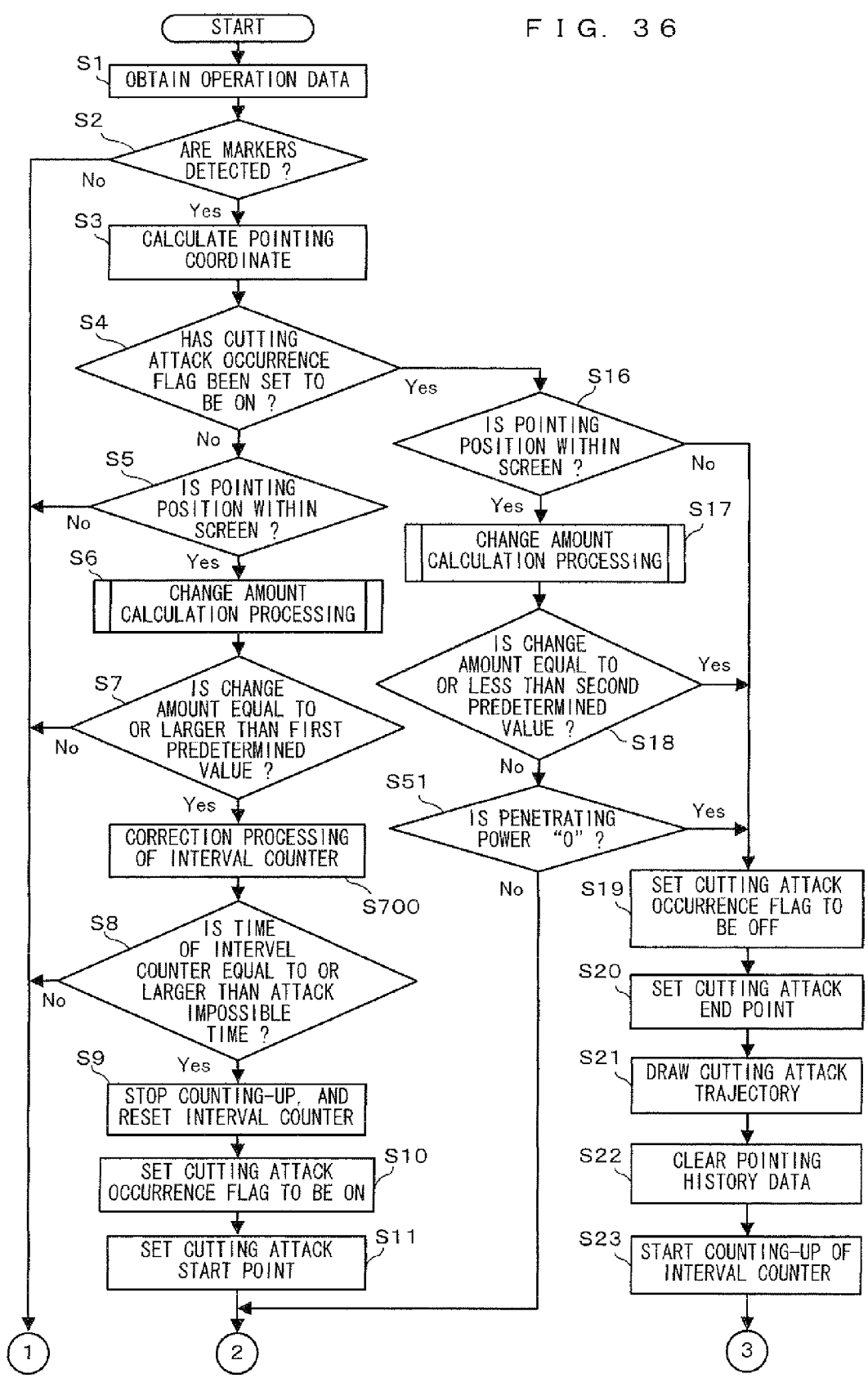
FIG. 36 is a flow chart showing game processing in the case of using a penetrating power parameter.

Further, as the "penetrating power" parameter, a number of times of attacks in a single cutting attack may be set. For example, a value of "5" is set to the penetrating power parameter (it indicates that it is possible to attack five enemy objects 103 with a single cutting attack). In the case where there are a plurality of enemy objects 103 aligning along the cutting attack trajectory 108, "1" is subtracted from the "penetrating power" parameter every time the cutting attack hits an enemy object 103 (e.g. in the processing at the step S43). Then, processing for ending the cutting attack (i.e. processing when the determination is made as YES at the step S18) may be executed when the "penetrating power" parameter becomes "0". For example, as shown in FIG. 36, after the determination is made as NO at the step S18, at a step S51, whether or not the "penetrating power" parameter is "0" is determined. When it is determined that the "penetrating power" parameter is not "0" (NO at the step S51), the processing proceeds to the step S12, and when it is determined that the "penetrating power" parameter is "0" (YES at the step S51; i.e. when the above change amount C does not become equal to or less than the second predetermined value but the "penetrating power" parameter becomes "0"), the processing proceeds to the step S19.

Figure 37:
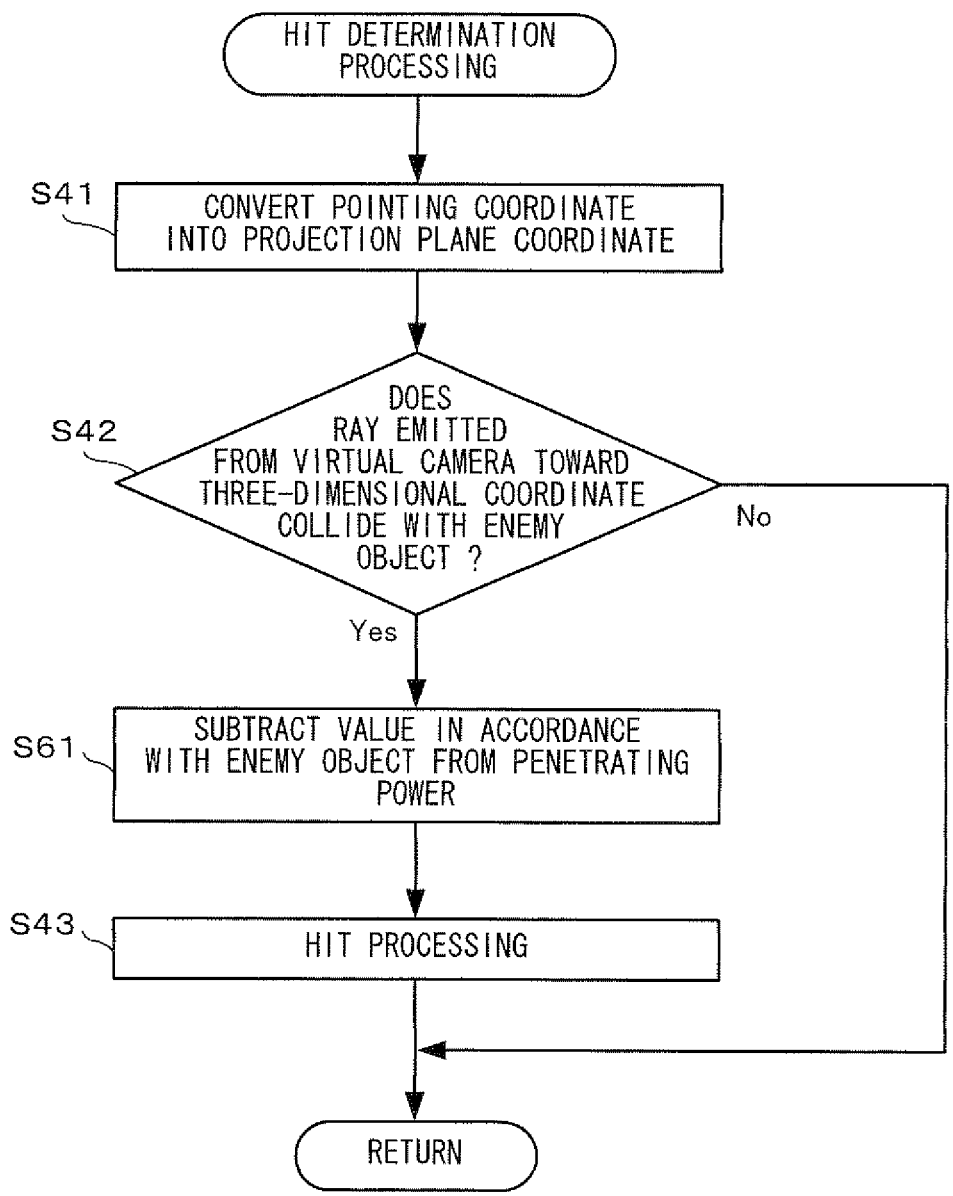
FIG. 37 is a flow chart showing an example of the hit determination processing in the case of using the penetrating power parameter.

In addition, a subtraction value for the "penetrating power" parameter may be changed depending on the type of an enemy object 103 and a "defensive strength" parameter set in advance for each enemy object 103. For example, when a cutting attack hits an unarmored enemy A (whose defensive strength parameter is set, for example, as "1"), "1" may be subtracted from the "penetrating power" parameter, and when a cutting attack hits an armored enemy B (whose defensive strength parameter is set, for example, as "3"), "3" may be subtracted from the "penetrating power" parameter. Specifically, in the hit determination processing at the step S14, processing shown in FIG. 37 is executed. In the processing shown in FIG. 37, processing other than a step S61 is the same as the processing described with reference to FIG. 32. Thus, here, the processing other than the step S61 will not be described. In the hit determination processing shown in FIG. 37, as the determination at the step S42 is made as YES, a value in accordance with the enemy object 103 with which the ray collides (namely, the enemy object 103 which the attack hits) is subtracted from the penetrating power parameter. In the above case of using a defensive strength parameter, "1" is subtracted from the "penetrating power" parameter when the enemy object which the attack hits is the enemy A, and "3" is subtracted from the "penetrating power" parameter when the enemy object which the attack hits is the enemy B. By so doing, each enemy object 103 can have a characteristic, thereby enhancing the fun of the game.

Further, in the above embodiment, a cutting attack with the sword object 104 has been described as one example of an attack manner. However, the present invention is not limited thereto, and a striking weapon such as a staff object may be used instead of the sword object 104. In this case, similarly as in the case of the sword object 104, the hit processing is executed for an enemy object 103 located on the above cutting attack trajectory. Then, as the above hit effect, an effect suitable for a striking weapon (e.g. displaying of the enemy object 103 being blown out) may be used.

Further, regarding the cutting attack start point, in the above embodiment, a last pointing coordinate is set as the cutting attack start point 121. However, the present invention is not limited thereto, and a current pointing coordinate may be set as the cutting attack start point 121. Alternatively, the midpoint between the last pointing coordinate and the current pointing coordinate may be calculated, and the midpoint may be set as the cutting attack start point 121. Still alternatively, a table in which pointing coordinates are associated with cutting attack start points 121 may be prepared in advance, and the cutting attack start point 121 may be determined based on the table.

Regarding the cutting attack end point 122, in the above embodiment, the current pointing coordinate is used. However, the last pointing coordinate may be set as the cutting attack end point 122, or the midpoint between the last pointing coordinate and the current pointing coordinate may be set as the cutting attack end point 122. Alternatively, a table in which pointing coordinates are associated with cutting attack end points 122 may be prepared in advance, and the cutting attack end point 122 may be determined based on the table. In addition, in the case where a plurality of types of weapons are set as described above, regarding the first predetermined value and the second predetermined value for setting the cutting attack start point and the cutting attack end point, different values may be used depending on the type of a weapon. For example, a table in which the first predetermined value and the second predetermined value is defined for each weapon is prepared in advance, and read into the external main memory 12 when the game processing is executed. Then, the table is referred to when the processing of the flow chart shown in FIG. 29 is started, and a first predetermined value and a second predetermined value both of which correspond to a weapon set as a weapon held by the player object 101 may be obtained and used.

Further, when a cutting attack trajectory is drawn so as to have a predetermined shape, e.g. a circular shape, a triangular shape, and the like, the determination of collision in the hit determination processing at the step S14 may be made only for a region inside the shape.

Further, in addition to the aforementioned sword-fighting game, certain example embodiments may include games other than the sword-fighting game as long as predetermined processing is executed in the games only when a pointing position is moved at a predetermined speed or faster. For example, an example embodiment such as a "quick writing game" (a game to compete for neat and quick handwriting) in which it is possible to write a character only when a cursor is moved at a predetermined speed or faster.

Further, as an example of detection of an operation of the cursor using the controller 7, namely, as an example of detection of a pointing position, the above embodiment has described the case where a pointing position is detected based on an image of the markers 8L and 8R that is taken by the image pickup element 743 provided in the controller 7. In another embodiment, for example, a predetermined camera may be located on the television 2 side, and a pointing position may be detected based on an image taken by the camera. For example, the marker 8 may be located in front of the controller 7 and a pointing position may be detected based on a taken image of this marker, or an image including the player (who holds the controller 7) may be taken by a camera located on the television 2 side and the taken image may be analyzed to detect the position of the controller 7, thereby calculating a pointing position. In still another embodiment, another pointing device may be used to point to a certain position on the screen. For example, a pointing position may be changed by moving a cursor displayed on the screen with an analog stick or a mouse. Alternatively, a touch panel may be used to point to a certain position on the screen.

Second Embodiment

With reference to FIGS. 38 to 44, the following will describe a second embodiment. In the above first embodiment, a sword is used as a weapon, namely, an attacking way of "cutting" is used. In other words, while the cursor 102 is moved at a speed that is within a predetermined range (i.e., while the movement speed of the cursor 102 is equal to or larger than the first predetermined value and less than the second predetermined value), a "cutting attack" is caused to occur. On the other hand, in the second embodiment, an attacking way is used, in which a later-described thrown object is thrown, instead of a cutting attack, while the cursor is moved at a speed that is within a predetermined range (hereinafter, referred to as a throwing attack). Specifically, a "rod" is used as a weapon, and an attack in which a "bomb" is discharged from the end of the rod is performed while the cursor is moved (namely, the same operation as swinging the rod is performed) at a speed that is within a predetermined range. A game system 1 according to the present embodiment is the same as that according to the above first embodiment. Thus, the same reference signs are used and the detailed description will be omitted.

The following will describe an outline of processing in the second embodiment. FIG. 38 shows an example of a game screen according to the second embodiment, in which a player object 101 is swinging a rod object 201 (from right to left). In addition, a plurality of bombs 202 is displayed in the screen. As described above, in the second embodiment, the player object 101 is equipped with the rod object 201 as a weapon (it is noted that in this game, the equipped weapon can be changed when a predetermined operation is performed). Then, when the player performs the same operation as the operation for a cutting attack in the above first embodiment, the player object 101 swings the rod object 201 in accordance with the movement of the pointing position. At that time, as shown in FIG. 38, the bombs 202, which are thrown objects, are discharged from the end of the swung rod, and move in the depth direction in the virtual game space (namely, the bombs 202 are thrown). It is noted that in the present embodiment, the bomb moves under the influence of gravity in the virtual game space (namely, free fall based on the laws of physics). For example, when a bomb 202 is thrown obliquely upward in the virtual game space, the bomb 202 moves with a trajectory that forms a parabola. Further, the plurality of bombs 202 is displayed in FIG. 38. In other words, in the present embodiment, while the cursor 102 is moved at a predetermined speed or faster, bombs 202 are consecutively discharged from the end of the rod at predetermined time intervals. Moreover, in the present embodiment, the bomb 202 explodes if hitting an enemy object 103. Even if not hitting any enemy object 103, the bomb 202 explodes at the elapse of a predetermined time after the discharge. By this explosion, it is possible to damage the enemy object 103.

Figure 39:
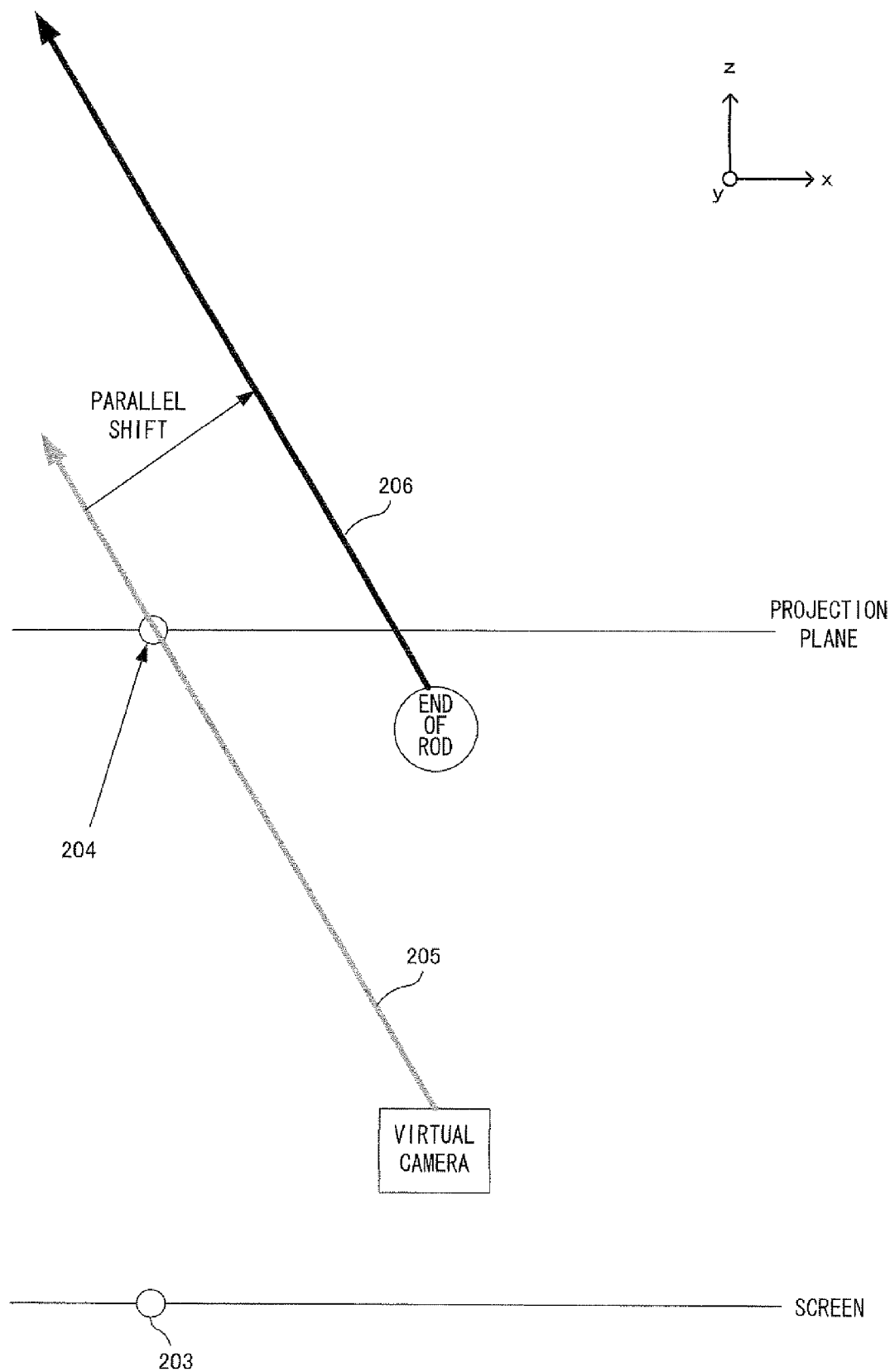
FIG. 39 is a view for explaining throwing direction setting processing.

Here, an outline of processing of determining a throwing direction of the thrown object (the bomb 202 in the present embodiment) will be described. FIG. 39 shows a concept of the throwing direction determination. In the present embodiment, it is determined that the movement speed of the cursor is equal to or larger than a first predetermined value, the processing of determining a throwing direction is executed. First, a projection plane coordinate 204 is calculated, as described in the above first embodiment, based on a pointing coordinate 203 at the time when the movement speed of the cursor is equal to or larger than first predetermined value.

Next, a vector 205 having a start point at the virtual camera and an end point at the above projection plane coordinate is calculated. Subsequently, a vector 206 (hereinafter, referred to as a discharge vector) is calculated by shifting the vector 205 in parallel such that the start point of the vector 205 agrees with the end of the above rod. Then, processing of discharging the thrown object is executed based on the discharge vector 206. For example, when the cursor 102 is moved across the upper portion of the screen, a discharge vector having an upwardly oblique and depth direction is calculated. As a result, the thrown object is discharged in the upwardly oblique and depth direction in the virtual game space. Then, because movement control is performed based on the laws of physics as described above, the thrown object moves in the depth direction in the virtual game space so as to draw a parabola (as a result, the thrown object can be thrown farther). Moreover, when the cursor 102 is moved across the lower portion of the screen, the thrown object is discharged in a downwardly oblique direction (in this case, the thrown object cannot be thrown far).

Figure 40:
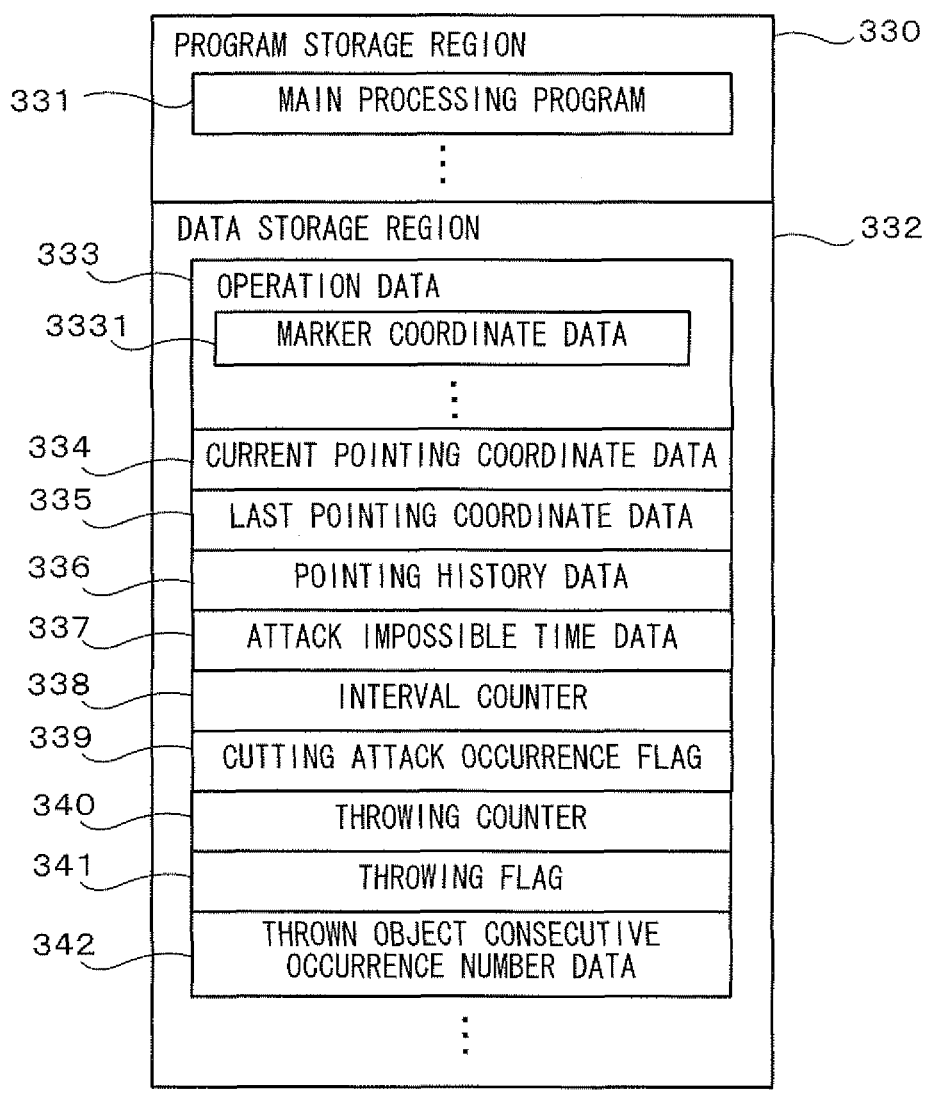
FIG. 40 is a view showing a memory map of the external main memory 12 in the game apparatus main body 3 according to the second embodiment.

The following will describe an outline of game processing according to the second embodiment. First, data stored in the external main memory 12 in the second embodiment will be described. FIG. 40 is a view showing a memory map of the external main memory 12 in the game apparatus main body 3 according to the second embodiment. In FIG. 40, in addition to the data described in the above first embodiment with reference to FIG. 28, a throwing counter 340, a throwing flag 341, and thrown object consecutive occurrence number data 342 are stored in the external main memory 12. Thus, only the newly added data will be described, and the other data will not be described because the other data is the same as that in the above first embodiment.

The throwing counter 340 is a counter used for measuring a discharge interval at which the thrown object is discharged consecutively. When one thrown object is discharged, counting-up of the throwing counter 340 is started. Until the throwing counter 340 reaches a predetermined value, the next thrown object is not discharged. When the throwing counter 340 reaches the predetermined value, the throwing counter 340 is reset, the next thrown object is discharged, and counting-up of the throwing counter 340 is started again.

The throwing flag 341 is a flag for indicating whether or not a throwing attack is being performed. When the throwing flag 341 is ON, it indicates that a throwing attack is being performed. When the throwing flag 341 is OFF, it indicates that a throwing attack is not occurring. The throwing flag 341 is initially set to be OFF.

The thrown object consecutive occurrence number data 342 is data indicative of the number of thrown objects that are set (generated) consecutively with a single swing. When the thrown object consecutive occurrence number data 342 reaches a constant value, a thrown object is not newly set until a swing is performed again. This is for preventing the power of a throwing attack from being greatly different between a long swing and a short swing.

Figure 41:
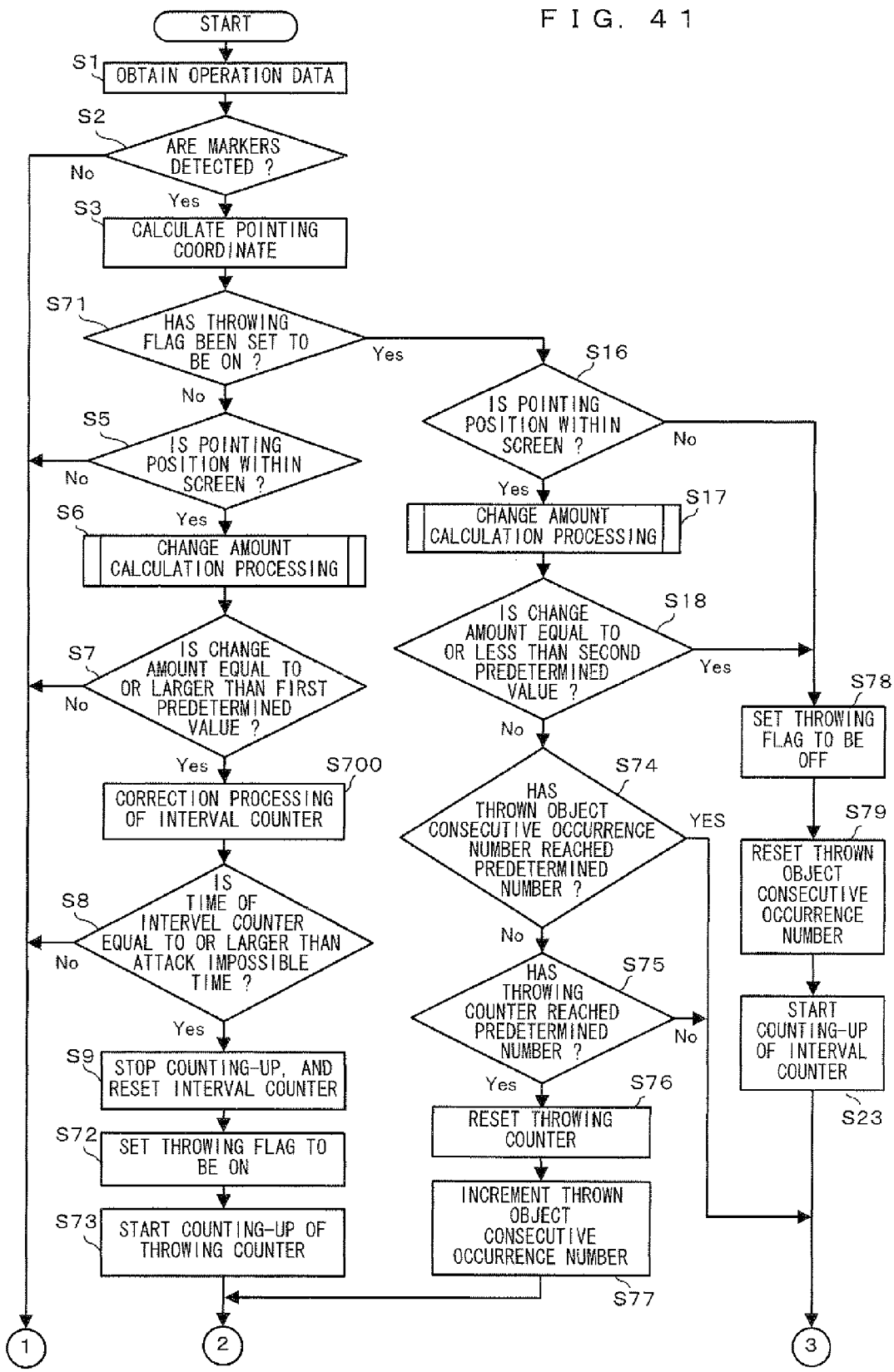
FIG. 41 is a flow chart showing game processing according to the second embodiment.
Figure 42:
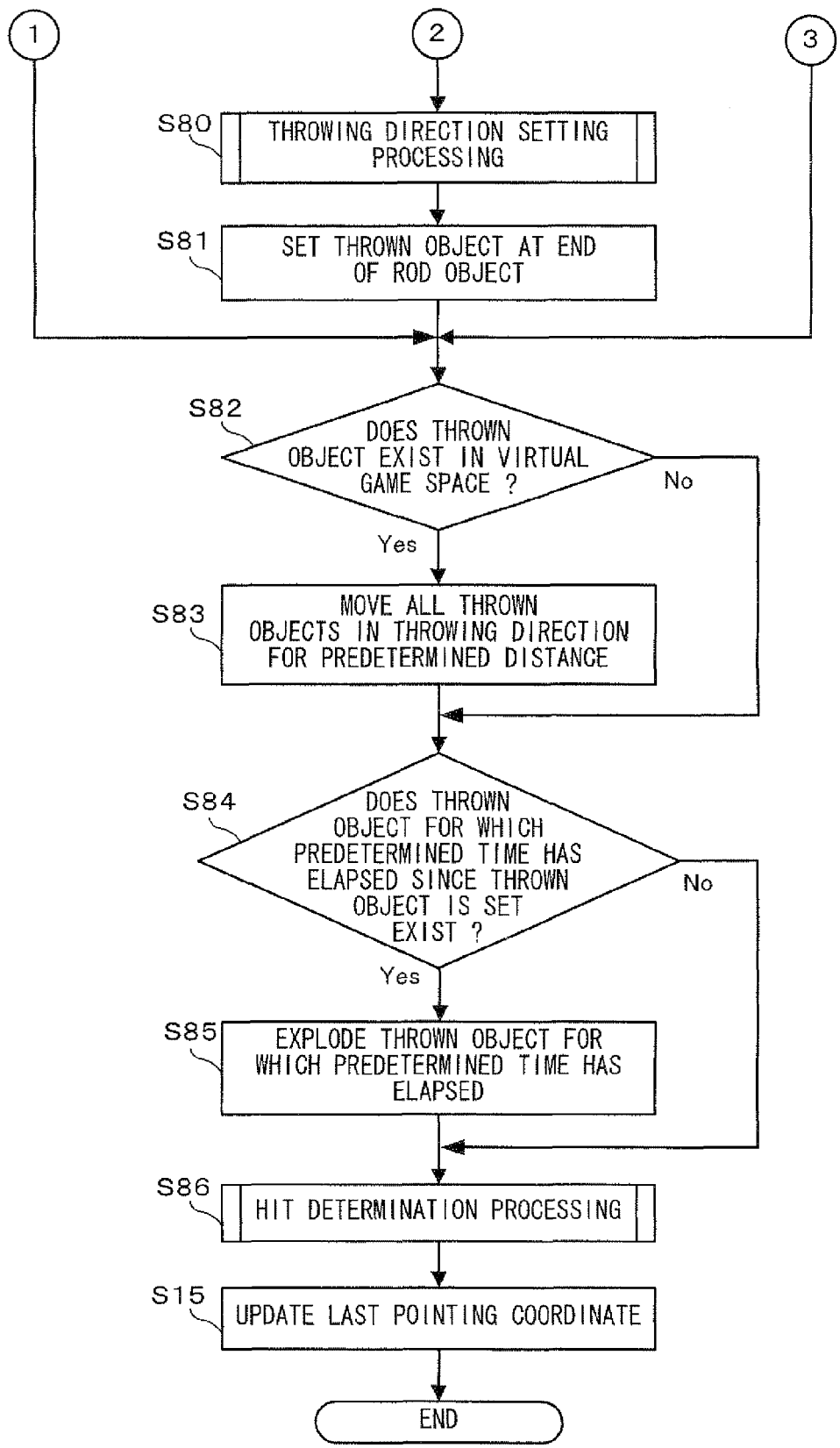
FIG. 42 is a flow chart showing the game processing according to the second embodiment.

With reference to FIGS. 41 to 44, the following will describe a detailed operation of the game processing according to the second embodiment. FIGS. 41 and 42 are flow charts showing in detail the game processing according to the second embodiment. Processing at steps S1 to S3, processing at steps S5 to S9, processing at steps S15 to S18, and processing at a step S700 in FIGS. 41 and 42 are the same as the processing at the same step numerals described in the above first embodiment with reference to FIGS. 29 and 30. Thus, the detailed description thereof will be omitted.

As shown in FIG. 41, after a pointing coordinate is calculated in the processing at the step S3, whether or not the throwing flag 341 has been set to be ON is determined at a step S71. As the result of the determination, when it is determined that the throwing flag 341 has not been set to be ON (NO at the step S71), it is in a state where a throwing attack is not being performed, and the processing proceeds to the step S5 described above. Then, when: the pointing position is within the screen (YES at the step S5); and the change amount of the pointing position is equal to or larger than the first predetermined value and it is not during the attack impossible time (YES at both of the steps S7 and S8), processing of starting a throwing attack is executed. In other words, counting-up of the interval counter 338 is stopped in the processing at the step S9, the interval counter 338 is reset, and then the throwing flag 341 is set to be ON at a step S72. Next, at a step S73, counting-up of the throwing counter 340 is started.

Figure 43:
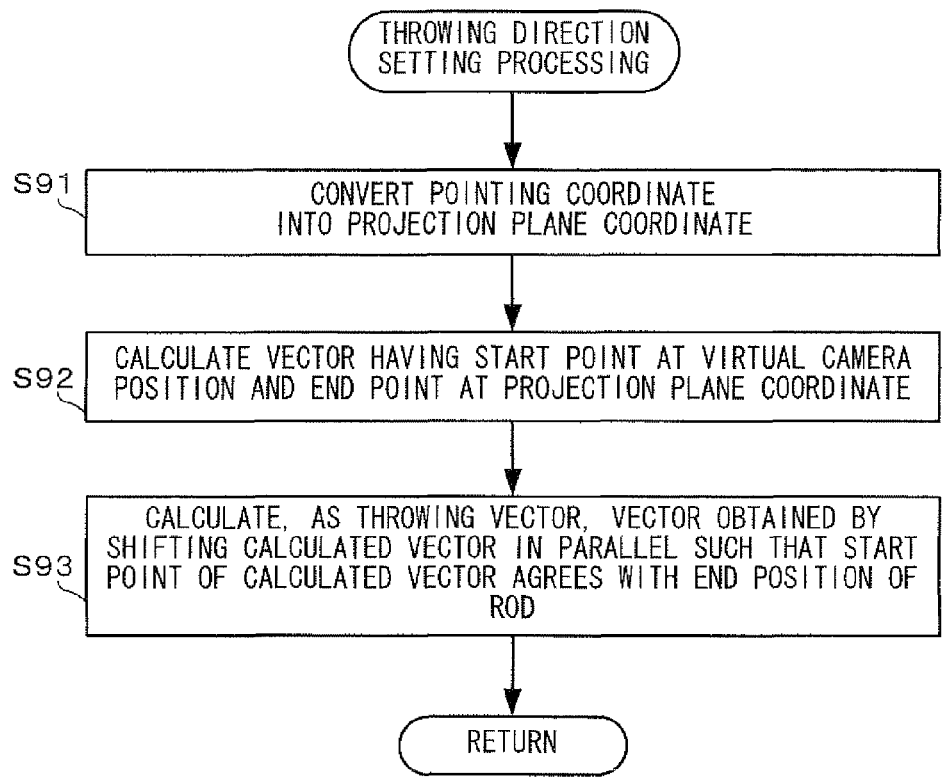
FIG. 43 is a flow chart showing in detail throwing direction setting processing at a step 80 in FIG. 42.

Next, at a step S80 in FIG. 42, throwing direction setting processing is executed. FIG. 43 is a flow chart showing in detail the throwing direction setting processing shown at the step S80. As shown in FIG. 43, first, at a step S91, processing of converting a pointing coordinate represented in a two-dimensional coordinate system into a coordinate represented in a three-dimensional coordinate system, is executed. This processing is the same as the processing at the step S41 described in the above first embodiment. In other words, the projection plane coordinate is calculated by converting the pointing coordinate into a coordinate on the projection plane that exists in the virtual game space, using the inverse matrix of the projection matrix for the pointing coordinate. In addition, at that time, processing of appropriately moving the rod object 201 and the like (namely, processing for showing an appearance in which the player object 101 is swinging the rod object 201) is executed in accordance with the pointing coordinate.

Next, at a step S92, the vector 205 (see FIG. 39) having the start point at the virtual camera position and the end point at the projection plane coordinate is calculated.

Next, at a step S93, a vector obtained by shifting the vector 205 in parallel such that the start point of the vector 205 calculated at the step S92 agrees with the end of the rod object 201 is calculated as the discharge vector 206 (see FIG. 39). The discharge vector 206 indicates a throwing direction of the thrown object. This is the end of the throwing direction setting processing.

Referring back to FIG. 42, subsequent to the throwing direction setting processing at the step S80, at a step S81, one thrown object is generated and set at the end of the rod object 201.

Next, at a step S82, whether or not the thrown object exists in the virtual game space is determined. In the present embodiment, thrown objects can be consecutively thrown. Thus, whether or not one or more thrown objects, including not only the thrown object newly set at the step S81 but also a thrown object that has been thrown previously but has not exploded (disappeared) yet, exist in the virtual game space is determined. As the result of the determination, when it is determined that one or more thrown objects exist in the virtual game space (YES at the step S82), all the thrown objects that exist in the virtual game space are moved for a predetermined distance at a step S83. Here, movement of the thrown objects is controlled based on a movement direction indicated by the discharge vector 206 and the laws of physics. Then, the processing proceeds to a step S84. On the other hand, as the result of the determination at the step S82, when it is determined that no thrown object exists in the virtual game space (NO at the step S82), the processing at the step S83 is not executed, and the processing proceeds to processing at the next step S84.

Next, at the step S84, whether or not a thrown object for which a predetermined time has elapsed since the thrown object is set at the end of the rod object 201 (in other words, in the virtual game space) at the step S81 exists is determined. As described above, in the present embodiment, the thrown object explodes at the elapse of a predetermined time that is set as a time limit, and thus whether or not the predetermined time has elapsed is determined for each thrown object. As the result of the determination, when it is determined that a thrown object for which the predetermined time has elapsed exists (YES at the step S84), the thrown object for which the predetermined time has elapsed is caused to explode at a step S85. On the other hand, when it is determined that no thrown object for which the predetermined time has elapsed exists (NO at the step S84), the processing at the step S85 is skipped, and the processing proceeds to the next step S86.

Figure 44:
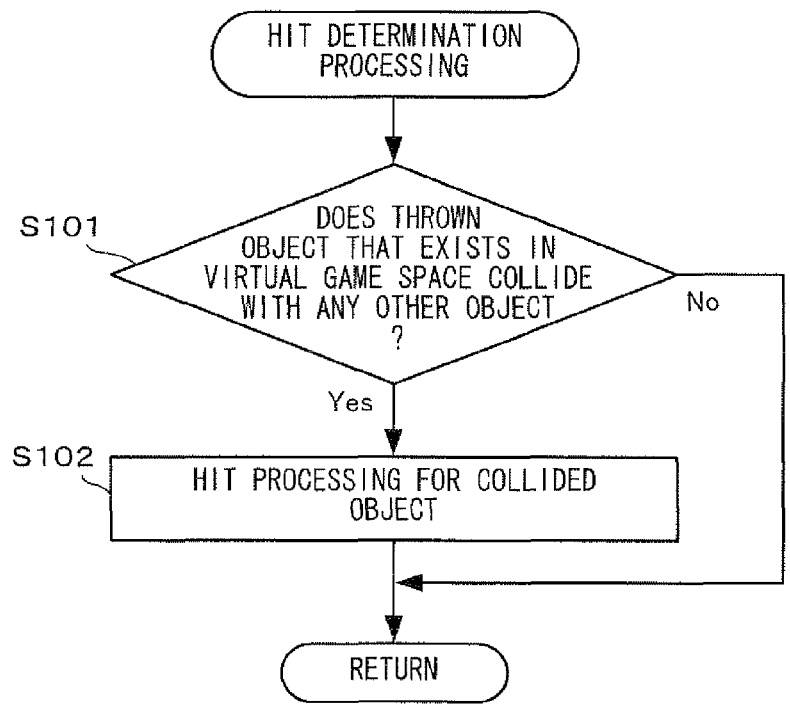
FIG. 44 is a flow chart showing in detail hit determination processing at a step S86 in FIG. 42.

Next, at the step S86, hit determination processing is executed. FIG. 44 is a flow chart showing in detail the hit determination processing shown at the step S86. As shown in FIG. 44, first, at a step S101, whether or not the thrown object that exists in the virtual game space collides with any other object is determined (when a plurality of thrown objects exist, this determination is made for each thrown object) The other object includes a geographic object and the like in addition to the enemy object 103. Further, the other object may include the player object 101. In this case, the player pays attention to not colliding with a thrown object that is thrown by the player themselves, thereby enhancing the fun of the game. As the result of the determination, when the thrown object that exists in the virtual game space does not collide with any other object (NO at the step S101), the hit determination processing ends.

On the other hand, when there is the thrown object that collides with any other object (YES at the step S101), hit processing is executed at the following step S102 for the object with which the thrown object collides. The content of processing in the hit processing is different depending on the collided object. For example, when the collided object is the enemy object 103, processing of causing the thrown object to explode and deleting the thrown object from the virtual game space is executed, and processing decreasing HP of the enemy object 103 is executed. When the HP of the enemy object 103 becomes 0, processing of deleting the enemy object 103 from the virtual game space is additionally executed. For example, when the thrown object collides with a geographic object such as a rock object, a tree object, and the like, only the processing of causing the thrown object to explode and deleting the thrown object from the virtual game space is executed, because HP is not set to the geographic object. It is noted that when the thrown object collides with a geographic object, the exploding processing of the thrown object may not executed, and processing based on the laws of physics (e.g. a motion of the thrown object colliding with a rock object and bouncing back) may be executed. When the hit processing ends, the hit determination processing ends.

Referring back to FIG. 42, after the hit determination processing at the step S86 ends, processing of updating the value of the last pointing coordinate data 335 with the value of the current pointing coordinate data 334 is executed at the step S15, and the game processing ends.

Next, as the result of the determination at the step S71 in FIG. 41, processing executed when it is determined that the throwing flag 341 has been set to be ON (YES at the step S71)

will be described. In this case, the throwing attack is being performed, and thus each processing concerning the throwing attack is executed. Specifically, first, whether or not the pointing position is within the screen is determined at the step S16. When it is determined that the pointing position is within the screen, the aforementioned change amount calculation processing at the step S17 is executed to calculate the change amount of the pointing coordinate (i.e., the movement speed of the cursor). Then, whether or not the change amount is equal to or less than the second predetermined value is determined at the step S18. As a result, when it is determined that the change amount is not equal to or less than the second predetermined value (NO at the step S18), the processing proceeds to a step S74.

At the step S74, whether or not the value of the thrown object consecutive occurrence number data 342 has reached a predetermined value is determined. In other words, whether or not the number of thrown objects that are set (generated) in the current swing has reached a predetermined number is determined. As a result, when it is determined that the value of the thrown object consecutive occurrence number data 342 has reached the predetermined value (YES at the step S74), the processing proceeds to the step S82. On the other hand, when it is determined that the value of the thrown object consecutive occurrence number data 342 has not reached the predetermined value (NO at the step S74), the processing proceeds to a step S75.

At the step S75, whether or not the throwing counter 340 that starts counting-up at the step S73 has reached a predetermined value is determined. As a result, when it is determined that the throwing counter 340 has not reached the predetermined value (NO at the step S75), the processing proceeds to the step S82. For example, when the predetermined value is 3, a thrown object is thrown every a three-frame period during the throwing attack. On the other hand, when it is determined that the throwing counter 340 has reached the predetermined value (YES at the step S75), the throwing counter 340 is reset at a step S76, the thrown object consecutive occurrence number data 342 is incremented at the following step S77, and the processing proceeds to the step S80.

On the other hand, when it is determined that the pointing position is not within the screen (NO at the step S16) as the result of the determination at the step S16, or when it is determined at the step S18 that the change amount is equal to or less than the second predetermined value (YES at the step S18), the throwing flag 341 is set to be OFF at a step S78. Subsequently, at a step S79, the thrown object consecutive occurrence number data 342 is reset. Then, counting-up of the interval counter 338 is started at the step S23, and the processing at and after the step S82 is executed. This is the end of the detailed description of the game processing according to the second embodiment.

As described above, in the second embodiment, when the change amount of the pointing position per one-frame period becomes equal to or larger than the first predetermined value, namely, when the cursor is moved at the predetermined speed or faster, the aforementioned throwing attack is started. Then, until the movement speed of the cursor becomes equal to or less than the second predetermined value, the thrown object continues to be discharged from the end of the rod object at predetermined time intervals. Thus, by enabling switching between the throwing attack and the cutting attack described in the above first embodiment, an attacking way different depending on a weapon with which the player object 101 is equipped can be enjoyed while an operation with a higher degree of freedom is enabled. Therefore, the fun of the game can be enhanced.

The above second embodiment has described the case where the discharge position (movement start position) of the thrown object is at the end of the rod object 201. The discharge position of the thrown object is not limited thereto, but may be a fixed position. For example, regardless of the position of the rod object 201, the thrown object may be discharged from a front position (e.g., the position of the belly) of the player object 101.

Further, in the above second embodiment, a discharge interval at which the thrown object is discharged consecutively is controlled based on time, using the throwing counter 340. However, the present invention is not limited thereto, the discharge interval may be controlled based on a movement distance of the end of the rod object 201 (or, a movement distance of the pointing coordinate or the projection plane coordinate). For example, the change amount of the pointing position may be accumulated. When the accumulated change amount exceeds a predetermined value, processing of generating and setting the thrown object at the end of the rod object 201 may be executed, and the accumulated change amount may be reset. Alternatively, a movement amount of the end of the rod object 201 may be monitored instead of the pointing position, and processing of generating and setting the thrown object at the end of the rod object 201 may be executed every time the end of the rod object 201 moves for a predetermined distance.

Further, in the above second embodiment, every time a predetermined condition is met (every time the change amount becomes equal to or larger than the first predetermined value or every time the throwing counter has reached the predetermined value), the thrown object is generated and set (the step S78). The present invention is not limited to generating the thrown object every time the predetermined condition is met, but a thrown object that has already existed (being previously generated) may be set. For example, a thrown object is generated in advance in the virtual game space so as to be set as an "item" that can be obtained by the player object 101 during the game. The player causes the player object 101 to obtain the thrown object as the "item" according to need in a progress of the game. Then, during a throwing attack, the player object 101 may discharge the obtained thrown object. Moreover, in this case, the number of thrown objects that can be discharged may be limited to the number of thrown objects that the player object 101 carries.

Further, in the above second embodiment, one bomb 202 has a function of exploding if hitting an enemy object 103 and a function of exploding at the elapse of a predetermined time. However, a bomb having only a function of exploding if hitting an enemy object 103, and a bomb having only a function of exploding at the elapse of a predetermined time, may separately exist, and a bomb to be discharged may be selectable from theses bombs by the player. By so doing, a game is provided, in which a strategy of the player counts.

Further, regarding an attacking way (particularly, a way of indirect attacking), an attacking way in which a laser beam is emitted may be selectable, in addition to the attacking way in which a thrown object is discharged from the end of the rod object 201 as described in the above second embodiment. In this case, after the discharge vector is calculated as described above, a straight line object (laser beam) may be drawn so as to extend along the discharge vector in the depth direction of the virtual game space. Then, the above hit determination may be performed by determining whether or not the straight line object collides with any enemy object 103.

While the above example embodiments have been described in detail, the foregoing description is in all aspects illustrative and not restrictive. It is understood that numerous other modifications and variations can be devised without departing from the scope of the invention.

The invention claimed is:

1. A non-transitory computer-readable storage medium having stored therein a game program that is executed by a processing system of a game apparatus for executing predetermined processing based on operation information that is obtained from an operating device, the game program comprising instructions that are configured to cause the processing system to:
repeatedly calculate a pointing position with respect to a screen of a display device based on the operation information;
locate a virtual object in a virtual three-dimensional space and display a representation of the virtual object on the display device as viewed from a virtual camera of the virtual three-dimensional space;
display a cursor, on the display device, at the repeatedly calculated pointing position or a position that is based on the repeatedly calculated pointing position;
calculate a change amount of the pointing position;
determine whether or not the change amount of the pointing position meets a first condition;
determine whether or not the calculated pointing position is outside of an area of the screen of the display device;
in accordance with determination that the calculated pointing position is outside of the area of the screen and that the change amount of the pointing position does not meet the first condition, adjust a viewpoint of the virtual camera;
in accordance with determination that the change amount of the pointing position meets the first condition and even when the calculated pointing position is outside of the area of the screen of the display device, execute predetermined processing for the pointing position or a position specified based on the pointing position without correspondingly adjusting the viewpoint of the virtual camera; and
for the executed predetermined processing, control the virtual object within the virtual three-dimensional space based on the pointing position as a result of the change amount of the pointing position satisfying the first condition and change how the representation of the virtual object is displayed on the display device in accordance with the control.

2. The medium of claim 1, wherein the instructions are further configured to:
determine whether or not the change amount of the pointing position meets a second condition, and
the predetermined processing starts execution when the change amount of the pointing position meets the first condition, and the predetermined processing ends execution when the change amount of the pointing position meets the second condition.

3. The medium of claim 2, wherein
the first condition includes the change amount of the pointing position being equal to or larger than a first predetermined value, and
the second condition includes the change amount of the pointing position being equal to or less than a second predetermined value.

4. The medium of claim 1, wherein the instructions are further configured to:
determine whether or not the pointing position is included in a range that is assigned as the screen, and
the predetermined processing starts execution when both the pointing position to which the operating device points is included in the range that is assigned as the screen and the change amount of the pointing position meets the first condition.

5. The medium of claim 1, wherein the instructions are further configured to:
determine whether or not the pointing position is included in a range that is assigned as the screen, and
after starting execution of the predetermined processing, the predetermined processing is ended when the pointing position is not included in the range that is assigned as the screen.

6. The medium of claim 1, wherein the predetermined processing includes display of a predetermined object at the pointing position or the position specified based on the pointing position.

7. The medium of claim 1, wherein the predetermined processing includes drawing of a trajectory connecting, in chronological order, the pointing position or the position specified based on the pointing position, where the drawing of the trajectory is concurrently displayed on the display device with the representation of the controlled virtual object.

8. The medium of claim 1, wherein the instructions are further configured to:
determine whether or not a predetermined target object exists at a position, in a virtual game space, corresponding to the pointing position or the position specified based on the pointing position, and
the predetermined processing includes execution of hit processing for the predetermined target object when the predetermined target object exists at the position, in the virtual game space, corresponding to the pointing position or the position specified based on the pointing position.

9. The medium of claim 8, wherein
the virtual game space is a virtual three-dimensional space, the instructions are further configured to:
calculate a three-dimensional coordinate that represents the position, in the virtual three-dimensional space, corresponding to the pointing position or the position specified based on the pointing position;
calculate a straight line connecting a predetermined position in the virtual three-dimensional space to the position that is represented by the calculated three-dimensional coordinate; and
determine whether or not the calculated straight line collides with the predetermined target object, and
when the straight line collides with the predetermined target object, the hit processing for the predetermined target object with which the straight line collides is executed.

10. The medium of claim 8, wherein
the instructions are further configured to:
change a value of a continuation parameter that is a parameter for indicating whether or not execution of the predetermined processing continues; and
determine whether or not the value of the continuation parameter meets a third condition after the predetermined processing is started, and
when the value of the continuation parameter meets the third condition, the execution of the predetermined processing is ended.

11. The medium of claim 1, wherein the predetermined processing includes:

calculation of a movement direction of a predetermined movement object in a virtual three-dimensional space, based on the pointing position or the position specified based on the pointing position; and movement of the predetermined movement object in the virtual three-dimensional space based on the calculated movement direction.

12. The medium of claim 11, wherein calculation of the movement direction includes:

conversion of the pointing position or the position specified based on the pointing position into a three-dimensional coordinate that represents a position, in the virtual three-dimensional space, corresponding to the pointing position or the position specified based on the pointing position; and calculation of, as the movement direction of the movement object, a direction from a predetermined position in the virtual three-dimensional space toward the position that is represented by the three-dimensional coordinate.

13. The medium of claim 11, wherein the calculation of the movement direction is repeatedly executed until a predetermined condition is met.

14. The medium of claim 13, wherein the calculation of the movement direction of the predetermined movement object and movement of the predetermined movement object are repeatedly executed at every predetermined time interval.

15. The medium of claim 13, wherein the instructions are further configured to:

accumulate the change amount of the pointing position, wherein the calculation of the movement direction of the predetermined movement object and movement of the predetermined movement object are repeatedly executed every time an accumulated value of the change amount reaches a predetermined value.

16. The medium of claim 1, wherein
the predetermined processing includes:

calculation of a three-dimensional vector indicative of a movement direction of a predetermined movement object in a virtual three-dimensional space, based on the pointing position or the position specified based on the pointing position; and movement of the predetermined movement object in the virtual three-dimensional space, based on the three-dimensional vector calculated by the three-dimensional vector calculation means.

17. The medium of claim 1, wherein
the predetermined processing includes:

calculation of, based on the pointing position or the position specified based on the pointing position, a three-dimensional coordinate that represents a position, in the virtual three-dimensional space, corresponding to the pointing position or the position specified based on the pointing position, and calculation of a vector having a start point at a predetermined position in the virtual three-dimensional space and an end point at the three-dimensional coordinate; and drawing an object extending in a direction, in the virtual three-dimensional space, along the vector calculated by the vector calculation means.

18. The medium of claim 1, wherein
the predetermined processing includes:

calculation of, based on the pointing position or the position specified based on the pointing position, a three-dimensional coordinate that represents a position, in the virtual three-dimensional space, corresponding to the pointing position or the position specified based on the pointing position, and calculation of a vector that extends from a predetermined position in the virtual three-dimensional space toward the three-dimensional coordinate;

extending a straight line from the predetermined position in the virtual three-dimensional space along the calculated vector; and determination of whether or not a predetermined target object exists on the extended straight line, and execution of hit processing for the predetermined target object when the predetermined target object exists on the straight line.

19. The medium of claim 1, wherein the operating device includes a touch screen.

20. A game apparatus for executing predetermined processing based on operation information that is obtained from an operating device, the game apparatus coupled to a display device and the game apparatus comprising:

a processing system that includes at least one processor, the processing system configured to:

calculate a plurality of positions that are associated with a screen of the display device based on the operation information;

as new positions of the plurality of positions are calculated, output a cursor to the screen of the display device at the new calculated positions that are associated with a screen of the display device or a position that is based on at least some of the plurality of positions;

calculate a change amount based on at least two positions out of the plurality of calculated positions;

determine whether or not the change amount of the pointing position meets a first condition; and execute predetermined processing from one of the plurality of position or a position based on at least some of the plurality of positions when the change amount of the pointing position meets the first condition;

control how a virtual object is displayed on the displayed device in accordance with calculation of respective ones of the plurality of positions as a result of the change amount of the pointing position satisfying the first condition; and output, to the display device, a trajectory image that is concurrently displayed with the controlled virtual object, wherein the processing system is further configured to adjust a viewpoint of a virtual camera based on a determination that at least one of the calculated plurality of positions is at a periphery of the screen and while the first condition has not been met, but not adjust the viewpoint while the first condition is met.

* * * * *